US010503164B2

(12) United States Patent
Ibe

(10) Patent No.: US 10,503,164 B2
(45) Date of Patent: Dec. 10, 2019

(54) DELIVERY SYSTEM

(71) Applicant: V-Sync Co., Ltd., Tokyo (JP)

(72) Inventor: Takaya Ibe, Tokyo (JP)

(73) Assignee: V-Sync Co., Ltd., Tokyo (JP)

( * ) Notice: Subject to any disclaimer, the term of this patent is extended or adjusted under 35 U.S.C. 154(b) by 103 days.

(21) Appl. No.: 15/576,736

(22) PCT Filed: Jan. 30, 2017

(86) PCT No.: PCT/JP2017/003157
§ 371 (c)(1),
(2) Date: Nov. 24, 2017

(87) PCT Pub. No.: WO2017/191695
PCT Pub. Date: Nov. 9, 2017

(65) Prior Publication Data
US 2019/0220000 A1 Jul. 18, 2019

(30) Foreign Application Priority Data

May 2, 2016 (JP) ................................. 2016-092610
May 2, 2016 (JP) ................................. 2016-092611

(51) Int. Cl.
*G05D 1/00* (2006.01)
*G01C 21/20* (2006.01)
(Continued)

(52) U.S. Cl.
CPC .............. *G05D 1/0027* (2013.01); *B60P 3/00* (2013.01); *B61B 13/00* (2013.01); *B65G 1/06* (2013.01);
(Continued)

(58) Field of Classification Search
CPC .............. G05D 1/0027; G05D 1/0297; G05D 2201/0216; G01C 21/206; G01C 21/3492; G06Q 50/28
(Continued)

(56) References Cited

U.S. PATENT DOCUMENTS 6,213,025 B1    4/2001  Sauerwein et al.
7,891,931 B2 *  2/2011  Podbielski ........... B65G 1/0414
                                                    414/663
(Continued)

FOREIGN PATENT DOCUMENTS

CN    104150178 A    11/2014
CN    104477551 A    4/2015
(Continued)

OTHER PUBLICATIONS

The extended European search report issued by the European Patent Office dated Sep. 10, 2018, which corresponds to European Patent Application No. 17792628.4-1222 and is related to U.S. Appl. No. 15/576,736.
(Continued)

*Primary Examiner* — Marthe Y Marc-Coleman
(74) *Attorney, Agent, or Firm* — Studebaker & Brackett PC

(57) ABSTRACT

A delivery system includes: a delivery vehicle which can carry a delivery box; and a carrier vehicle which can carry the delivery vehicle thereon, the carrier vehicle including a storage container which can store delivery boxes, the carrier vehicle including a conveyance control mechanism which performs conveyance control to convey the delivery box located at a predetermined storage location in the storage container to a storage location different from the predetermined storage location, the conveyance control mechanism performing the conveyance control to convey the delivery
(Continued)

box to a receipt location at which the delivery vehicle can receive the delivery box, the delivery vehicle including a carrying control mechanism which performs carrying control to receive the delivery box from the carrier vehicle at the receipt location and to carry the received delivery box thereon, wherein the delivery vehicle deliveries to the delivery destination the delivery box carried on the delivery vehicle.

8 Claims, 31 Drawing Sheets

(51) Int. Cl.
    *G05D 1/02*         (2006.01)
    *G01C 21/34*        (2006.01)
    *G06Q 50/28*        (2012.01)
    *G06Q 10/04*        (2012.01)
    *B61B 13/00*        (2006.01)
    *B60P 3/00*         (2006.01)
    *B65G 61/00*        (2006.01)
    *B65G 1/06*         (2006.01)
    *G06Q 10/08*        (2012.01)

(52) U.S. Cl.
    CPC ........... *B65G 61/00* (2013.01); *G01C 21/206* (2013.01); *G01C 21/3492* (2013.01); *G05D 1/0297* (2013.01); *G06Q 10/04* (2013.01); *G06Q 10/083* (2013.01); *G06Q 50/28* (2013.01); *G05D 2201/0216* (2013.01)

(58) Field of Classification Search
    USPC ............................................................ 701/2
    See application file for complete search history.

(56) References Cited

U.S. PATENT DOCUMENTS 9,809,391 B2 * 11/2017 Weiland ............... B65G 1/0414
2014/0081445 A1    3/2014 Villamar

FOREIGN PATENT DOCUMENTS

| CN | 204453507 U | 7/2015 |
| CN | 105314342 A | 2/2016 |
| DE | 196 26 966 A1 | 1/1998 |
| JP | H06-305353 A | 11/1994 |
| JP | H07-315111 A | 12/1995 |
| JP | H08-324709 A | 12/1996 |
| JP | 2002-133577 A | 5/2002 |
| JP | 2002-205824 A | 7/2002 |
| JP | 2004-323203 A | 11/2004 |
| JP | 2004323203 A * | 11/2004 |
| JP | 2015-036164 A | 2/2015 |

OTHER PUBLICATIONS

Sergio Mourelo Ferrandez et al.; "Optimization of a Truck-drone in Tandem Delivery Network Using K-means and Genetic Algorithm", Apr. 25, 2016, 15 pages, Journal of Industrial Engineering and Management, vol. 9, No. 2.

International Search Report issued in PCT/JP2017/003157; dated Apr. 11, 2017.

Robinette; HorseFly 'Octocopter' Primed to Fly the Future to Your Front Door; University of Cincinnati; [online]; Apr. 6, 2014; [retrieved on Mar. 28, 2017]; Retrieved from the Internet: <URL:http://www.uc.edu/news/nr.aspx?id=19929>.

An Office Action mailed by the State Intellectual Property Office of the People's Republic of China dated Feb. 12, 2019, which corresponds to Chinese Patent Application No. 201780001716.5 and is related to U.S. Appl. No. 15/576,736; with English translation.

* cited by examiner

CONTENTS OF E-MAIL

| TO : xxx@yyy.jp |
| FROM: SENDER |
| SUBJECT: COMPLETION OF DELIVERY |
| MESSAGE:<br>  YOUR ORDERED ITEM (ORDER NUMBER 00000)<br>  DATED MM DD, 20YY HAS BEEN DELIVERED.<br><br>  PLEASE RECEIVE YOUR PARCEL<br>  BY MM DD, 20YY |
| BOX NUMBER: 120 |
| UNLOCKING PASS WORD: pass_abc |

*FIG.18*

DELIVERY SYSTEM

TECHNICAL FIELD

The present invention relates to a delivery system.

BACKGROUND ART

As an environment for communication by using various kinds of terminals has been improved in the whole of society, e-commerce (electric commerce) by using EC (e-commerce) sites created by using web technology has been widely used.

These EC sites are also referred to as, for example, online shops, which serve as virtual shops on the Web. When a person selects an item in an EC site, the person can purchase the item, and then a set of procedures including personal identification, payment, and so forth are completed on a web payment system. After that, the purchased item is delivered to a designated delivery destination.

Items offered by the EC sites include, for example, "digital data" delivered online, and "tangible products or goods" such as commodities. When "digital data" is purchased, the purchased item is sent to a designated address such as an e-mail address, so that the delivery of the item is completed. Meanwhile, when "tangible product" is purchased, the item is delivered to a delivery destination via, for example, a delivery company in general. That is, a delivery process is required to deliver the purchased item to the delivery destination.

When a delivery company is used for the delivery, the delivery process is naturally performed by humans, and therefore involves costs such as a labor cost. Consequently, when an amount of delivered parcels (items) are increased, the costs for labor and equipment are increased. Moreover, when the recipient of the parcel (item) is absent at the delivery destination, it is necessary to perform additional procedures such as creating a delivery absence, and requesting redelivery.

As described above, while the e-commerce through EC sites has been widely used, it takes a lot of labor to deliver the purchased items or products, and therefore the delivery costs are increased.

CITATION LIST

Patent Literature

PTL1: Japanese Patent Application Laid-Open No. HEI08-324709

SUMMARY OF INVENTION

Technical Problem

Patent Literature 1 discloses a technology for a transporter with automatic high-rise warehouse. The transporter with automatic high-rise warehouse disclosed in Patent Literature 1 includes racks, a stacker crane, a clamp mechanism which restrains the stacker crane, and a controller. By this means, the storage and handling of articles can be mechanized to reduce the burden of workers.

However, the transporter with automatic high-rise warehouse disclosed in Patent Literature 1 needs the stacker crane and the clamp mechanism for the stacker crane, and therefore limits the capacity for storing articles. Moreover, the transporter with automatic high-rise warehouse disclosed in Patent Literature 1 is premised on the fact that workers take articles from the transporter and deliver the articles to delivery destinations, and therefore leaves to be improved in view of the cost reduction, and the increase in speed and efficiency of the delivery.

The present invention has been achieved under the above-described circumstances, and is directed to an example of object to address these problems. It is therefore an example of object of the present invention to provide a delivery system that can efficiently deliver parcels.

Solution to Problem

According to one aspect of the present invention a delivery system includes: a delivery vehicle configured to be able to carry a delivery box to be delivered to a delivery destination; and a carrier vehicle configured to be able to carry the delivery vehicle thereon, the carrier vehicle including a storage container configured to be able to store one or more delivery boxes, the carrier vehicle including a conveyance control mechanism configured to perform conveyance control to convey the delivery box located at a predetermined storage location in the storage container to a storage location different from the predetermined storage location, the conveyance control mechanism performing the conveyance control to convey the delivery box to a receipt location at which the delivery vehicle can receive the delivery box, the delivery vehicle including a carrying control mechanism configured to perform carrying control to receive the delivery box from the carrier vehicle at the receipt location and to carry the received delivery box thereon, wherein the delivery vehicle deliveries to the delivery destination the delivery box carried on the delivery vehicle by the conveyance control of the conveyance control mechanism to convey the delivery box to the receipt location, and by the carrying control of the carrying control mechanism.

According to one aspect of the present invention a delivery system includes: a delivery vehicle configured to carry a delivery box to be delivered to a delivery destination; and a carrier vehicle configured to carry the delivery vehicle thereon, the carrier vehicle including: an automated warehouse configured to store a plurality of delivery boxes and change locations of the plurality of delivery boxes; and a controller configured to control the automated warehouse such that the delivery box to be delivered to the delivery destination is located at a receipt location at which the delivery vehicle can receive the delivery box by the time the delivery vehicle gets out of the carrier vehicle at a relay point on a delivery route from a shipping place to the delivery destination, wherein: when arriving at the relay point for the delivery destination, the carrier vehicle gets the delivery vehicle carrying the delivery box out of the carrier vehicle; upon receiving the delivery box located at the receipt location, the delivery vehicle carries the delivery box to be delivered to the delivery destination thereon; and the delivery vehicle travels on the delivery route from the relay point to the delivery destination to deliver the delivery box to the delivery destination.

The delivery system according to one aspect of the present invention can efficiently deliver parcels.

BRIEF DESCRIPTION OF DRAWINGS

Hereinafter, several embodiments of the present invention will be described, as examples, with reference to the accompanying drawings;

FIG. 18 is a drawing showing contents of an e-mail sent to the recipient of a parcel;

DESCRIPTION OF EMBODIMENTS

Figure 1:
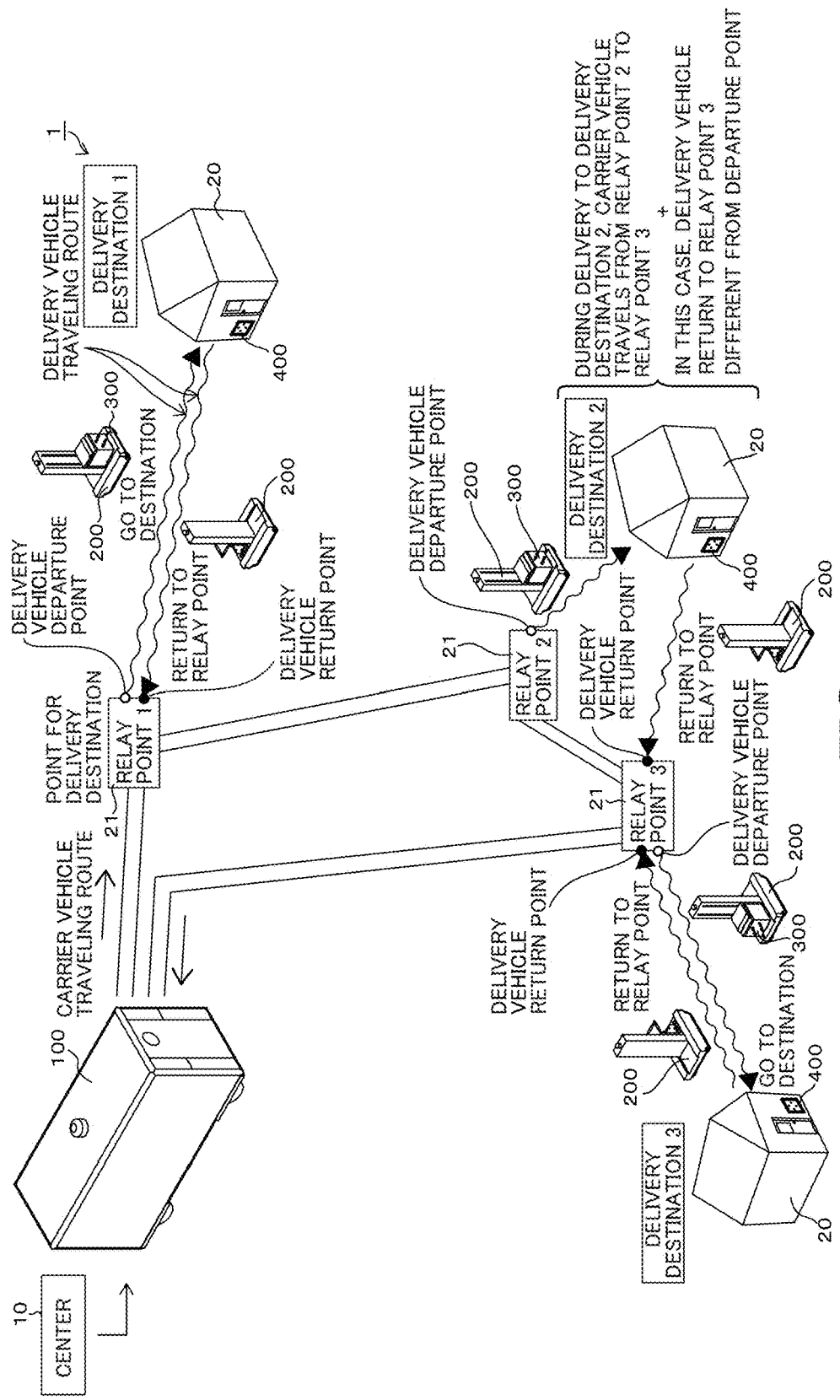
FIG. 1 is a drawing showing the outline of a delivery system according to Embodiment 1 of the present invention.

Hereinafter, the embodiments of the present invention will be described in details with reference to the accompanying drawings. The embodiments described later are merely examples of the present invention, and are not intended to limit the scope of the invention. Moreover, all the configurations and the operations in each of the embodiments are not necessarily essential to practice the present invention. Here, the same components are assigned the same reference numerals, and overlapping description will be omitted.

<1. Outline of the Delivery System≤

FIG. 1 is a drawing showing the outline of a delivery system 1 according to Embodiment 1 of the present invention.

The delivery system shown in FIG. 1 is configured to deliver parcels by moving a vehicle for delivery from a delivery center (hereinafter referred to as "center 10") as a shipping place to a delivery destination 20.

The center 10 is a generic term for a merchandise management center for managing items, a shipping center for performing a shipping procedure to ship the item ordered by a purchaser among items managed in the merchandise management center, and a monitoring center for monitoring the delivery. The center 10 may be referred to as "delivery base."

The center 10 receives orders through EC sites where e-commerce is enabled. To be more specific, a server provided in the center 10 which controls and manages the EC sites receives the orders.

A person who wants an item can easily order and purchase the item by accessing the EC site, and therefore easily enjoy shopping.

Also the person can access the EC site from an automatic vending machine which is equipped with a liquid crystal display and connected to the website through network communication. For example, the person can purchase the item shown on the liquid crystal display in the same way as purchasing a beverage from a conventional automatic vending machine.

To purchase the item by using the EC site, the person designates a method of payment and a delivery destination 20, as well as the item to be purchased.

At the center 10, upon receiving the order from the purchaser with the delivery destination 20, a delivery process is performed, including selecting the ordered item from among the managed items and delivering the item to the delivery destination 20.

Here, details of a shipping process performed at the center 10 will be described later, with reference to FIG. 3.

The purchased item is delivered as a parcel from the center 10 to the delivery destination 20 by the vehicle for delivery.

In this case, the parcel is stored in a suitable delivery box 300 (also referred to as "box", or "delivery container") which is selected based on its size, shape, quantity and impact resistance. Accordingly, the parcel and the delivery box 300 are the same in meaning as a delivered object. "Delivery of a parcel" and "delivery of a delivery box" are not different from one another in meaning.

In addition, the vehicle for delivery includes a small delivery vehicle on which the delivery box 300 is carried, and a large carrier vehicle on which the small delivery vehicle is carried.

The large carrier vehicle can carry one or more delivery boxes 300 and a small delivery vehicle thereon, and is also referred to as "automated driverless large carrier vehicle", "transporter vehicle" or "carrier vehicle." Hereinafter this large carrier vehicle will be referred to as "carrier vehicle 100."

On the other hand, the small delivery vehicle which can be carried on the carrier vehicle 100 can carry the delivery box 300 storing the parcel, and is also referred to as "automated driverless small delivery vehicle" or "delivery vehicle." Hereinafter, the small delivery vehicle will be referred to as "delivery vehicle 200."

Here, the delivery vehicle 200 may be referred to as "first vehicle", and the carrier vehicle 100 may be referred to as "second vehicle."

At the center 10, information on the delivery destination 20 (delivery information) of the delivery box 300 storing the parcel as delivery information is set or stored in each of the carrier vehicle 100 and the delivery vehicles 200. That is, the information on the delivery destination 20 for each of one or more delivery boxes 300 carried on the carrier vehicle 100 is set or stored in the carrier vehicle 100 and the delivery vehicle 200.

The delivery information includes the address and name of the delivery destination 20, "fixture number" for identifying a delivery box fixture 400, and "box identification information" for identifying the delivery box 300 to be delivered. These pieces of the delivery information are stored in association with each other. In addition, the delivery information includes delivering order information indicating the order of delivering the delivery boxes 300 to a plurality of delivery destinations 20.

The carrier vehicle 100 includes an automated driving control mechanism (automated driving controller) and a delivery control mechanism (delivery controller). The automated driving control mechanism and the delivery control mechanism work together to deliver parcels.

The automated driving control mechanism of the carrier vehicle 100 is a generic term for devices, mechanisms, and control programs which are required to allow the carrier vehicle 100 to automatically travel or drive to a predetermined position or point. The automated driving control mechanism performs control to allow the carrier vehicle 100 to travel on a delivery route from the center 10 as the shipping place to a predetermined position or point (corresponding to "exit point" and "relay point 21" described later).

Here, the delivery route from the center 10 as the shipping place to the predetermined position or point ("exit point" and "relay point 21") may be referred to as "first traveling path." That is, the first traveling path is a delivery route on which the carrier vehicle 100 carrying the delivery vehicles 200 travels or drives. In other words, the delivery vehicles 200 are carried on and moved together with the carrier vehicle 100 on the first traveling path from the delivery destination 20 to the relay point 21.

The delivery control mechanism of the carrier vehicle 100 is a generic term for devices, mechanisms, and control programs which are required for the carrier vehicle 100 to deliver the delivery box 300 to the delivery destination 20. The delivery control mechanism performs control to identify the delivery box 300 to be delivered to the delivery destination 20 corresponding to the predetermined position or point ("exit point" and "relay point 21") on the delivery route, among one or more delivery boxes 300 carried on the carrier vehicle 100.

Moreover, the delivery control mechanism performs exit control to get the delivery vehicle 200 carried on the carrier vehicle 100 out of the carrier vehicle 100. In this exit control, a door of the carrier vehicle 100 is opened, and the delivery vehicle 200 is gotten out of the carrier vehicle 100 via the door serving as an exit pathway.

Moreover, the delivery control mechanism performs entrance control to let the delivery vehicle 200 into the carrier vehicle 100 when the delivery vehicle 200 returns to the carrier vehicle 100 after delivering the delivery box 300 to the delivery destination 20. In this entrance control, the door of the carrier vehicle 100 is opened to let the delivery vehicle 200 into the carrier vehicle 100 via the door serving as an entrance pathway, and then the delivery vehicle 200 is stopped in a predetermined region in the carrier vehicle 100.

In addition, the delivery control mechanism manages the delivery condition of the delivery vehicle 200 by the mutual communication between the carrier vehicle 100 and the delivery vehicle 200 having gotten out of the carrier vehicle 100.

Here, details of the configuration of the carrier vehicle 100 will be described later with reference to FIGS. 4 to 8.

Meanwhile, like the carrier vehicle 100, the delivery vehicle 200 also includes the automated driving control mechanism (automated driving controller), and the delivery control mechanism (delivery controller), and the automated driving control mechanism and the delivery control mechanism work together to deliver parcels. Here, the automated driving control mechanism of the delivery vehicle 200 is similar to, but different from that of the carrier vehicle 100, and also the delivery control mechanism of the delivery vehicle 200 is different from that of the carrier vehicle 100.

The automated driving control mechanism of the delivery vehicle 200 is a generic term for devices, mechanisms, and control programs which are required to allow the delivery vehicle 200 to automatically travel or drive from the point at which the delivery vehicle 200 gets out of the carrier vehicle 100 ("exit point" and "relay point 21") to the delivery destination 20. The automated driving control mechanism performs traveling control to allow the delivery vehicle 200 to travel from the point at which the delivery vehicle 200 gets out of the carrier vehicle 100 ("exit point" and "relay point 21") to the delivery destination 20.

Here, the delivery route from the point at which the delivery vehicle 200 gets out of the carrier vehicle 100 ("exit point" and "relay point 21") to the delivery destination 20 may be referred to as "second traveling path." That is, the second traveling path is a delivery route on which the delivery vehicle 200 having gotten out of the carrier vehicle 100 travels or drives. In other words, the delivery vehicle 200 travels or drives independently of the carrier vehicle 100 on the second traveling path from the relay point 21 to the delivery destination 20.

The delivery control mechanism of the delivery vehicle 200 is a generic term for devices, mechanisms, and control programs which are required for the delivery vehicle 200 to deliver the delivery box 300 to the delivery destination 20. As this delivery control mechanism, the delivery vehicle 200 includes a robot arm (also simply referred to as "arm"). This arm holds the delivery box 300 to prevent the delivery box 300 from dropping out during the delivery. Then, the arm holding the delivery box 300 moves the delivery box 300, and fixes the delivery box 300 to a fixture (hereinafter referred to as "delivery box fixture 400") located at the delivery destination 20 to fix the delivery box 300. In this way, in the delivery system 1, the arm of the delivery vehicle 200 is operated to fix the delivery box 300 to the delivery box fixture 400, so that the delivery box 300 is delivered to the delivery destination 20.

The arm is a member that can grasp, grip or hold the delivery box 300, and may be referred to as "grasp member", "grip member", "holding member" or "holding part." In addition, the arm can move the delivery box 300, and therefore be referred to as "movable member."

Here, details of the configuration of the delivery vehicle 200 will be described later with reference to FIGS. 9 and 10. Moreover, details of the configurations of the delivery box 300 and the delivery box fixture 400 will be described later with reference to FIGS. 15 to 17.

Next, the flow of a process for delivering the delivery box 300 from the center 10 to the delivery destination 20 by the carrier vehicle 100 and the delivery vehicle 200 having the above-described functions will be described.

The carrier vehicle 100 carrying the delivery vehicle 200 searches the delivery route or traveling route to deliver the delivery box 300 carried on the delivery vehicle 200 to the delivery destination 20, based on the information on the delivery destination 20. In this case, the carrier vehicle 100 searches the delivery route to deliver the delivery box 300 to the delivery destination 20 by using the GPS device of the carrier vehicle 100, and the map information and the road information.

That is, when there is a plurality of delivery boxes 300 to be delivered, the carrier vehicle 100 searches the delivery route in consideration of the delivery destination 20 for each of the delivery boxes 300.

The carrier vehicle 100 stores the searched delivery routes.

In an example shown in FIG. 1, "delivery destination 1", "delivery destination 2", and "delivery destination 3" are designated as the delivery destinations. In this case, the delivery route is as follows: ""center"→"delivery destination 1"→"delivery destination 2"→"delivery destination 3"→"center"".

Here, although ""center"→"delivery destination 1"" is designated as part of the delivery route, the carrier vehicle 100 travels on the traveling route from the center 10 to "relay point 1" as shown in FIG. 1, as the relay point 21. FIG. 1 shows that the delivery vehicle 200 travels between "relay point 1" and "delivery destination 1." In this case, "relay point 1" is designated for "delivery destination 1" as the delivery destination 20, where the delivery vehicle 200 carrying the delivery box 300 to be delivered to "delivery destination 1" gets out of the carrier vehicle 100 (exit point).

Meanwhile, in the same way as the carrier vehicle 100, the delivery vehicle 200 searches the delivery route or traveling route from the current location, such as the exit point to the delivery destination 20, based on the information on the delivery destination 20. In addition, the delivery vehicle 200 searches a return route from the delivery destination 20 to the carrier vehicle 100. In this case, the delivery vehicle 200 searches the traveling route from the current location such as the exit point of the delivery vehicle 200 to the delivery destination 20, and from the delivery destination 20 to the position of the carrier vehicle 100, by using the GPS device of the delivery vehicle 200, and the information such as the map information and the road information.

When the current location is "repay point 1" at which the delivery vehicle 200 gets out of the carrier vehicle 100, the delivery vehicle 200 searches the delivery route from "relay point 1" to "delivery destination 1" and stores the searched delivery route. Then, the delivery vehicle 200 travels on the delivery route from "relay point 1" to "delivery destination 1." Then, after the delivery of the delivery box 300 to "delivery destination 1" is completed, the delivery vehicle 200 in mutual communication with the carrier vehicle 100 searches the return route to "relay point 1" at which the carrier vehicle 100 is stopped. That is, this example shows a state in which the point at which the delivery vehicle 200 gets out of the carrier vehicle 100 is substantially the same as the return point.

Next, in ""delivery destination 1"→"delivery destination 2"", which is part of the delivery route searched by the carrier vehicle 100, the carrier vehicle 100 travels from "relay point 1" for "delivery destination 1" to "relay point 2" for "delivery destination 2". Similarly, the delivery vehicle 200 searches the delivery route, and delivers the delivery box 300 between "relay point 2" and "delivery destination 2". In this case, the delivery vehicle 200 having traveled from "relay point 2" to "delivery destination 2" returns not to "relay point 2" at which the delivery vehicle 200 gets out of the carrier vehicle 100 but to "relay point 3" for "delivery destination 3".

That is, in ""delivery destination 1"→"delivery destination 2"", the delivery vehicle 200 returns to the point different from the start point. This indicates that the carrier vehicle 100 travels from "relay point 2" to "relay point 3" for "delivery destination 3" while the delivery vehicle 200 delivers the delivery box 300 to "delivery destination 3" and that the delivery vehicle 200 in communication with the carrier vehicle 100 searches ""delivery destination 2"→"relay point 3"" as the return route.

Moreover, in ""delivery destination 2"→"delivery destination 3"", which is part of the delivery route searched by the carrier vehicle 100, the carrier vehicle 100 travels from "relay point 2" for "delivery destination 2" to "relay point 3" for "delivery destination 3". In this case, the delivery vehicle 200 travels between "relay point 3" to "delivery destination 3" to deliver the delivery box 300.

Then, the carrier vehicle 100 travels ""delivery destination 3"→"center"", which is part of the delivery route searched by the carrier vehicle 100.

As described above, the delivery system 1 can deliver the delivery box 300 (parcel) from the center 10 as the shipping place to the delivery destination 20.

In this case, the delivery box fixture 400 to which the delivery box 300 having been delivered is fixed is provided at the delivery destination 20.

The delivery box 300 fixed to the delivery box fixture 400 has one or more protrusions (also referred to as "protruding part") 310 which can fix the delivery box 300 to the delivery box fixture 400. The delivery box fixture 400 has one or more slots 410 into or through which the protrusions 310 are inserted to lock the delivery box 300. The protrusion 310 is composed of a cylindrical portion and a conical portion and has a constricted portion between the cylindrical portion and the conical portion.

The protrusions 310 of the delivery box 300 and the slots 410 of the delivery box fixture 400 are fixing members that can fix the delivery box 300 to the delivery box fixture 400. In other words, the delivery box 300 and the delivery box fixture 400 engage with one another by the protrusions 310 and the slots 410, and therefore the protrusions 310 are engagement portions of the delivery box 300 (first engagement portions) while the slots 410 are engagement portions of the delivery box fixture 400 (second engagement portions). Accordingly, the second engagement portions engage with the first engagement portions, so that the delivery box 300 can be fixed to the delivery box fixture 400.

In addition, the delivery box fixture 400 has a lock mechanism. When the protrusions 310 of the delivery box 300 are inserted into the slots 410, the lock mechanism performs lock control to lock the protrusions 310 in the slots 410, that is, functions as a stopper, so as to prevent the protrusions 310 from dropping out of the slots 410 or to make it difficult to remove the protrusions 310 from the slots 410. By this means, it is possible to prevent the delivery box 300 from removing without permission or from being stolen.

This lock mechanism may be supported by two of four protrusions 310 of the delivery box 300, and the other two protrusions 310 which are cylindrical waistless pins protruding from the delivery box 300 may engage with upper circular portions of the slots 410 of the delivery box fixture 400 to prevent the delivery box 300 from being lifted up.

When the locked delivery box 300 is removed from the delivery box fixture 400, that is, unlocked, the delivery vehicle 200 authorizes a unique ID or password stored in the storage device of the delivery box 300, so that the delivery vehicle 200 performs unlocking operation to unlock the delivery box 300 and release the delivery box 300 from the delivery box fixture 400.

Here, in a case in which the delivery box 300 is delivered to the delivery destination without the delivery box fixture 400, or the delivery vehicle 200 cannot fix the delivery box 300 to the delivery box fixture 400 for any problem, the recipient with the contact information registered in advance can be notified of arrival of the delivery box 300, and receive the delivery box 300 at a predetermined position (standby position) near the delivery destination 20.

However, in a case in which the delivery vehicle 200 cannot fix the delivery box 300 to the delivery box fixture 400, and even though the recipient with the contact information registered in advance is notified of arrival of the delivery box 300, there is no reply because, for example, the recipient is absent, or it is recognized that the recipient cannot receive the delivery box 300 for some reasons by phone, or via e-mail or SNS (social networking service), the delivery vehicle 200 returns to the carrier vehicle 100 and checks the time when the recipient stays at home to deliver the delivery box 300 again.

Next, a process after the delivery is completed will be described.

After the delivery of the delivery box 300 is completed through the above-described process, the delivery vehicle 200 notifies of the completion of the delivery, the recipient with the contact information such as an e-mail or SNS address which is part of the recipient information of the delivery box 300 stored in the storage device.

In this case, the recipient is notified of information to take the parcel out of the delivery box 300, such as an unlocking key code (also referred to as "unlocking information" or "unlocking password"), as well as the completion of the delivery.

The delivery box 300 includes an information input part such as a touch panel, a button, and a camera (imaging device), and therefore may receive input of the unlocking key code described later. Upon receiving a correct unlocking key code from the information input part, the delivery box 300 performs lock control to unlock or open the door (also referred to as "box door" or "lid") of the delivery box 300. In addition, when the recipient takes the parcel out of the delivery box 300 from the open door and then closes the door, the delivery box 300 performs the lock control to prevent the door of the delivery box 300 from opening or to close the door of the delivery box 300.

When the recipient of the delivery box 300 (in this case, the recipient is the purchaser if the purchaser and the recipient are the same person) inputs predetermined information to the information input part of the delivery box 300, and the delivery box 300 authenticates the predetermined information as a correct key code, the delivery box 300 performs the lock control to make the delivery box 30 unlockable or open. By this means, the recipient can open the door of the delivery box 300 to take the parcel out of the delivery box 300.

Then, when the door of the delivery box 300 closes or is closed by the recipient after the parcel is taken out of the delivery box 300, the door of the delivery box 300 is locked. Here, it is possible to unlock the door as many times as desired by authenticating that the inputted The delivery system 1 allows the recipient to take the delivered parcel out of the delivery box 300 through the process as described above.

Then, upon detecting the parcel being taken out, and detecting the door being locked, by using a sensor and so forth, the delivery box 300 sends status information to the center 10. In this case, the center 10 sends "inquiry about box pick-up" to inquire whether or not it is possible to pick up the delivery box 300, to the carrier vehicle 100 delivering the parcel to any delivery destination 20.

Upon receiving this inquiry about box pick-up, the carrier vehicle 100 determines whether or not there is the delivery vehicle 200 available to carry the delivery box 300, that is, the delivery vehicle 200 not carrying the delivery box 300, and sends to the center 10 a replay of whether or not it is possible to pick up the delivery box 300.

After that, upon receiving from the center 10 an instruction to pick up the delivery box 300 ("box pick-up instruction" or "pick-up instruction information"), the carrier vehicle 100 searches and stores the route to the delivery destination 20 as "pick-up destination", based on the information on the pick-up destination ("pick-up information" or "pick-up destination information") designated by the box pick-up instruction, and travels on the route to pick up the delivery box 300.

In this case, the pick-up information includes "fixture number" to identify the delivery box fixture 400 and "box identification information" to identify the delivery box 300 to be picked up, as well as the address and name of the pick-up destination.

Moreover, the route for picking up the delivery box 300 is additionally incorporated into the existing delivery route of the delivery box 300. Therefore, the carrier vehicle 100 performs delivery and pick-up of the delivery box 300 through a new delivery route or a delivery and pick-up route. Naturally, another configuration is possible where the pick-up route is searched and stored independently of the existing delivery route, and after the delivery of the delivery box 300 is completed via the delivery route, the delivery box 300 is picked up via the pick-up route. Otherwise, the delivery box 300 may be picked up via the pick-up route before the delivery box 300 is delivered via the delivery route.

Figure 2:
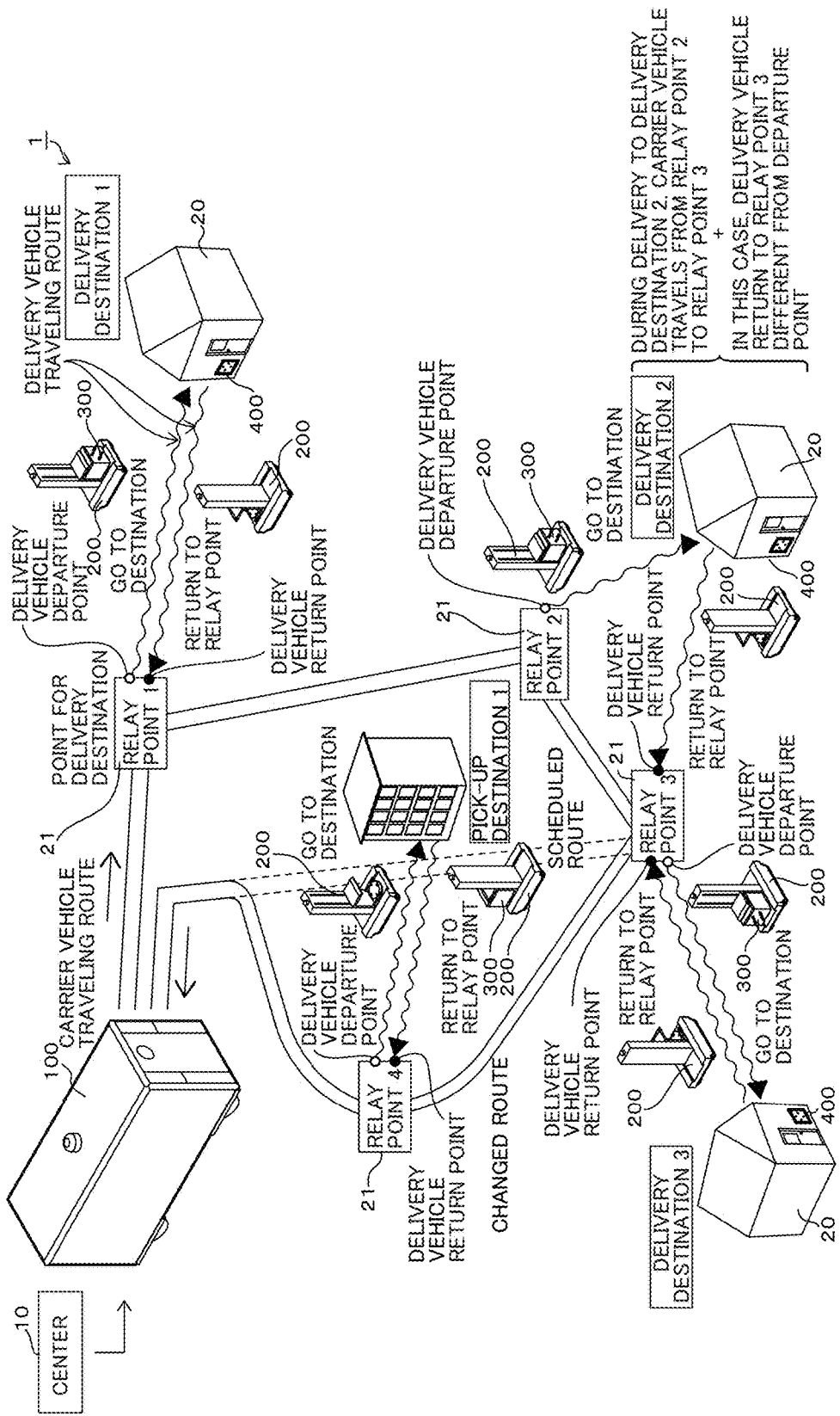
FIG. 2 is another drawing showing the outline of the delivery system according to Embodiment 1 of the present invention.

A configuration in this case is shown in FIG. 2 where the delivery box 300 is delivered and picked up via a new "delivery and pick-up route" made by incorporating the pick-up route of the delivery box 300 into the existing delivery route. This configuration will be described later.

FIG. 2 is another drawing showing the outline of the delivery system 1 according to Embodiment 1 of the present invention.

As described above, FIG. 2 shows the delivery system 1 having the delivery and pick-up route made by incorporating the pick-up route of the delivery box 300 into the delivery route of the delivery system 1 as shown in FIG. 1.

The delivery and pick-up route shown in FIG. 2 is made by incorporating "pick-up destination 1" (also referred to as "delivered destination") into the delivery route ""center-"→"delivery destination 1"→"delivery destination 2"→"delivery destination 3"→"center"" shown in FIG. 1.

To be more specific, the delivery route on which the carrier vehicle 100 travels from "delivery destination 3" to the center is changed to ""delivery destination 3"→"pick-up destination 1"→"center"".

Upon receiving "box pick-up instruction" or "pick-up instruction information" from the center 10, the carrier vehicle 100 expected to pick up the delivery box 300 travels to the pick-up destination, based on information on the pick-up destination of the box pick-up instruction or the pick-up instruction information, such as the address of the pick-up destination and information on the box, for example, "box identification information", "unlocking key code" and "size" described later.

Like each of the delivery destination, "relay point 4" as a relay point is provided for "pick-up destination 1", which is a position at which the carrier vehicle 100 stops. The delivery vehicle 200 gets out of the carrier vehicle 100 at "relay point 4", and travels to "pick-up destination 1". In this case, the delivery vehicle 200 moving to the pick-up destination does not carry any delivery box 300 thereon.

At "pick-up destination 1", the delivery vehicle 200 carries the delivery box 300 thereon by using the arm. In this case, the delivery vehicle 200 checks unique delivery box identification information (hereinafter, also referred to as "box ID", or "box identification information") stored in the storage device of the delivery box 300, and an unlocking key code. Provided that the unlocking key code is identical to the box identification information and the unlocking key code as the information on the pick-up destination which is part of "box pick-up instruction" or "pick-up instruction information", the delivery vehicle 200 releases the delivery box 300 from delivery box fixture 400. Then, the delivery vehicle 200 carries the released delivery box 300 thereon to pick up the delivery box 300

Through the above-described process, the delivery system 1 can pick up the delivery box 300 fixed to the delivery box fixture 400 at the delivery destination 20.

Here, it is possible to complete the delivery, even though the recipient does not directly receive the parcel stored in the delivery box 300 at the delivery destination 20. That is, it is possible to significantly reduce the number of times of redeliveries due to, for example, the absence of the recipient.

Therefore, the delivery system 1 according to Embodiment 1 can significantly reduce delivery costs as compared to the conventional delivery.

<2. Operation Process in the Shipping Place>

Figure 3:
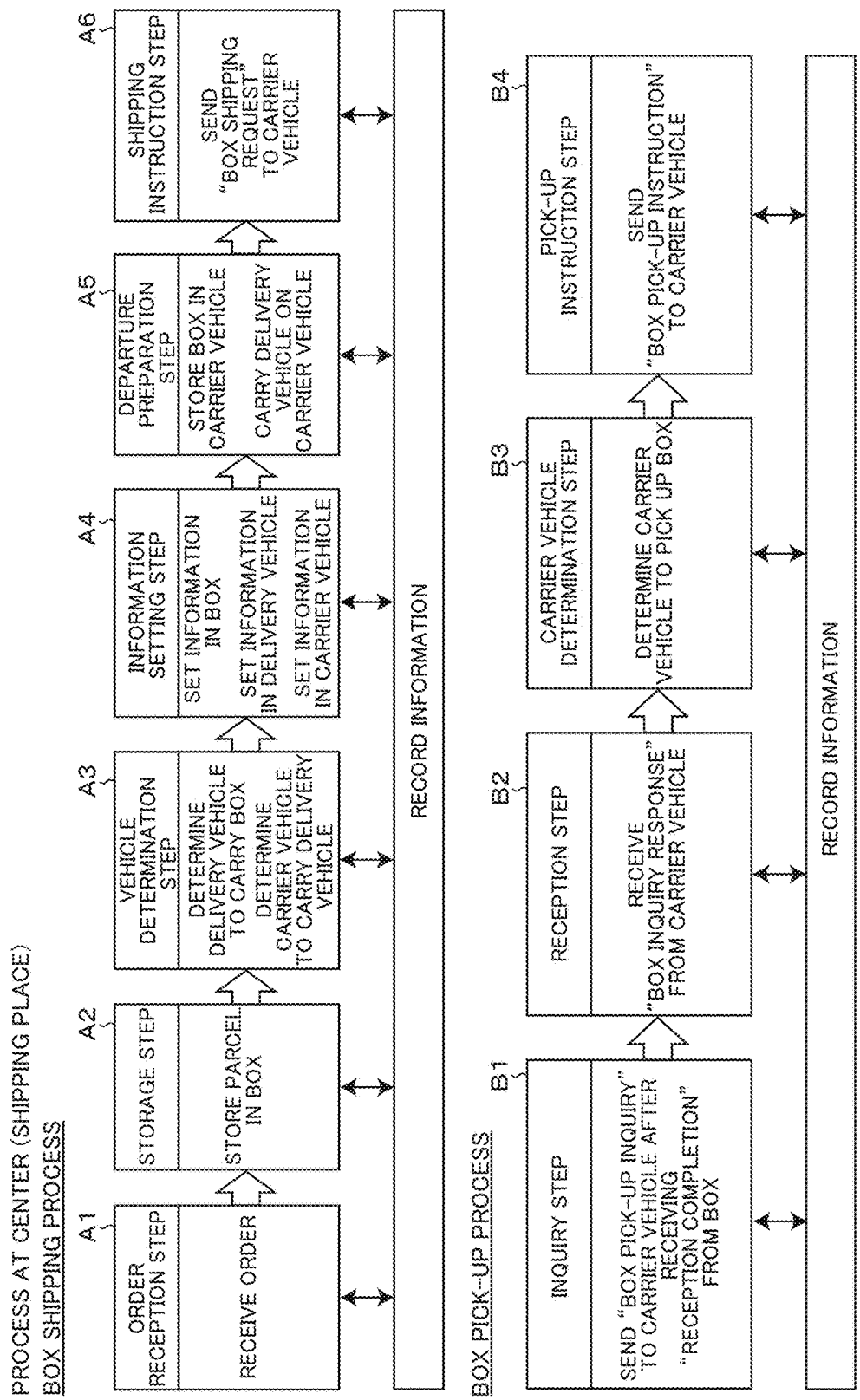
FIG. 3 is a drawing showing an operation process (working process) which is performed in a shipping place constituting the delivery system according to Embodiment 1 of the present invention.

FIG. 3 is a drawing showing an operation process (working process) which is performed in a shipping place constituting the delivery system 1 according to an embodiment of the present invention.

As described above, the center 10 shown in FIG. 3 is a generic term for a merchandise controlling center, a delivery center (shipping place), and a monitoring center. FIG. 3 shows explanation for each of steps of "box shipping process" and "box pick-up process" at the center 10.

First, "box shipping process" for shipping the delivery box 300 to the delivery destination 20 will be described.

In the box shipping process, first "order reception step A1" is performed to receive an order of an item. The order reception step receives the order via an EC site that enables e-commerce.

After the order is received in the order reception step, "storage step A2" is performed to store the ordered item in the delivery box 300 as a parcel.

In this storage step, the delivery box 300 suitable for the delivery of the parcel is selected from among a plurality of delivery box 300 based on the size, shape, quantity and impact resistance of the parcel, and the item is packaged as the parcel and stored in the delivery box 300.

Next, "vehicle determination step A3" is performed to determine the delivery vehicle 200 to carry the delivery box 300 having stored the parcel in the storage step, and to determine the carrier vehicle 100 to carry the delivery vehicle 200.

After the vehicles for delivery are determined in the vehicle determination step, "information setting step A4" is performed to set or store predetermined information in the storage device of each of the delivery box 300, the delivery vehicle 200 and the carrier vehicle 100.

In the information setting step, first, the storage device of the delivery box 300 stores at least delivery vehicle identification information (delivery vehicle ID) to identify the delivery vehicle 200 carrying the delivery box 300 thereon, and delivery destination information that designates the delivery destination 20. Second, the storage device of the delivery vehicle 200 stores at least delivery box identification information that identifies the delivery box 300 to be carried on the delivery vehicle 200, authentication information, carrier vehicle identification information (carrier vehicle ID) that identifies the carrier vehicle 100 to carry the delivery vehicle 200 thereon, and delivery destination information that designates the delivery destination 20. Third, the storage device of the carrier vehicle 100 stores the delivery vehicle ID that identifies the delivery vehicle 200 to be carried on the carrier vehicle 100, the delivery destination information that designates the delivery destination 20, and box management information that manages the location of the delivery box 300 in the carrier vehicle 100.

After the information is set in the storage device of each of the delivery box 300, the delivery vehicle 200, and the carrier vehicle 100 in the information setting step, "departure preparation step A5" is performed to prepare for departure by storing the delivery box 300 in the carrier vehicle 100 and carrying the delivery vehicle 200 on the carrier vehicle 100.

After the departure preparation is completed in the departure preparation step, "shipping instruction step A6" is performed to instruct the shipping by issuing "box shipping request" to the carrier vehicle 100.

After the above-described process, the carrier vehicle 100 can depart from the center 10 to the delivery destination 20.

Next, "box pick-up process" to pick up the delivery box 300 delivered to the delivery destination 20 will be described.

In the box pick-up process, first "inquiry step B1" is performed to send "inquiry about box pick-up" from the center 10 to a predetermined carrier vehicle 100 after the center 10 receives "reception completion" indicating that the parcel has been taken out of the delivery box 300.

After sending "inquiry about box pick-up" from the center 10 to the predetermined carrier vehicle 100 in the inquiry step B1, "reception step B2" is performed to receive "box inquiry response" indicating that the carrier vehicle 100 carries the delivery vehicle 200 without the delivery box 300 and therefore can pick up the delivery box 300, or that the carrier vehicle 100 carries no delivery vehicle 200 without the delivery box 300 and therefore cannot pick up the delivery box 300, from the carrier vehicle 100 having received the inquiry.

In this case, the carrier vehicle 100 may send "box inquiry response" with information required for the center 10 to determine the carrier vehicle 100 for picking up the delivery box 300, such as the present location, and the number of remaining parcels to be delivered.

Next, after receiving the box inquiry response from each of the carrier vehicles 100, "carrier vehicle determination step B3" is performed to determine the carrier vehicle 100 for picking up the delivery box 300, based on the box inquiry response received from each of the carrier vehicles 100.

In this carrier vehicle determination step B3, the carrier vehicle 100 for picking up the delivery box 300 is determined from among the carrier vehicles 100 carrying the delivery vehicles 200 without the delivery box 300, taking into account the distance or the traveling path to the delivery destination 20 at which the delivery box 300 to be picked up is located.

Next, after determining the carrier vehicle 100 for picking up the delivery box 300 in the carrier vehicle determination step B3, "pick-up instruction step B4" is performed to send "box pick-up instruction" to the determined carrier vehicle 100.

Upon receiving the box pick-up instruction in the pick-up instruction step B4, the carrier vehicle 100 searches the delivery route, as a pick-up route, of the delivery box 300 to pick up the delivery box 300.

The center 10 sends instructions for delivery and pick-up of the delivery box 300 through the above-described processes.

<3. Details of the Configuration of the Carrier Vehicle>

Figure 4:
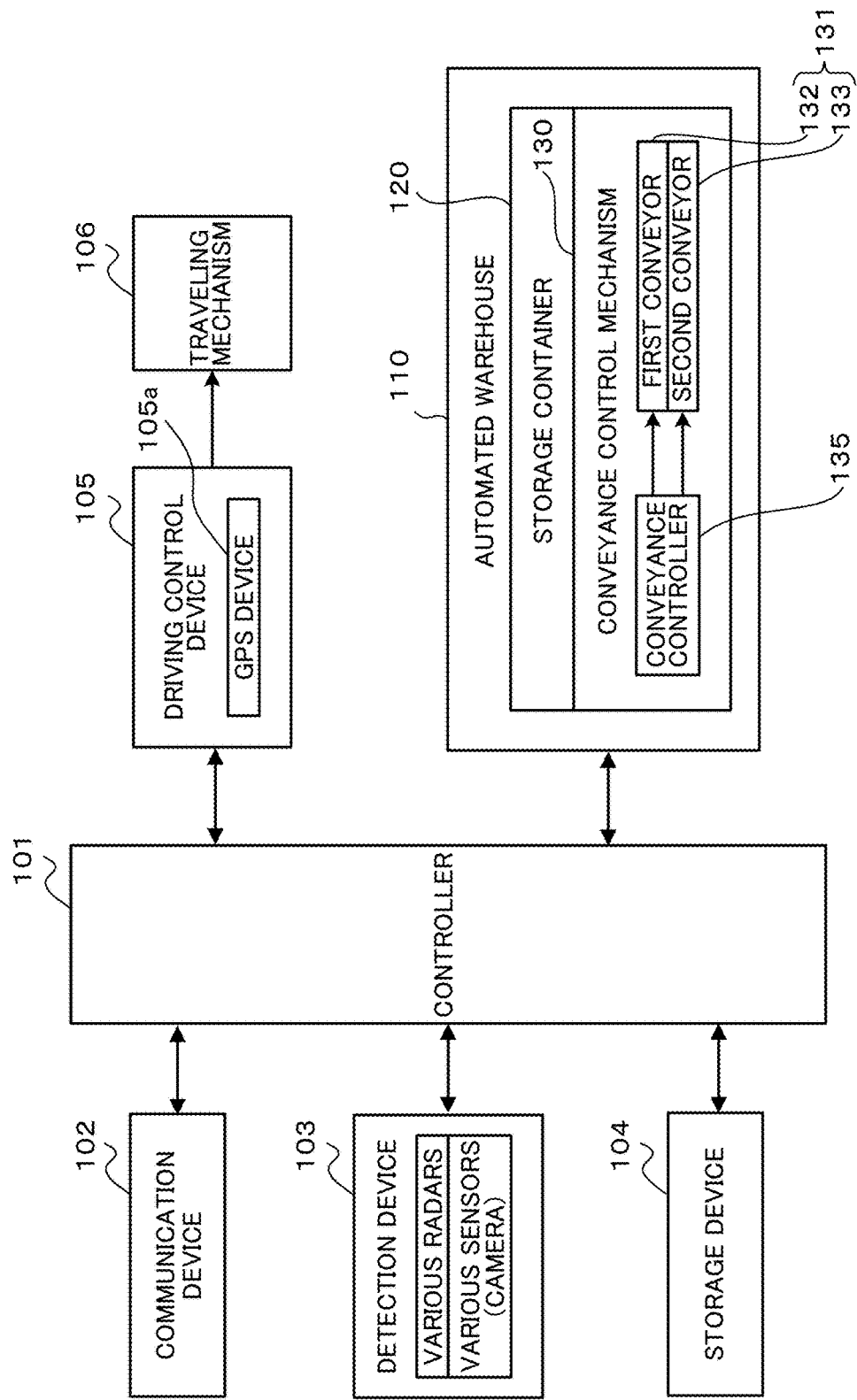
FIG. 4 is a drawing showing the electrical configuration of a carrier vehicle according to Embodiment 1 of the present invention.
Figure 5:
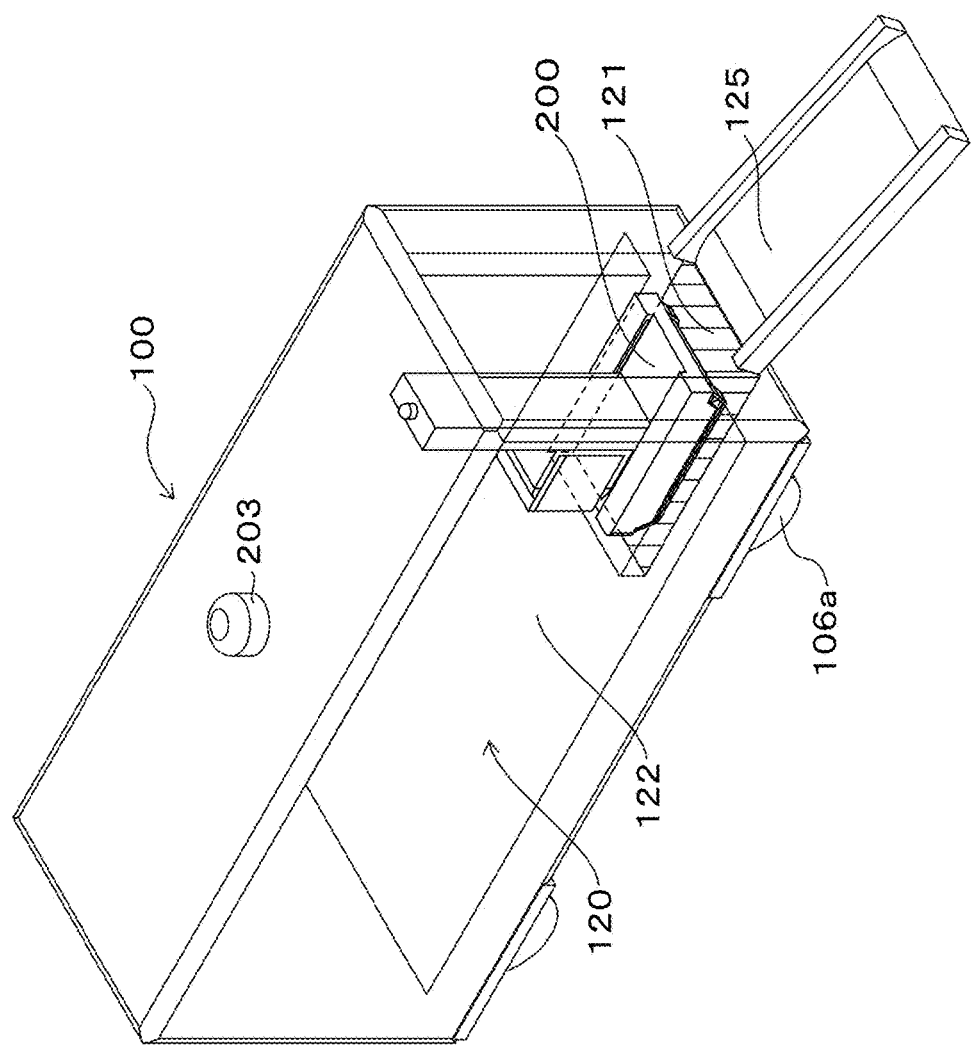
FIG. 5 is a drawing showing the exterior configuration of the carrier vehicle according to Embodiment 1 of the present invention.
Figure 6:
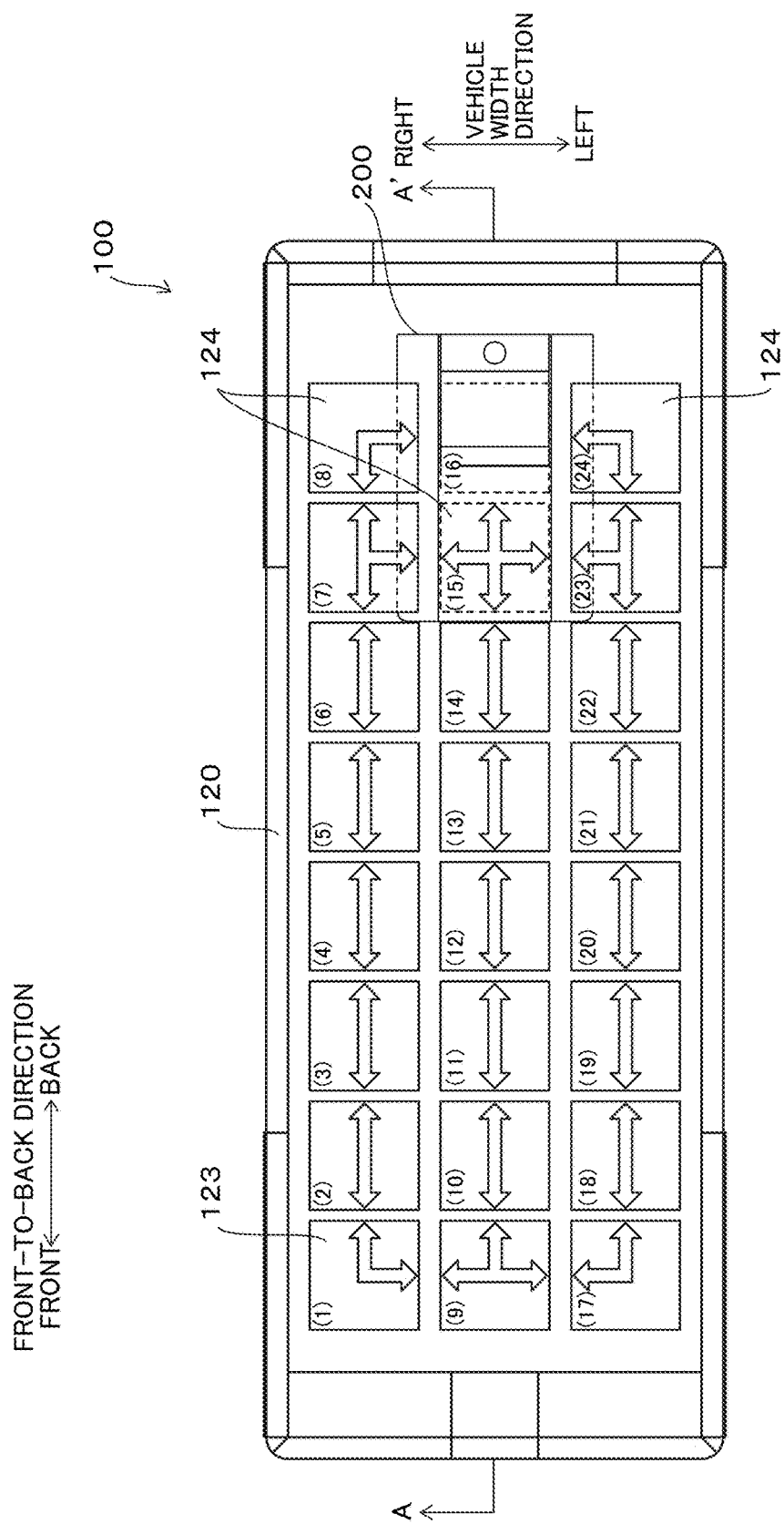
FIG. 6 is a top perspective view showing the interior configuration of a storage container of an automated warehouse according to Embodiment 1 of the present invention.
Figure 7:
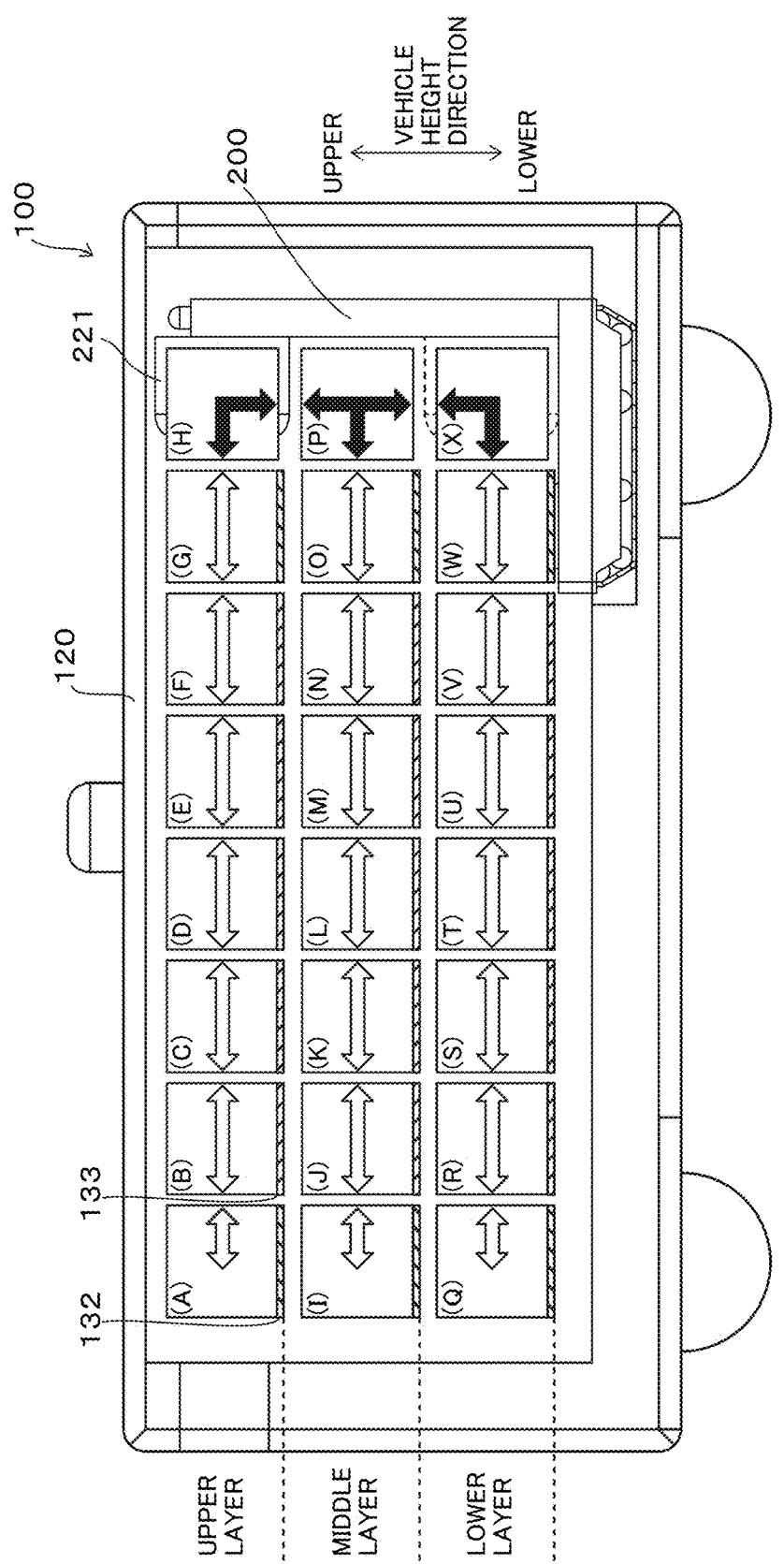
FIG. 7 is a drawing showing the interior configuration of the storage container of the automated warehouse according to Embodiment 1 of the present invention, taken along line A-A' of FIG. 6.
Figure 8:
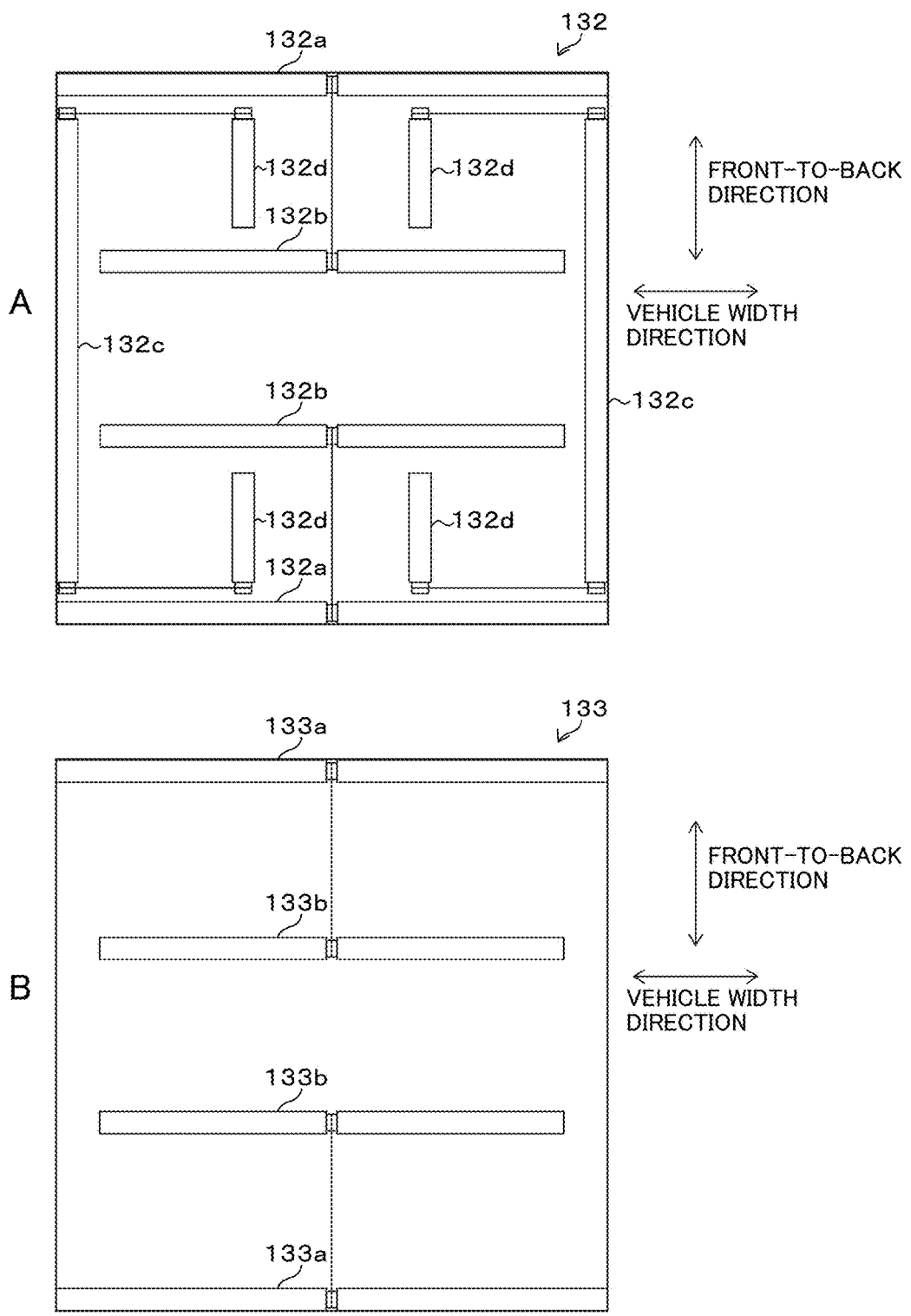
FIG. 8 is a drawing showing conveyors constituting a conveyance control mechanism of the automated warehouse according to Embodiment 1 of the present invention.

FIG. 4 is a drawing showing the electrical configuration of the carrier vehicle 100 according to Embodiment 1 of the present invention. FIG. 5 is a drawing showing the exterior configuration of the carrier vehicle 100 according to Embodiment 1 of the present invention. FIG. 6 is a top perspective view showing the interior configuration of a storage container 120 of an automated warehouse 110 according to Embodiment 1 of the present invention. FIG. 7 is a drawing showing the interior configuration of the storage container 120 of the automated warehouse 110 according to Embodiment 1 of the present invention, taken along line A-A' of FIG. 6. FIG. 8 is a drawing showing conveyors 131 constituting a conveyance control mechanism 130 of the automated warehouse 110 according to Embodiment 1 of the present invention. FIG. 8A shows a first conveyor 132, which is one type of the conveyors 131, and FIG. 8B shows a second conveyor 133, which is the other type of the conveyors 131.

As shown in FIG. 4, the carrier vehicle 100 includes a controller 101, a communication device 102, a detection device 103, a storage device 104, a driving control device 105, a traveling mechanism 106, and the automated warehouse 110.

The controller 101 may be a control unit that comprehensively controls all the functions of the carrier vehicle 100 including the automated driving control mechanism and the delivery control mechanism described above. The controller 101 may be, for example, an ECU (electronic control unit).

The communication device 102 may be a mobile communication unit that can mutually communicate with each of the center 101 and the delivery vehicle 200. The communication device 102 may mutually communicate with a different carrier vehicle 100.

The detection device 103 may include various radars and various sensors for recognizing objects or situations around the carrier vehicle 100, such as other cars around itself, pedestrians, animals, a falling object, grooves, bumps, driving lanes defined by center lines, and traffic lights. Various radars and sensors as the detection device 103 may be, for example, a laser sensor, an infrared sensor, an ultrasonic sensor, a pyroelectric sensor, and a 3D-LiDAR (3D light detection and ranging). The sensors may include a camera. The detection device 103 comprehensively recognizes the situation around the carrier vehicle 100 based on information obtained by a facial recognition system with a camera, and a human body detection system. By this means, the carrier vehicle 100 can safely drive or travel to the relay point 21 or a location near the relay point 21, avoiding various risks on the road.

The storage device 104 stores various kinds of information required to perform various control processes by the automated driving control mechanism and the delivery control mechanism described above. The storage device 104 stores various kinds of information, including information sent and received by mutual communication with each of the center 10 and the delivery vehicle 200, and also information to allow automated driving on the delivery route. The storage device 104 stores, for example, information on the delivery destination 20 (delivery information), map information used to determine the delivery route to the delivery destination 20, road information on the road which is the traveling route (traveling path) of the carrier vehicle 100, and traffic information. Moreover, the storage device 104 stores "box management information" to manage the location of the delivery box 300 stored in the automated warehouse 110.

The driving control device 105 may be a control unit that controls the traveling mechanism 106 of the carrier vehicle 100. The traveling mechanism 106 may be a vehicle mechanism for the traveling of the carrier vehicle 100. The traveling mechanism 106 may include, for example, an engine, driving wheels 106*a*, various actuators, a motor such as a servomotor and an inwheel motor, and a cylinder. The driving wheels 106*a* to allow the carrier vehicle 100 to travel on the road are shown in FIG. 5, as an example of the traveling mechanism 106.

The driving control device 105 controls the driving of the traveling mechanism 106 to allow the carrier vehicle 100 to travel or drive (move or stop). To be more specific, the driving control device 105 controls the driving of the traveling mechanism 106 to translate the carrier vehicle 100 not only back and forth, but also side to side, or in an oblique direction, and to rotate the carrier vehicle 100 on the spot, in order for parallel park or change in direction of the carrier vehicle 100 in a narrow place such as a narrow alley.

The driving control device 105 also includes a GPS (global positioning system) device 105*a* that can specify a position, or position a point on the map information. Moreover, the driving control device 105 includes a receiver that can be connected to VICS (vehicle information and communication system) or a similar road traffic information communication system, and therefore can acquire road information and traffic information provided by the system.

The driving control device 105 searches a delivery route (traveling route) from the current location to the delivery destination 20 by using the GPS device 105*a* and various information such as map information, road information and traffic information stored in the storage device 104, and stores the searched delivery route, and therefore the carrier vehicle 100 drives or travels based on the delivery route. Naturally, the driving control device 105 can update or change the delivery route as needed, based on additional traffic information and road information.

The automated warehouse 110 is configured to be able to store one or more delivery boxes 300, and to change the location of the delivery box 300 in the automated warehouse 110 without a worker. The automated warehouse 110 conveys the delivery box 300 to a predetermined location ("receipt location" described later), based on an instruction from the controller 101. The delivery box 300 conveyed to the predetermined location is received by the arm of the delivery vehicle 200 and carried on the delivery vehicle 200.

The automated warehouse 110 includes the storage container 120 and the conveyance control mechanism 130.

The storage container 120 is a storeroom to store one or more delivery boxes 300. As shown in FIG. 5, the storage container 120 forms the vehicle interior of the carrier vehicle 100. That is, the carrier vehicle 100 is an automated driverless vehicle for delivery, which does not need any space for a driver, and therefore the storage container 120 can be formed as the vehicle interior of the carrier vehicle 100.

A door 125 is provided in the rear side of the storage container 120, which serves as a gateway for the delivery vehicle 200. The door 125 serves as an entrance pathway and an exit pathway when the delivery vehicle 200 enters and exits the carrier vehicle 100.

In the storage container 120, a main space 122 in which the delivery boxes 300 are stored, and a carrying space 121 on which the delivery vehicle 200 is carried.

The carrying space 121 is a standby area in which the delivery vehicle stands by, and also is a working area in which the carrier box 300 is carried on the delivery vehicle 300 to prepare for the delivery. That is, the storage container 120 may store not only the delivery boxes 300 but also the delivery vehicle 200.

In the main space 122, a rack (not shown) configured to stack and store a plurality of delivery boxes 300 is provided, and this rack includes a plurality storage regions 123 in which the plurality of delivery boxes 300 are stored, respectively. That is, the main space 122 is defined by the plurality of storage regions 123. The locations of the plurality of storage regions 123 correspond to the locations at which the plurality of delivery boxes 300 are stored.

As shown in FIG. 6, the plurality of storage regions 123 are arranged side by side in a matrix along the floor surface which is an approximately even flat surface of the storage container 120. In addition, as shown in FIG. 7, the plurality of storage regions 123 are arranged side by side and vertically stacked along the height direction of the storage container 120, that is, the height direction of the carrier vehicle 100. Here, the area near the door 125 is defined as the carrying space 121 on which the delivery vehicle 200 is carried. This carrying space 121 and the plurality of storage regions 123 arranged side by side in a matrix along the floor surface of the storage container 120 form one layer or stage, and the interior of the storage container 120 is formed by stacking a plurality of layers or stages.

The delivery vehicle 200 located in the carrying space 121 can receive the delivery box 300 located in the storage region 123 adjacent to the carrying space 121. Hereinafter, among the storage regions 123 in the storage container 120, the storage region 123 adjacent to the carrying space 121 will be referred to as "receipt region 124." In addition, the location of the receipt region 124 will be referred to as "receipt location." a plurality of receipt regions 124 may be provided for each layer.

In an exemplary configuration shown in FIGS. 6 and 7, eight regions are arranged in the front-to-back direction of the carrier vehicle 100, and three columns of the eight regions are arranged in the width direction of the carrier vehicle 100, so that twenty-four regions are arranged for each layer. Then, three layers "upper layer", "middle layer" and "lower layer" are arranged, each of which is constituted by the twenty-four regions arranged in a matrix along the floor surface of the storage container 120. That is, in the configuration shown in FIGS. 6 and 7, seventy-two regions are defined in the interior space of the storage container 120. In other words, in the configuration shown in FIGS. 6 and 7, seventy-two regions are provided in the storage container 120.

In FIGS. 6 and 7, (1) to (24) and (A) to (X) are reference signs to indicate the locations of the plurality of regions defined in the storage container 120. Hereinafter, for example, the location of the region located at (16) when the interior of the storage container 120 is viewed from above, and located at (H) when the interior of the storage container 120 is viewed from the side will be identified as (16, H).

Here, among the regions defined in the storage container 120, three regions (16, H), (16, P) and (16, H) correspond to the carrying space 121. Meanwhile, sixty-nine regions other than the regions (16, H), (16, P) and (16, X) are the storage regions 123. In addition, among the sixty-nine regions 123, nine regions (8, H), (8, P), (8, X), (24, H), (24, P), (24, X), (15, G), (15, O) and (15, W) are the receipt regions 124.

Moreover, some of the storage regions 123 do not store the delivery box 300 but are empty (empty regions) in advance since the departure preparation step A5, in order to change the location of the delivery box 300. To be more specific, in FIGS. 6 and 7, one of sixty-nine storage regions 123 is empty in any layer. For example, in FIGS. 6 and 7, the storage region 123 at (15, G) which is one of the receipt regions 124 in the upper layer is empty in advance. Therefore, in the configuration shown in FIGS. 6 and 7, the storage container 120 can store up to sixty-eight delivery boxes 300. Here, a layer having no empty storage region 123 may be referred to as "full layer" of the delivery boxes 300.

The conveyance control mechanism 130 is configured to control change in the location of the delivery box 300 in the automated warehouse 110. To be more specific, the conveyance control mechanism 130 performs control to convey the delivery box 300 located in the storage region 123 (storage location) to a different storage region 123 in the storage container 120.

The conveyance control mechanism 130 includes a plurality of conveyors 131 and a conveyance controller 135.

The plurality of conveyors 131 are configured to convey the delivery box 300 located in the storage region 123 (storage location) to a different next storage region 123. As shown in FIG. 8, each of the plurality of conveyors 131 is formed by for example, a pulley roller conveyor. As shown in FIG. 7, the plurality of conveyors 131 are provided for the plurality of storage regions 123 in the storage container 120, respectively. In addition, the plurality of conveyors 131 and the plurality of storage regions 123 are associated with each other.

Moreover, each of the conveyors 131 is equipped with a sensor that can detect identification information of the delivery box 300 placed on the corresponding conveyor 131. The carrier vehicle 100 can acquire the identification information of the delivery box 300 located in each of the plurality of storage regions 123, based on the information detected by the sensor.

In addition, each of the conveyors 131 is equipped with a restraining device for restraining the delivery box 300 placed on the corresponding conveyor 131. While the carrier vehicle 100 is traveling, the delivery boxes 300 are restrained by the restraining devices, so that it is possible to prevent the positions of the delivery boxes 300 from being shifted.

The plurality of conveyors 131 are constituted by at least two types of conveyors. Hereinafter, one of the at least two types of the conveyers 131 will be referred to as "first conveyor 132" and the other type will be referred to as "second conveyor 133."

The first conveyors 132 can convey the delivery boxes 300 in the front-to-back direction and the width direction of the carrier vehicle 100. The first conveyors 132 are provided for at least the receipt regions 124 of the plurality of storage regions 123.

In FIGS. 6 and 7, white arrows indicate the directions in which the first conveyors 132 and the second conveyors 132 convey the delivery boxes 300.

For example, in an exemplary configuration shown in FIGS. 6 and 7, the first conveyors 132 are provided for the receipt regions 124 at (8, H), (8, P), (8, X), (24, H), (24, P) (24, X), (15, G), (15, O) and (15, W). In addition, the first conveyors 132 are provided for the storage regions 123 at (7, G), (7, O), (7, W), (23, G), (23, O), (23, W), (1, A), (1, I) (1, Q), (9, A), (9, I), (9, Q), (17, A), (17, I), and (17, Q).

As shown in FIG. 8A, the first conveyor 132 is constituted by pulley motor rollers 132a, pulley free rollers 132b, pulley motor rollers 132c and pulley free rollers 132d.

The motor rollers 132a and the free rollers 132b constitute a conveyor for conveying the delivery box 300 in the front-to-back direction of the carrier vehicle 100. The motor rollers 132a and the free rollers 132b are provided such that their longitudinal direction extends approximately perpendicular to the front-to-back direction of the carrier vehicle 100.

Meanwhile, the motor rollers 132c and the free rollers 132d constitute a conveyor for conveying the delivery box 300 in the width direction of the carrier vehicle 100. The motor rollers 132c and the free rollers 132d are provided such that their longitudinal direction extends approximately perpendicular to the width direction of the carrier vehicle 100.

The first conveyor 132 further includes a mechanism for moving the motor rollers 132a, the free rollers 132b, the motor rollers 132c, and the free rollers 132d up and down in the height direction of the carrier vehicle 100 to disconnect the delivery box 300. For example, when the first conveyor 132 conveys the delivery box 300 in the front-to-back direction of the carrier vehicle 100, the motor rollers 132c and the free rollers 132d disconnect the delivery box 300. Meanwhile, when the first conveyor 132 conveys the delivery box 300 in the width direction of the carrier vehicle 100, the motor rollers 132a and the free rollers 132b disconnect the delivery box 300. By this means, the first conveyor 132 can convey the delivery box 300 both in the front-to-back direction and the width direction of the carrier vehicle 100.

The second conveyors 133 can convey the delivery box 300 in the front-to-back direction of the carrier vehicle 100. The second conveyors 133 are provided for at least the storage regions 123 except the receipt regions 124.

In the configuration shown in FIGS. 6 and 7, the second conveyors 133 are provided for the storage regions 123 at, for example, (2, B), (2, J), and (2, R) with white arrows extending only in the front-to-back direction of the carrier vehicle 100.

As shown in FIG. 8B, the second conveyor 133 is constituted by pulley motor rollers 133a and pulley free rollers 133b.

The motor rollers 133a and the free rollers 133b constitute a conveyor for conveying the delivery box 300 in the front-to-back direction of the carrier vehicle 100. The motor rollers 133a and the free rollers 133b are provided such that their longitudinal direction extends approximately perpendicular to the front-to-back direction of the carrier vehicle 100.

The conveyance controller 135 is a control unit that controls the plurality of conveyors 131. For example, the conveyance controller 135 controls the plurality of conveyors 131 to convey the delivery box 300 located in the storage region 123 to the receipt region 124 (receipt location) in the carrier container 120. In this case, the conveyance controller 135 controls at least one type of the first conveyors 132 and the second conveyors 133.

In addition, the carrier vehicle 100 includes a monitoring camera that can monitor the surrounding of the carrier vehicle 100, a microphone and a speaker at its predetermined portions. When an emergency or a trouble occurs in the carrier vehicle 100, maintenance and monitoring staff at the center 10, in particular, a monitoring center in mutual communication with the carrier vehicle 100 can check the situation around the carrier vehicle 100 by the monitoring camera of the carrier vehicle 100 and talk with persons around the carrier vehicle 100. Moreover, the maintenance and monitoring staff can operate to drive the carrier vehicle 100 by remote control, checking the situation around the carrier vehicle 100 by using a camera.

<4. Details of the Configuration of the Delivery Vehicle>

Figure 9:
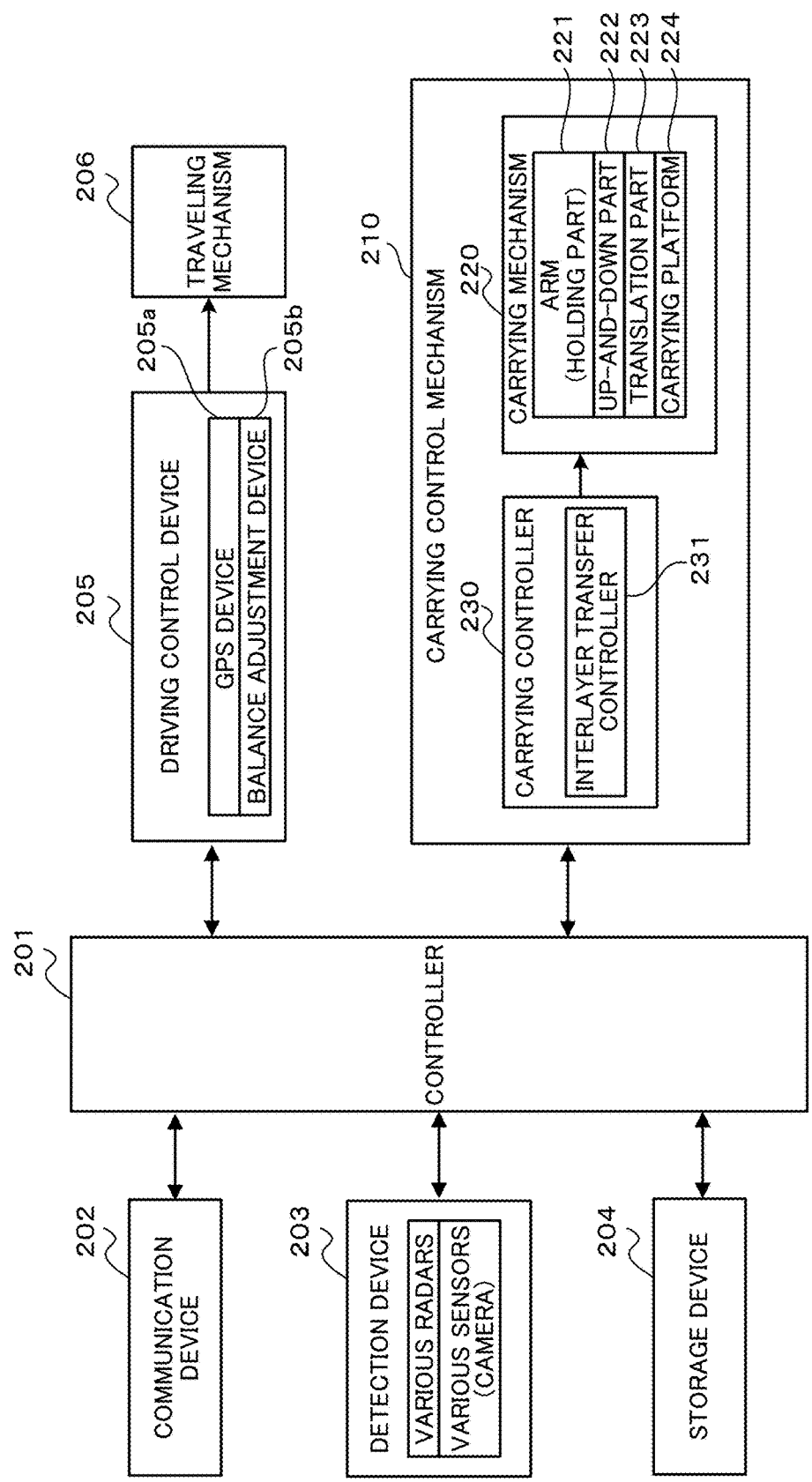
FIG. 9 is a drawing showing the electrical configuration of a delivery vehicle according to Embodiment 1 of the present invention.
Figure 10:
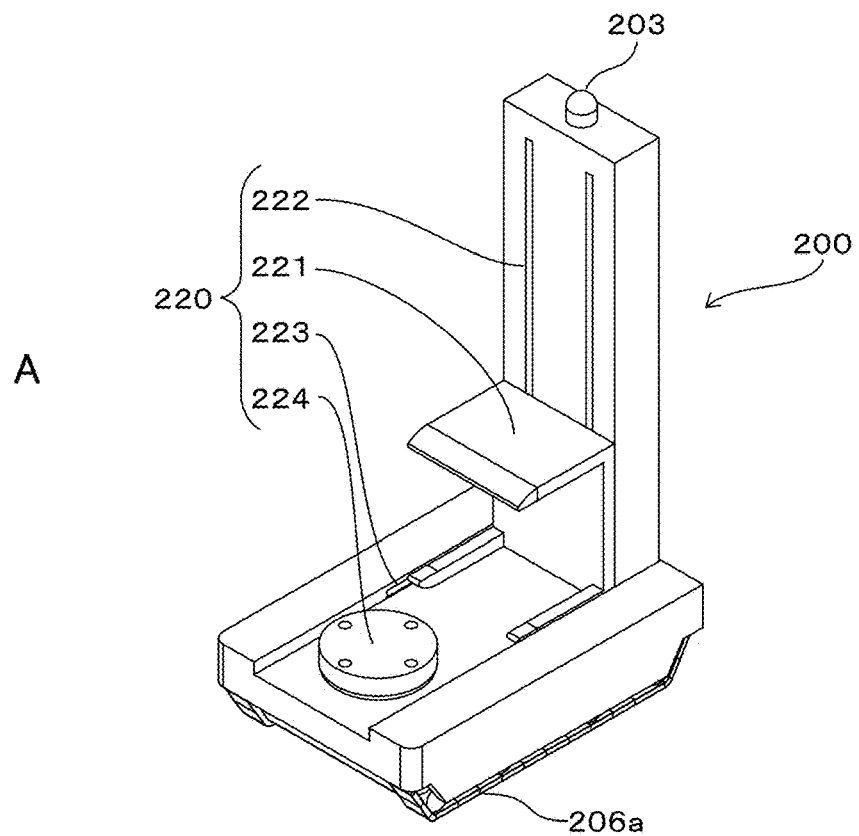
FIG. 10 is a drawing showing the exterior configuration of the delivery vehicle according to Embodiment 1 of the present invention.
Figure 10:
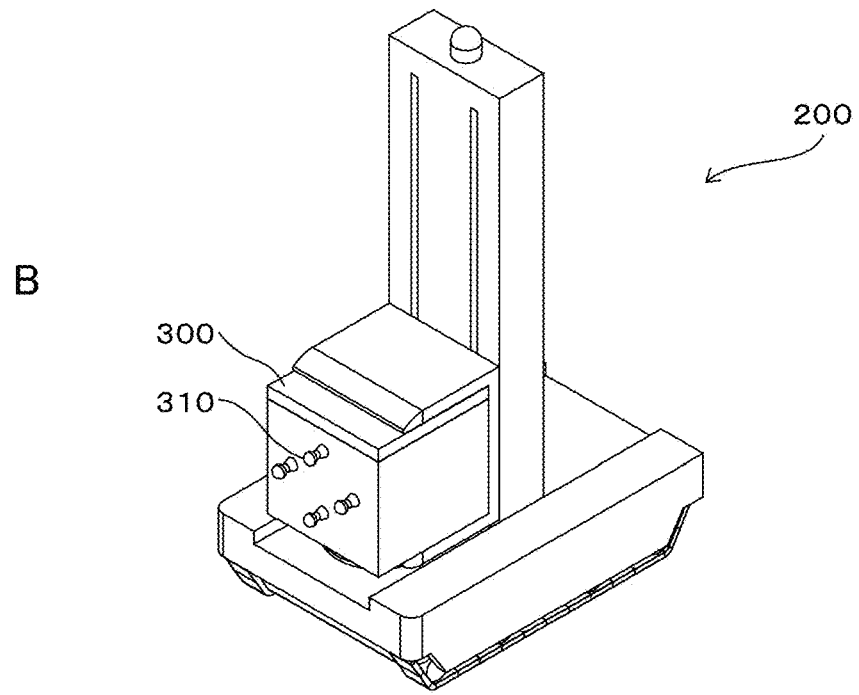

FIG. 9 is a drawing showing the electrical configuration of the delivery vehicle 200 according to Embodiment 1 of the present invention. FIG. 10 is a drawing showing the exterior configuration of the delivery vehicle 200 according to Embodiment 1 of the present invention. FIG. 10A shows a state in which the delivery vehicle 200 carries no delivery box 300. FIG. 10B shows a state in which the delivery vehicle 200 carries the delivery box 300 thereon.

As shown in FIG. 9, the delivery vehicle 200 includes a controller 201, a communication device 202, a detection device 203, a storage device 204, a driving control device 205, a traveling mechanism 206, and a carrying control mechanism 210.

The controller 201 may be a control unit that comprehensively controls all the functions of the delivery vehicle 200 including the automated driving control mechanism and the delivery control mechanism described above. The controller 201 may be, for example, an ECU (electronic control unit).

The communication device 202 may be a mobile communication unit that can mutually communicate with each of the center 101 and the carrier vehicle 100. The communication device 202 may mutually communicate with the delivery box 300, and with the recipient of the delivery destination 20. Moreover, the communication device 202 may mutually communicate with a different delivery vehicle 200.

The detection device 203 may include various radars and various sensors for recognizing objects or situations around the delivery vehicle 200, such as other cars around itself, pedestrians, animals, a falling object, grooves, bumps, driving lanes defined by center lines, and traffic lights. Various radars and sensors as the detection device 103 may be, for example, a laser sensor, an infrared sensor, an ultrasonic sensor, a pyroelectric sensor, and a 3D-LiDAR. The sensors may include a camera. The detection device 203 comprehensively recognizes the situation around the delivery vehicle 200 based on information obtained by a facial recognition system with a camera, and a human body detection system. By this means, the delivery vehicle 200 can safely drive or travel to the delivery destination 20 or a location near the delivery destination 20, avoiding various risks on the road. In addition, the detection device 203 may be used to check the positions of the slots 410 of the delivery box fixture 400.

The storage device 204 stores various kinds of information required to perform various control processes by the automated driving control mechanism and the delivery control mechanism described above. The storage device 204 stores various kinds of information, including information sent and received by mutual communication with the center 10, the carrier vehicle 100, and the delivery box 300, and also information to allow automated driving on the delivery route. The storage device 204 stores, for example, information on the delivery destination 20 (delivery information), map information used to determine the delivery route to the delivery destination 20, road information on the road which is the traveling route (traveling path) of the delivery vehicle 200, and traffic information.

The driving control device 105 may be a control unit that controls the traveling mechanism 106 of the delivery vehicle 200. The traveling mechanism 206 may be a vehicle mechanism for the traveling of the delivery vehicle 200. The traveling mechanism 206 may include, for example, an engine, driving wheels 206a, various actuators, a motor such as a servomotor and an inwheel motor, and a cylinder. The driving wheels 206a to allow the delivery vehicle 200 to travel on the road are shown in FIG. 10, as an example of the traveling mechanism 206. The driving wheels 206 are formed as crawlers that can run on uneven and irregular ground.

The driving control device 205 controls the driving of the traveling mechanism 206 to allow the delivery vehicle 200 to travel or drive (move or stop). To be more specific, the driving control device 205 controls the driving of the traveling mechanism 206 to translate the delivery vehicle 200 not only back and forth, but also side to side, or in an oblique direction, and to rotate the delivery vehicle 200 on the spot, in order for parallel park or change in direction of the delivery vehicle 200 in a narrow place such as a narrow alley.

Moreover, the driving control device 205 has a balance control function to prevent the delivery vehicle 200 from overturning when the delivery vehicle 200 goes up and down stairs and travels on a slope. This balance control function detects the position of the center of gravity of the delivery vehicle 200 carrying the delivery box 300 point by point, and automatically adjusts the position of the center of gravity by using a balance adjustment device 205b (balancer). For example, the driving control device 205 holds the momentum at the center of gravity constant by using the balance adjustment device 205b to control the balance of the delivery vehicle 200. This balance adjustment device 205b can prevent the delivery vehicle 200 from overturning or falling due to collision or contact with an obstacle as possible.

In addition, the driving control device 205 also includes a GPS device 205a that can specify a position, or position a point on the map information. Moreover, the driving control device 205 includes a receiver that can be connected to VICS or a similar road traffic information communication system, and therefore can acquire road information and traffic information provided by the system.

The driving control device 205 searches a delivery route (traveling route) from the current location to the delivery destination 20 by using the GPS device 205a and various information such as map information, road information and traffic information stored in the storage device 204, and stores the searched delivery route, and therefore the delivery vehicle 200 drives or travels based on the delivery route. Naturally, the driving control device 205 can update or change the delivery route as needed, based on additional traffic information and road information.

The carrying control mechanism 210 is configured to control to carry the delivery box 300 to be delivered to the delivery destination 20 on the delivery vehicle 200, based on an instruction from the controller 201. To be more specific, the carrying control mechanism 210 is configured to perform control to receive the delivery box 300 conveyed to the receipt region 124 in the storage container 120 by the conveyance control mechanism 130 of the automated warehouse 110 and to carry the received delivery box 300 on the delivery vehicle 200. The delivery vehicle 200 delivers the delivery box 300 carried on the delivery vehicle 200 by the carrying control mechanism 210 to the delivery destination 20.

The carrying control mechanism 210 includes a carrying mechanism 220 and a carrying controller 230. As shown in FIG. 10A, the carrying mechanism 220 is constituted by an arm 221 (holding part), an up-and-down part 222, a translation part 223 and a carrying platform 224.

The arm 221 is means for realizing the delivery control mechanism of the delivery vehicle 200 as described above. As shown in FIG. 10B, the arm 221 holds the delivery box 300 carried on the delivery vehicle 200 during the delivery and fixes the delivery box 300 to the delivery box fixture 400.

In addition, when the delivery vehicle 200 is placed in the carrying space 121 in the storage container 120, the arm 221 can receive the delivery box 300 located in the receipt region 124 in the storage container 120 and put the delivery box 300 on the carrying platform 224. Then, the arm 221 holds the delivery box 300 on the carrying platform 224. By this means, the delivery box 300 is carried on the delivery vehicle 200. That is, the state in which the delivery box 300 is carried on the delivery vehicle 200 means that the delivery box 300 placed on the carrying platform 224 is held by the arm 221.

The up-and-down part 222 is a mechanism for moving the arm 221 up and down in the height direction of the delivery vehicle 200. The arm 221 and the up-and-down part 222 function as a lifter of the delivery vehicle 200.

The translation part 223 is a mechanism for translating the arm 221 in the front-to-back direction of the delivery vehicle 200.

The carrying platform 224 is formed as a flat pedestal so as to contact the bottom surface of the delivery box 300. Moreover, the carrying platform 224 includes a mechanism for turning the delivery box 300 thereon so as to change the direction of the delivery box 300.

The carrying controller 230 is a control unit for controlling the carrying mechanism 220. For example, when the carrying mechanism 220 receives the delivery box 300 located in the receipt region 124 in the storage container 120 and carries the delivery box 300 on the delivery vehicle 200, the carrying controller 230 drives each of the components of the carrying mechanism 220 in association with each other as follows.

First, the carrying controller 230 drives the up-and-down part 222 and the translation part 223 to move the arm 221 to the receipt region 124. Then, the carrying controller 230 drives the arm 221 having reached the receipt region 124 to hold the delivery box 300 located in the receipt region 124. Then, the carrying controller 230 drives the up-and-down part 222 and the translation part 223 to move the arm 221 holding the delivery box 300 to the carrying platform 224 to put the delivery box 224 on the carrying platform 224.

Moreover, the carrying controller 230 can drive each of the components of the carrying mechanism 220 to perform control to transfer the delivery box 300 located in the storage region 123 in a specified layer to a different layer in the storage container 120. Hereinafter, the control for transferring the delivery box 300 from the layer to a different layer in the storage container 120 will be referred to as "interlayer transfer control." In addition, a part of the function of the carrying controller 230 for controlling the carrying mechanism 220, which performs the interlayer transfer control, will be referred to as "interlayer transfer controller 231."

The black arrows shown in FIG. 7 indicate the directions in which the arm 221 moves to transfer the delivery box 300 held by the arm 221.

For example, in the configuration shown in FIGS. 6 and 7, the arm 221 can hold the delivery box 300 located in the receipt region 124 at (15, W) in the lower layer, and transfer this delivery box 300 to the empty receipt region 124 at (15, G) in the upper layer.

In addition, the delivery vehicle 200 includes a monitoring camera that can monitor the surrounding of the delivery vehicle 200, a microphone and a speaker at its predetermined portions. When an emergency or a trouble occurs in the delivery vehicle 200, maintenance and monitoring staff at the center 10, in particular, a monitoring center in mutual communication with the delivery vehicle 200 can check the situation around the delivery vehicle 200 by the monitoring camera of the delivery vehicle 200 and talk with persons around the delivery vehicle 200. Moreover, the maintenance and monitoring staff can operate to drive the delivery vehicle 200 by remote control, checking the situation around the delivery vehicle 200 by using a camera.

Moreover, when a person around the delivery vehicle 200 feels danger, the person can push or touch the emergency stop button, so that it is possible to stop the delivery vehicle 200 moving. Then, as described above, it is possible to check the situation around the delivery vehicle 200 by the monitoring camera of the delivery vehicle 200 and talk with persons around the delivery vehicle 200.

<5. Delivery State of the Delivery System>

FIGS. 11 to 14 show delivery states of the delivery system 1 according to an embodiment of the present invention.

Figure 11:
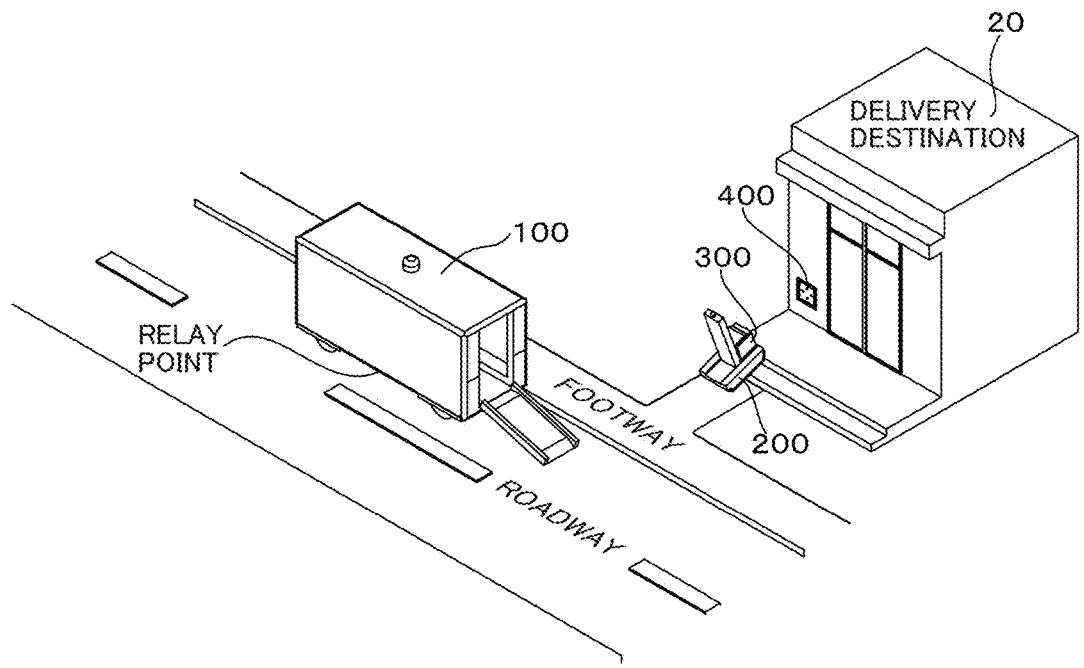
FIG. 11 is a drawing showing a delivery state of the delivery system according to Embodiment 1 of the present invention (1)

FIG. 11 shows a roadway, a footway along the roadway, a delivery destination pathway approximately perpendicular to the footway, steps (stairs) formed from the delivery destination pathway to the delivery box fixture 400 at the delivery destination 20. In addition, FIG. 11 shows a delivery destination designated region designated for each of the delivery destinations 20, which is provided beyond the stairs as region where the arm 221 can move to set the delivery box 300 in the delivery box fixture 400. Moreover, FIG. 11 shows the delivery box fixture 400 set on a wall surface of the delivery destination 20.

In FIG. 11, the carrier vehicle 100 stops by the side of the roadway at the relay point 21 (e.g., "relay point 1") for the delivery destination 20. At this relay point 21, the delivery vehicle 200 gets out of the carrier vehicle 100 through the door 125 as the exit pathway, and travels across the footway to the delivery destination pathway.

After passing through the delivery destination pathway, the delivery vehicle 200 climbs over the stairs and arrives at the delivery destination designated region. Then, the delivery vehicle 200 confirms the positions of the slots 410 of the delivery box fixture 400 to fix the delivery box 300 to the delivery box fixture 400.

Figure 12:
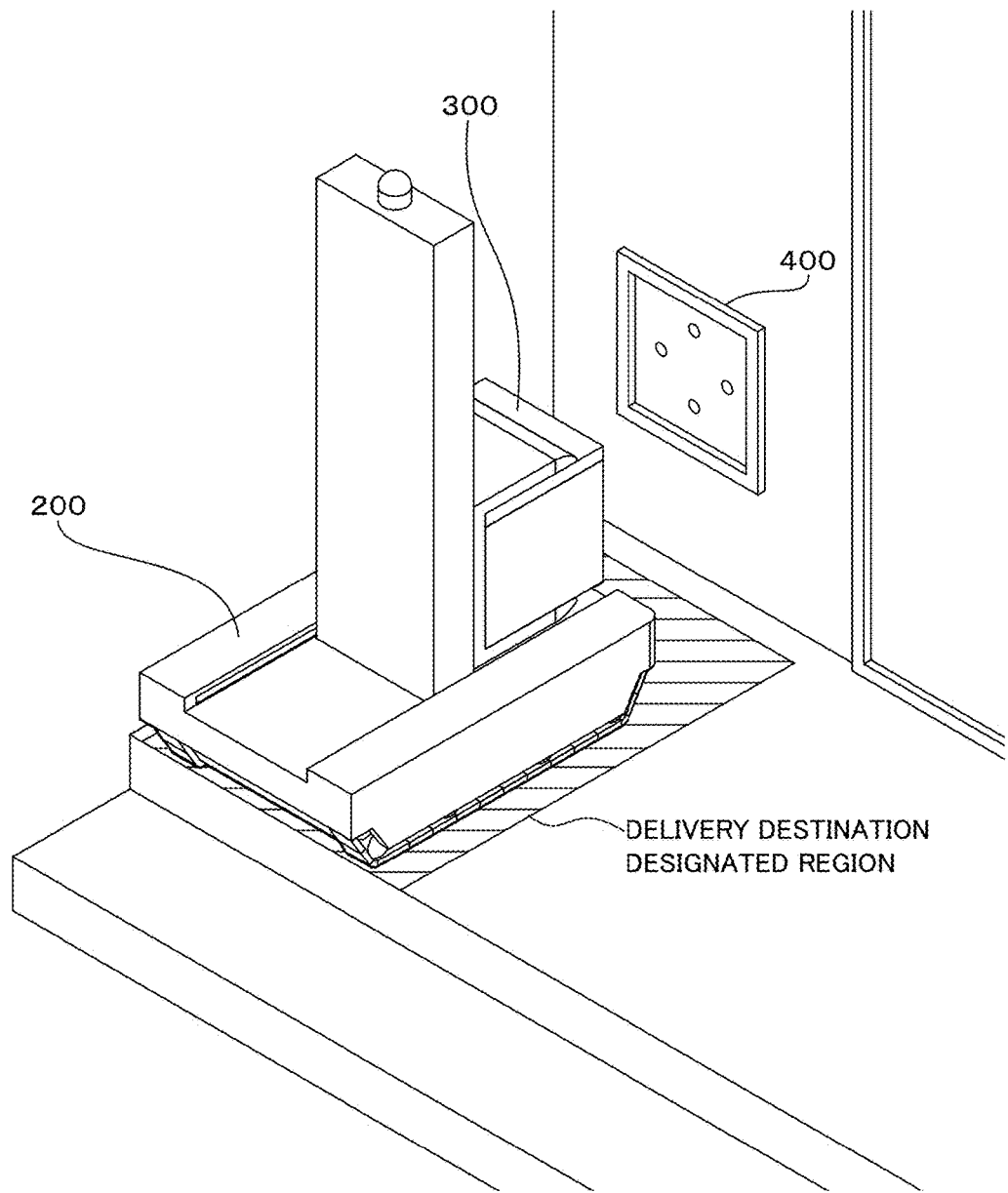
FIG. 12 is a drawing showing a delivery state of the delivery system according to Embodiment 1 of the present invention (2)
Figure 13:
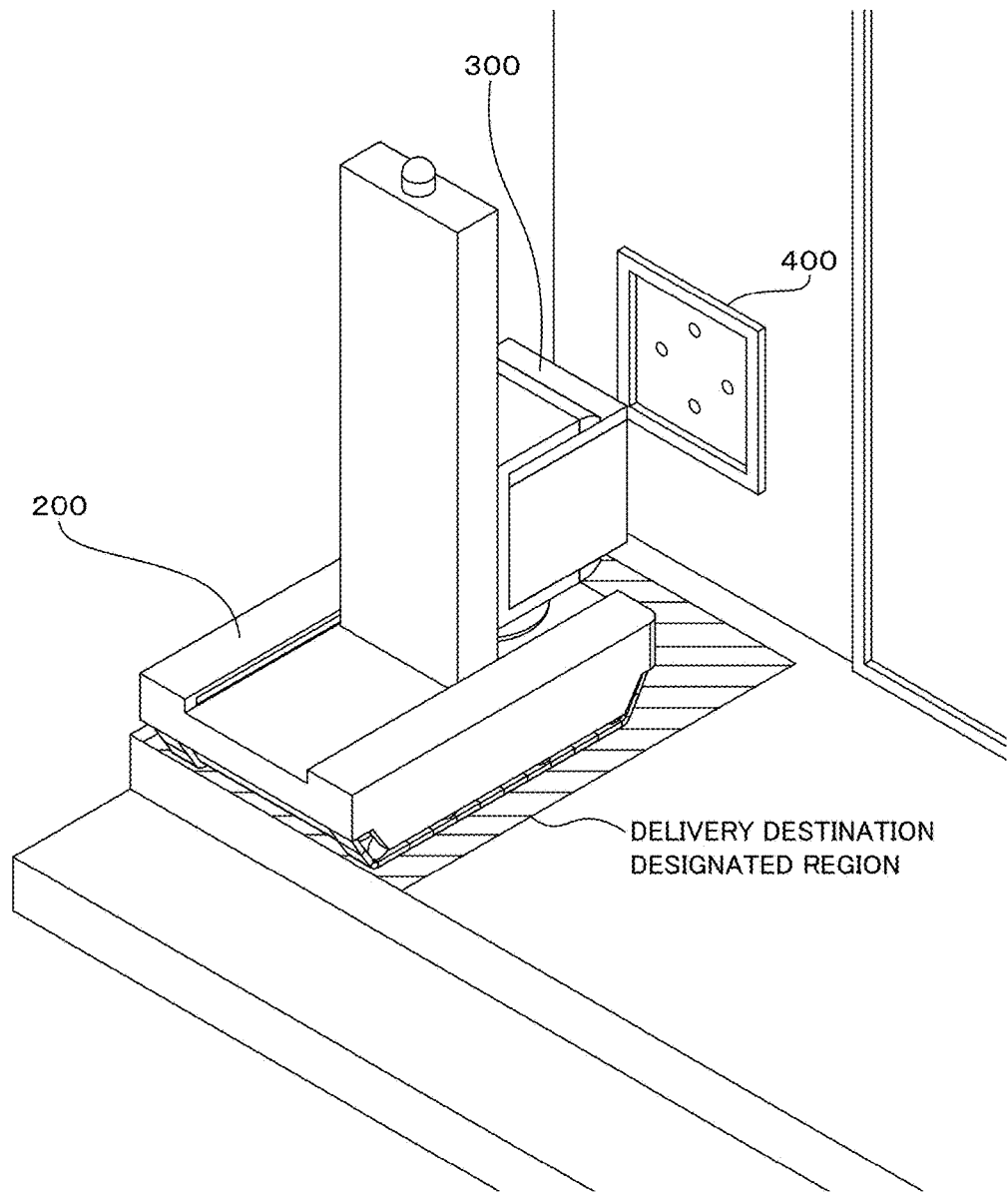
FIG. 13 is a drawing showing a delivery state of the delivery system according to Embodiment 1 of the present invention (3)
Figure 14:
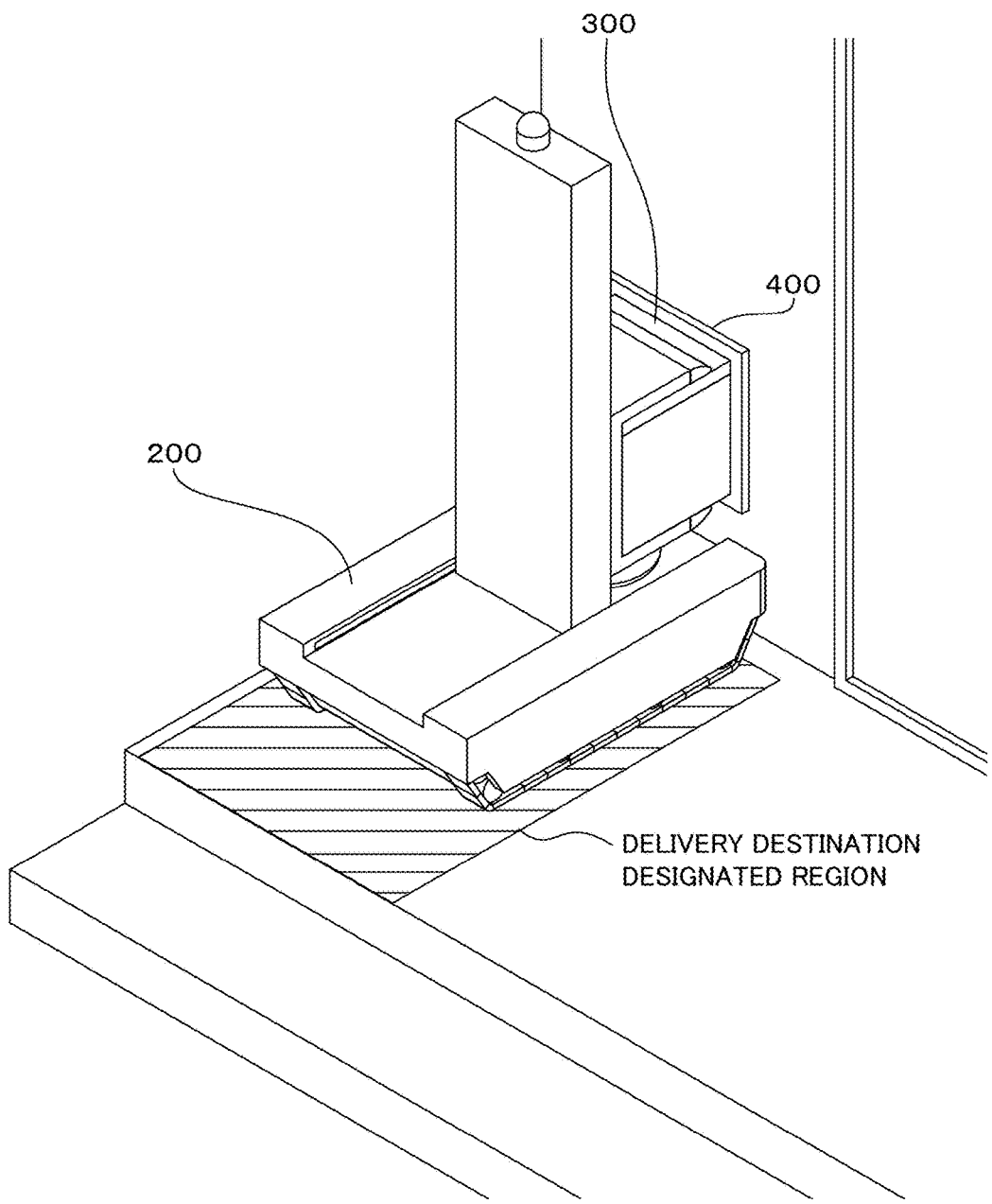
FIG. 14 is a drawing showing a delivery state of the delivery system according to Embodiment 1 of the present invention (4)

FIGS. 12 to 14 show how to fix the delivery box 300 to the delivery box fixture 400 by moving the arm 221 of the delivery vehicle 200 in the delivery destination designated region at the delivery destination 20.

This delivery destination designated region is a certain working area located in front of the delivery box fixture 400 where the arm 221 of the delivery vehicle 200 moves to fix the delivery box 300 to the delivery box fixture 400.

When the delivery vehicle 200 is placed in the delivery destination designated region as shown in FIG. 12, the delivery vehicle 200 confirms or detects the positions of the slots 410 of the delivery box fixture 400.

Next, as shown in FIG. 13, the arm 221 of the delivery vehicle 200 moves to lift up the delivery box 300 from the carrying platform 224 and moves the delivery box 300 to a position in front of the delivery vehicle 200.

Then, the delivery vehicle 200 inserts the protrusions 310 of the delivery box 300 into or through the slots 410 in the confirmed (detected) positions, so that the delivery box 300 is locked as shown in FIG. 14.

The delivery box fixture 400 shown in FIGS. 12 to 14 has four slots 410 (a first slot 410a, a second slot 410b, a third slot 410c and fourth slot 410d). Correspondingly, the delivery box 300 has four protrusions 310 (a first protrusion 1, a second protrusion 2, a third protrusion 3, and fourth protrusion 4) which are inserted into those four slots 410, respectively.

Another configuration naturally is possible where the delivery box fixture 400 has a plurality of slots 410 while the delivery box 300 has only one protrusion 310, and vice versa. In addition, when the protrusions 310 are formed as protruding mechanisms that can be embedded or compressed in the delivery box 300 by spring, the number of the slots 410 may be equal to or smaller than that of the protrusions 310.

That is, the numbers of the engagement portions (protrusions 310 and slots 410) may not necessarily be the same between the delivery box 300 and the delivery box fixture 400.

<Details of the Configurations of the Delivery Box and the Delivery Box Fixture>

Figure 15:
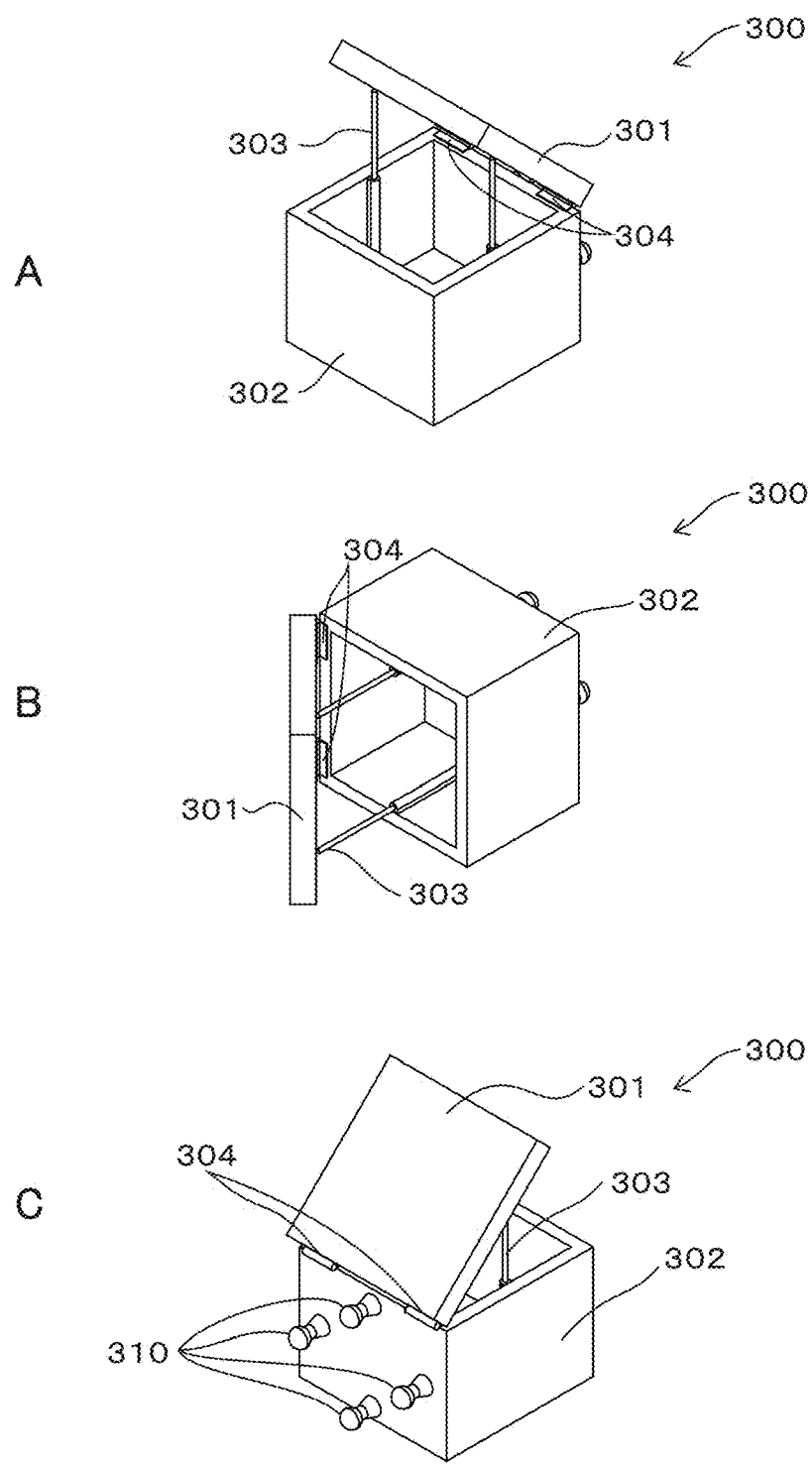
FIG. 15 is a drawing showing details of the configuration of a delivery box according to Embodiment 1 of the present invention.

FIG. 15 is a drawing showing details of the configuration of the delivery box 300 according to Embodiment 1 of the present invention.

In FIG. 15, the delivery box 300 includes a lid 301, a parcel storage part 302, a damper 303 and hinges 304.

The lid 301 is coupled to the parcel storage part 302 by the hinges 304.

The lid 301 of the delivery box 300 opens with respect to the hinges 304 as pivot points, and the damper 303 can maintain the open state and slowly close the lid 301.

FIG. 15A shows a state in which the lid 301 can open and close in the vertical direction, and FIG. 15B shows a state in which the lid 301 can open and close in the front-to-back direction. The delivery box 300 is selected depending on a parcel to be delivered as appropriate.

FIG. 15C is a drawing obtained by turning the delivery box 300 shown in FIG. 15A, and shows the back side of the delivery box 300 having the protrusions 310. These protrusions 310 are provided at positions corresponding to the slots 410 of the delivery box fixture 400 as described later.

The protrusions 310 may be referred to as engagement portions (first engagement portions) that engage with the slots 410 of the delivery box fixture 410.

Figure 16:
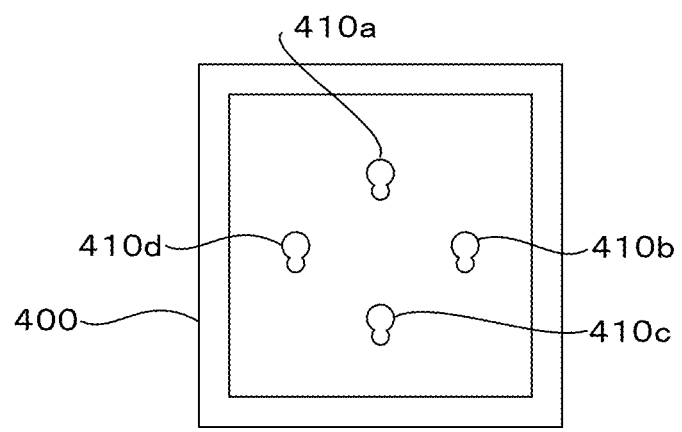
FIG. 16 is a drawing showing details of the configuration of a delivery box fixture according to Embodiment 1 of the present invention.

FIG. 16 is a drawing showing details of the delivery box fixture 400 according to Embodiment 1 of the present invention.

The delivery box fixture 400 shown in FIG. 16 includes four slots 410 (the first slot 410a, the second slots 410b, the third slot 410c, and the fourth slot 410d) which can engage with the protrusions 310 of the delivery box 300.

Therefore, the slots 410 may be referred to as engagement portions (second engagement portions) that engage with the slots 310 of the delivery box 300.

Each of the slots 410 is composed of two circular parts, an upper circular part and a lower circular part. Each of the protrusions 310 of the delivery box 300 engages with or fits in two circular parts, the upper circular part and the lower circular part. Here, the protrusion 310 has a cylindrical part protruding from the delivery box 300. The cylindrical part prevents the delivery box 300 from being lifted up to fix the delivery box 300.

Figure 17:
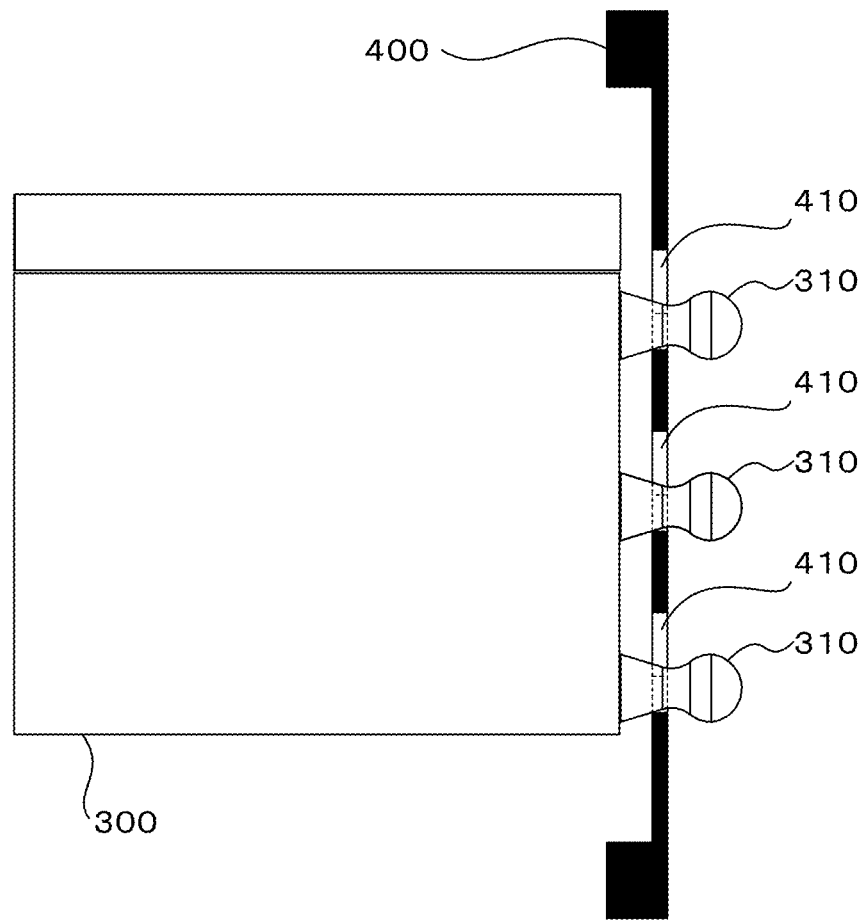
FIG. 17 is a drawing showing a state in which the delivery box engages with the delivery box fixture according to Embodiment 1 of the present invention.

FIG. 17 is a drawing showing a state in which the delivery box 300 engages with the delivery box fixture 400 according to Embodiment 1 of the present invention.

In FIG. 17, the protrusions 310 of the delivery box 300 are inserted into or mated with the slots 410 of the delivery box fixture 400, so that the delivery box 300 engages with and is fixed to the delivery box fixture 400.

Each of the slots 410 of the delivery box fixture 400 is composed of a first slot and a second slot smaller than the first slot.

The protrusion 310 of the delivery box 300 is inserted into the first large slot, and then shifted to the second small slot, so that the delivery box 300 engages with and is fixed to the delivery box fixture 400.

FIG. 18 shows contents of an e-mail sent to the recipient of a parcel.

FIG. 18 shows the contents of an e-mail, as a means of communication, sent from the delivery vehicle 200 to the recipient of the delivery box 300.

This e-mail includes: header information such as an address of a receiver, a sender and a subject; the text of a message; a box number as delivery box identification information to identify the delivery box; and an unlocking key code.

Upon receiving the e-mail with the above-described contents, the recipient of the delivery can recognize the completion of the delivery, identify the delivery box 300, unlock the identified delivery box 300 and take the parcel out of the delivery box 300.

<7. Details of Processes>

Figure 19:
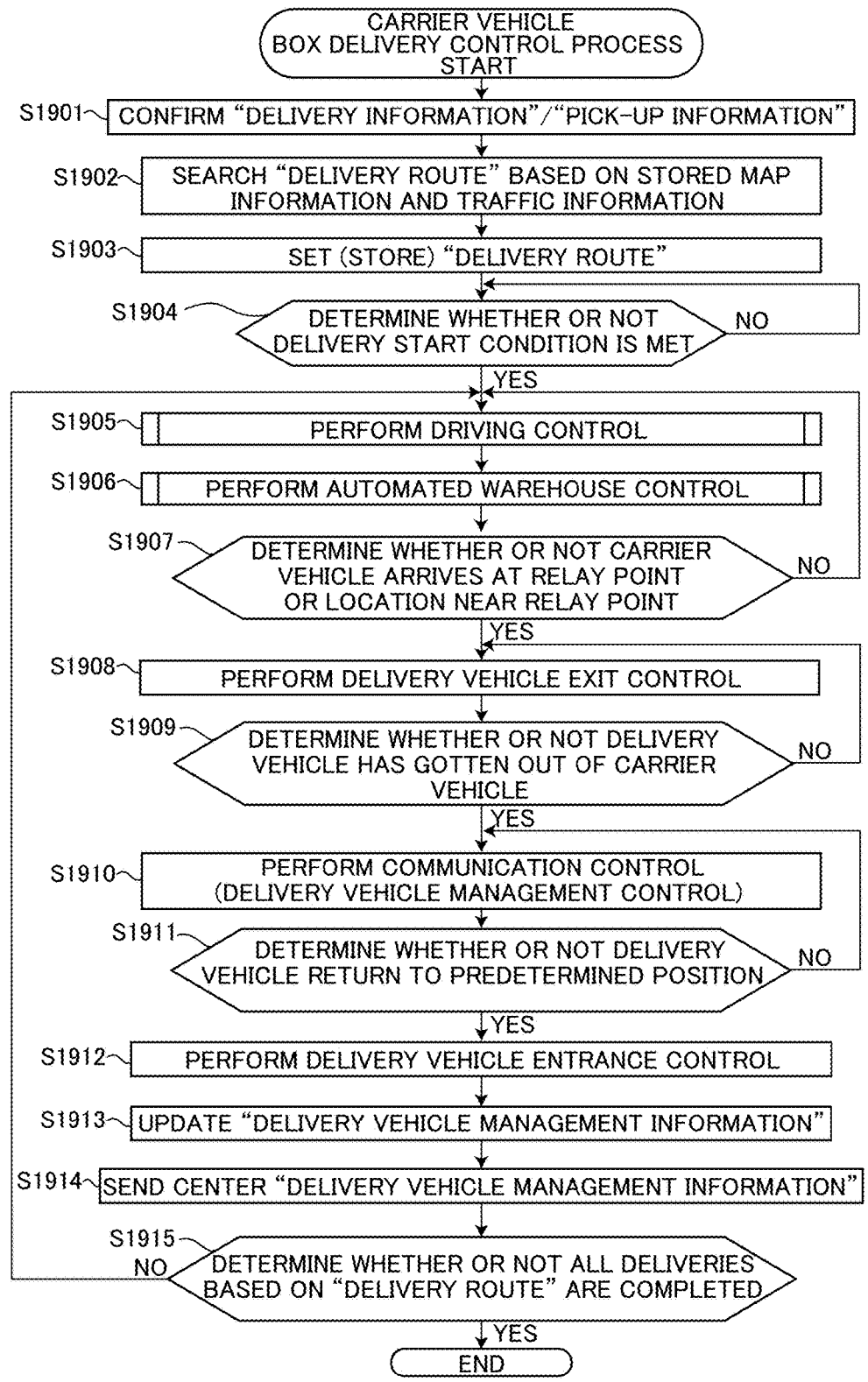
FIG. 19 is a flowchart showing details of a box delivery control process performed by the carrier vehicle according to Embodiment 1 of the present invention.

FIG. 19 is a flowchart showing details of a box delivery control process performed by the carrier vehicle 100 according to Embodiment 1 of the present invention.

In FIG. 19, the carrier vehicle 100 (controller 101) checks "delivery information" and "pick-up information" which are set information, or received information by communicating with the center 10 (S1901).

This delivery information includes "fixture number" to identify the delivery box fixture 400, and "box identification information" to identify the delivery box 300 to be delivered, as well as the address and name of the delivery destination 20.

Meanwhile, the pick-up information includes "fixture number" to identify the delivery box fixture 400 and "box identification information" to identify the delivery box 300 to be picked up, as well as the address and name of the pick-up destination.

Based on the delivery information and the pick-up information, as well as the map information and traffic information stored in advance, the carrier vehicle 100 (controller 101) searches the delivery route to the delivery destination 20 (S1902), and sets or stores the searched delivery route (S1903).

Then, the carrier vehicle 100 (controller 101) determines whether or not a shipping condition to depart from the present location such as the center 10 and start delivery is met (S1904). This shipping condition is met when the turn of the carrier vehicle 100 comes for departure from the center 10, or the set time for departure comes.

Until determining that the shipping condition is met (S1904: NO), the carrier vehicle 100 (controller 101) continues to stand by.

On the other hand, when determining that the shipping condition is met (S1904: YES), the carrier vehicle 100 (controller 101) performs a driving control (S1905).

This driving control is performed to allow the carrier vehicle 100 to travel on the delivery route from the present location to the delivery destination 20 by using the GPS device 105a and various information such as the map information, the road information and the traffic information. Based on the information acquired by the detection device 103, the carrier vehicle 100 automatically travels or drives on the delivery route, watching other cars around itself, pedestrians, animals, a falling object, grooves, bumps, driving lanes defined by center lines, and traffic lights, based on the information acquired by the detection device 103.

Here, details of the driving control will be described later with reference to FIG. 22.

Next, the carrier vehicle (controller) 101 performs automated warehouse control (S1906).

This automated warehouse control is performed to control the conveyance control mechanism 130 of the automated warehouse 110 to locate the delivery box 300 to be delivered to the delivery destination 20 in the receipt region 124 in the storage container 120 by the time the delivery vehicle 200 gets out of the carrier vehicle 100 at the relay point 21 on the delivery route. By this means, the delivery vehicle 200 can receive the delivery box 300 located in the receipt region 124 and carry the delivery box 300 thereon by the time the delivery vehicle 300 gets out of the carrier vehicle 100 at the relay point 21.

Here, details of the automated warehouse control will be described later with reference to FIG. 23.

Then, the carrier vehicle 100 (controller 101) determines whether or not the carrier vehicle 100 arrives at the relay point 21 for the delivery destination 20 on the delivery route indicated by the delivery information, or a location near the relay point 21 (S1907).

Until arriving at the relay point 21 or the location near the relay point 21 by the driving control, the carrier vehicle 100 continues to perform the driving control and the automated warehouse control (S1407: NO).

Then, upon arriving at the relay point 21 for the delivery destination 20 indicated by the delivery information or a location near the relay point 21 (S1907: YES), the carrier vehicle 100 (controller 101) performs exit control to get the delivery vehicle 200 out of the carrier vehicle 100 to deliver the delivery box 300 from the relay point 21 to the delivery destination 20 (S1908).

The carrier vehicle 100 (controller 101) determines whether or not the delivery vehicle 200 has gotten out of the carrier vehicle 100 by the exit control (S1909). Until the delivery vehicle 200 has gotten out of the carrier vehicle 100 (S1909: NO), the carrier vehicle 100 continues to perform the exit control (S1909).

Then, when the exit control is completed, that is, the delivery vehicle 200 has gotten out of the carrier vehicle 100 (S1909: YES), the carrier vehicle 100 (controller 101) performs communication control to continuously communicate with the delivery vehicle 200 having gotten out of the carrier vehicle 100 to continuously manage the delivery state of the delivery vehicle 200 (S1910). By this means, the carrier vehicle 100 and the delivery vehicle 200 can know each other's present locations and delivery states point by point.

Then, the carrier vehicle 100 (controller 101) determines whether or not the delivery vehicle 200 completes the delivery and returns to a predetermined position (S1911). That is, after the delivery vehicle 200 fixes the delivery box 300 to the delivery box fixture 400 at the delivery destination 20 to complete the delivery, the carrier vehicle 100 (controller 101) determines whether or not the delivery vehicle 200 returns to the predetermined position which is designated in association with the carrier vehicle 100 to enter the carrier vehicle 100.

Until the delivery vehicle 200 returns to the predetermined position (S1911: NO), the carrier vehicle 100 (controller 101) performs the communication control to continuously manage the situation of the delivery vehicle 200 (S1910).

The carrier vehicle 100 may perform the communication control to directly communicate with the delivery vehicle 200, or indirectly communicate with the delivery vehicle 200 via the center 10. In addition, all the control processes between the carrier vehicle 100 and the delivery vehicle 200 may be performed according to instructions from the center 10 in communication with the carrier vehicle 100 and the delivery vehicle 200.

On the other hand, when the delivery vehicle 200 returns to the predetermined position (S1911: YES), the carrier vehicle 100 (controller 101) performs entrance control to let the delivery vehicle 200 into the carrier vehicle 100 (S1912). This entrance control is performed to open the door 125 of the carrier vehicle 100 to serve as the entrance pathway through which the delivery vehicle 200 enters the carrier vehicle 100, and to stop the delivery vehicle 200 at a predetermined stop position in the carrier vehicle 100.

After the delivery vehicle 200 has entered the carrier vehicle 100 by the entrance control, the carrier vehicle 100 (controller 101) updates the management information of the delivery vehicle 200 (S1913), and sends the updated information to the center 10 (S1914). By this means, the center 10 can recognize that the delivery vehicle 200 has returned to the carrier vehicle 100. In this case, in the same way as described above, the carrier vehicle 100 may perform the communication control to directly communicate with the delivery vehicle 200, or indirectly communicate with the delivery vehicle 200 via the center 10. Also, all the control processes of the carrier vehicle 100 and the delivery vehicle 200 may be performed according to instructions from the center 10 in communication with the carrier vehicle 100 and the delivery vehicle 200.

Then, the carrier vehicle 100 (controller 101) determines whether or not all the deliveries on the delivery route are completed (S1915). When determining that all the deliveries are completed (S1915: YES), the carrier vehicle 100 ends the process.

On the other hand, until determining that all the delivery boxes 300 have been delivered (S1915: NO), the carrier vehicle 100 (controller 101) performs the driving control for the delivery of the delivery box 300 on the set delivery route (S1905).

Figure 20:
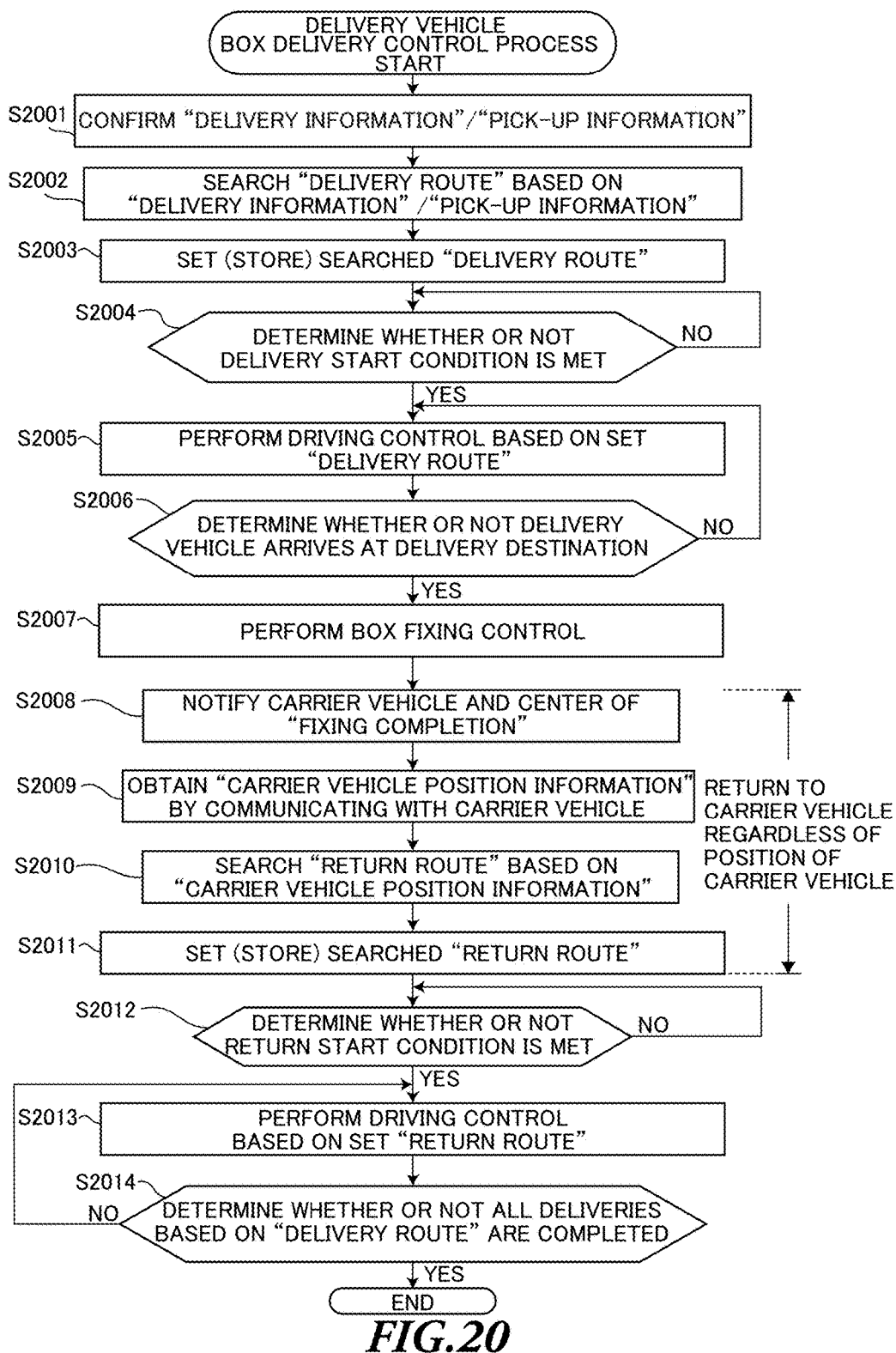
FIG. 20 is a flowchart showing details of a box delivery control process performed by the delivery vehicle according to Embodiment 1 of the present invention.

FIG. 20 is a flowchart showing details of a box delivery control process performed by the delivery vehicle 200 according to Embodiment 1 of the present invention.

In FIG. 20, the delivery vehicle 200 (controller 201) checks "delivery information" and "pick-up information" which are set information, or received information by communicating with the center 10 (S2001).

Like the carrier vehicle 100, the delivery information includes "fixture number" to identify the delivery box fixture 400, and "box identification information" to identify the delivery box 300 to be delivered, as well as the address and name of the delivery destination 20.

Meanwhile, like the carrier vehicle 100, the pick-up information includes "fixture number" to identify the delivery box fixture 400 and "box identification information" to identify the delivery box 300 to be picked up, as well as the address and name of the pick-up destination.

Based on the delivery information and the pick-up information, as well as the map information and traffic information stored in advance, the delivery vehicle 200 (controller 201) searches the delivery route to the delivery destination 20 (S2002), and sets or stores the searched delivery route (S2003).

Then, the delivery vehicle 200 (controller 201) determines whether or not a delivery vehicle start condition to depart from the present location such as the relay point 21 and start delivery is met (S2004). This delivery vehicle start condition is met when the door 125 of the carrier vehicle 100 opens and the delivery vehicle 200 can get out of the carrier vehicle 100 in view of, for example, surrounding road conditions.

Until determining that the delivery vehicle start condition is met (S2004: NO), the delivery vehicle 200 (controller 201) continues to stand by.

On the other hand, when determining that the delivery vehicle start condition is met (S2004: YES), the delivery vehicle 200 (controller 201) performs driving control for the delivery to the delivery destination 20 based on the set delivery route (S2005).

Then, by this driving control, the delivery vehicle 200 (controller 201) determines whether or not the delivery vehicle 200 arrives at the delivery destination 20 on the delivery route indicated by the delivery information (S2006).

Until arriving at the delivery destination 20 by the driving control, the delivery vehicle 200 (controller 201) continues to perform the driving control (S2006: NO).

Then, upon arriving at the delivery destination 20 indicated by the delivery information (S2006: YES), the delivery vehicle 200 (controller 201) performs box fixing control to engage the delivery box 300 carried thereon with the delivery box fixture 400 located at the delivery destination 20 to fix the delivery box 300 to the delivery box fixture 400 (S2007).

After fixing the delivery box 300 to the delivery box fixture 400 by the box fixing control, the delivery vehicle 200 (controller 201) notifies the carrier vehicle 100 and the center 10 of "fixing completion" (S2008).

Then, the delivery vehicle 200 (controller 201) obtains "carrier vehicle position information" by communicating with the carrier vehicle 100 (S2009). The delivery vehicle 200 searches "return route" to the carrier vehicle 100 based on the carrier vehicle position information obtained (S2010) and sets or stores the searched route (S2011).

In this state, the delivery vehicle 200 (controller 201) determines whether or not "return start condition" to start driving control based on the set return route is met (S2012).

Until determining that the return start condition is met (S2012: NO), the delivery vehicle 200 (controller 201) continues to stand by. On the other hand, when determining that the return start condition to start driving control is met (S2012: YES), the delivery vehicle 200 (controller 201) performs the driving control based on the set return route (S2013).

Then, the delivery vehicle 200 (controller 201) determines whether or not all the deliveries are completed based on the set delivery route (S2014). Until determining that all the deliveries are completed (S2014: NO), the delivery vehicle 200 (controller 201) continues to perform the driving control based on the return route (S2013).

On the other hand, when determining that all the deliveries are completed (S2014: YES), the delivery vehicle 200 (controller 201) ends the process.

Figure 21:
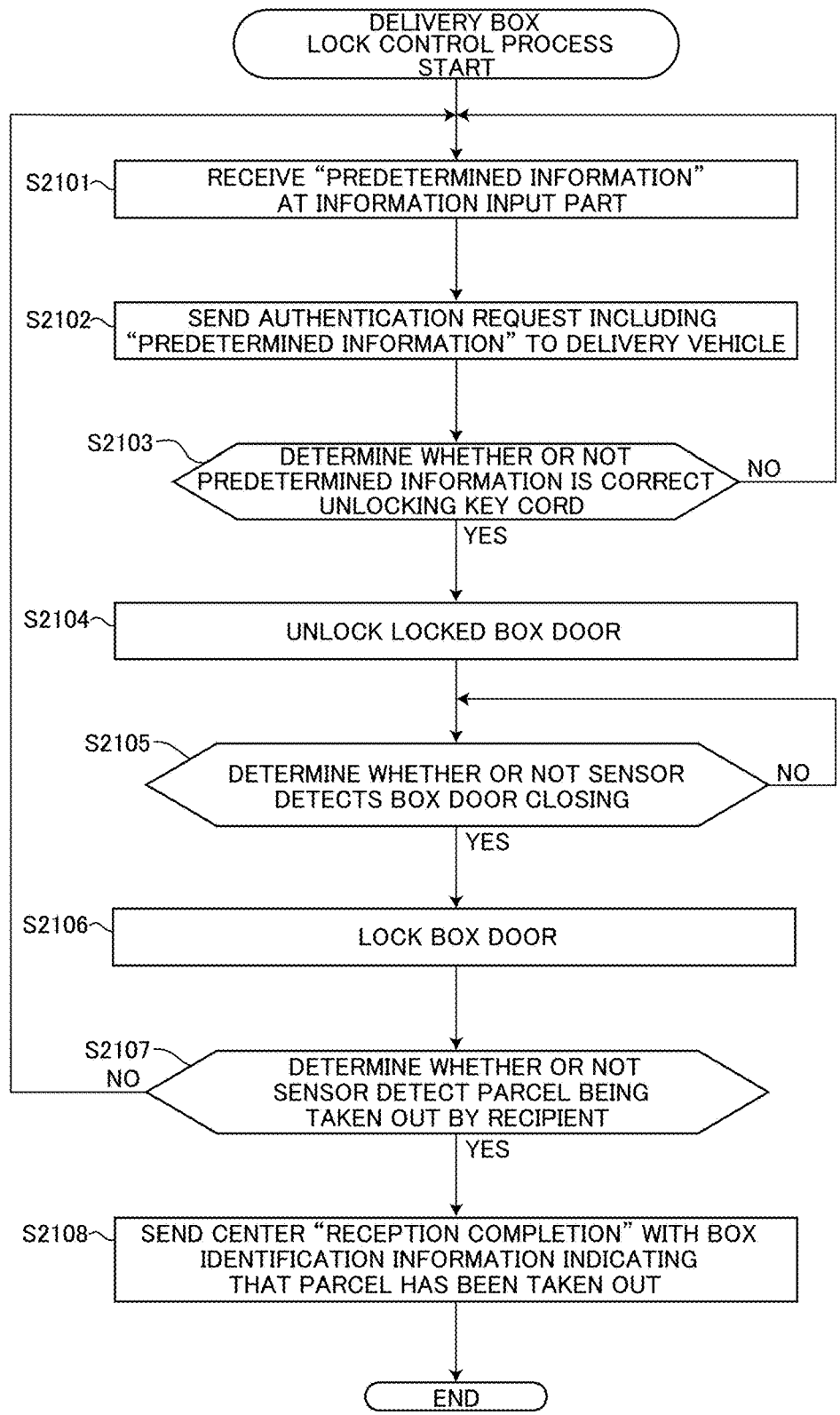
FIG. 21 is a flowchart showing details of a lock control process performed by the delivery box according to Embodiment 1 of the present invention.

FIG. 21 is a flowchart showing details of a lock control process performed by the delivery box 300 according to Embodiment 1 of the present invention.

In FIG. 21, an information input part provided in the delivery box 300 receives "predetermined information" inputted from, for example, the recipient of the parcel stored in the delivery box 300 (S2101). This information input part of the delivery box 300 may be, for example, a touch panel, a button, and a camera (imaging device) as described above.

The delivery box 300 sends the delivery vehicle 200 an authentication request including the predetermined information inputted from the information input part (S2102). Upon receiving the authentication request including the predetermined information from the delivery box 300, the delivery vehicle 200 (controller 201) determines whether or not the predetermined information is a correct "unlocking key code" to unlock the delivery box 300.

This authentication request may include information to identify the delivery box 300, as well as the predetermined information. The delivery vehicle 200 (controller 201) determines whether or not the predetermined information is the unlocking key code corresponding to the authentication information designated to the information to identify the delivery box 300, and responds to the delivery box 300. That is, the storage part 204 of the delivery vehicle 200 stores "authentication information" designated to the information to identify the delivery box 300, and a determination program to determine whether or not the predetermined information is the unlocking key code corresponding to the authentication information.

Then, the delivery box 300 determines whether or not the response from the delivery vehicle 200 indicates that the predetermined information is authenticated as the unlocking key code (S2103). When the delivery vehicle 200 (controller 201) determines that the predetermined information is authenticated as the correct unlocking key code, the delivery box 300 unlocks the locked box door (S2104).

By this means, the recipient of the parcel can open the box door to take the parcel out of the delivery box 300. After the parcel is taken out by the recipient, the delivery box 300 determines whether or not a sensor detects the box door closing (S2105).

When determining that the sensor detects the box door closing (S2105: YES), the delivery box 300 locks the box door (S2106).

By this means, the box door cannot be unlocked unless the recipient inputs the unlocking key code. Here, if the recipient inputs the correct unlocking key code, it is possible to open the box door.

After the box door is locked, the delivery box 300 determines whether or not the sensor such as a parcel detecting sensor provided in the delivery box 300 has detected the parcel being taken out by the recipient (S2107).

Until determining that the sensor has detected the parcel being taken out by the recipient (S2107: NO), that is, when the parcel has not been taken out, the delivery box 300 allows the information input part to receive the predetermined information.

On the other hand, when determining that the sensor has detected the parcel being taken out by the recipient (S2107: YES), the delivery box 300 sends the center 10 "reception completion" with the box identification information indicating that the parcel has been taken out (S2108), and ends the process.

Although a configuration has been shown where the delivery box 300 determines whether or not the parcel has been taken out by the recipient after the box door is locked, it is by no means limiting. Another configuration is possible where the delivery box 300 sends the center 10 "reception completion" with the box identification information indicating that the parcel has been taken out, based on the fact that the parcel detecting sensor detects the parcel being taken out by the recipient from the open box door and then the box door is locked.

Figure 22:
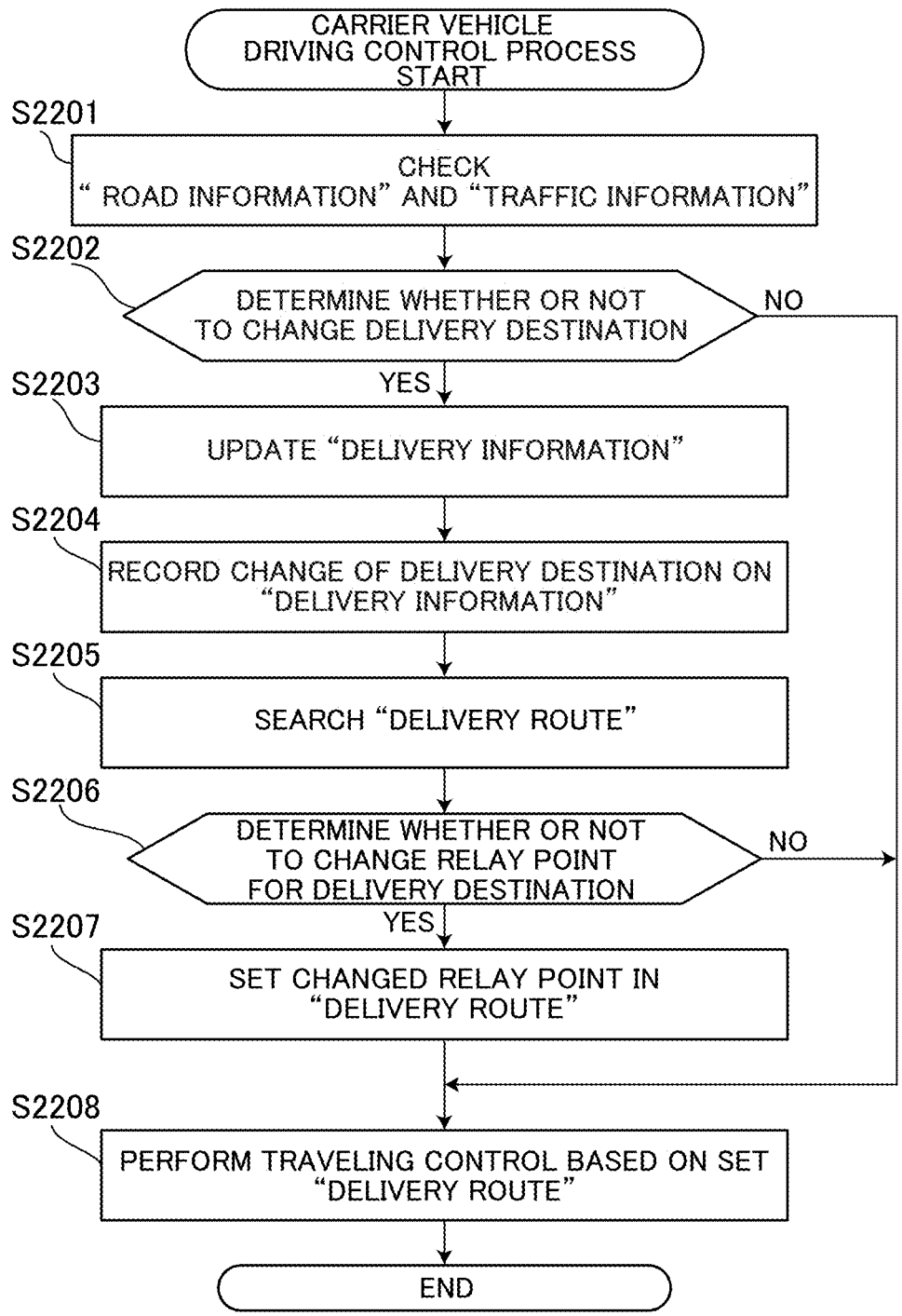
FIG. 22 is a flowchart showing details of a driving control process performed by the carrier vehicle according to Embodiment 1 of the present invention.

FIG. 22 is a flowchart showing details of the driving control process performed by the carrier vehicle 100 according to Embodiment 1 of the present invention.

The carrier vehicle 100 (controller 101) checks the road information and the traffic information on the delivery route as needed, by using the driving control device 105 and the detection device 103, while traveling or driving on the delivery route to the delivery destination 20.

Next, the carrier vehicle 100 (controller 101) determines whether or not to change the delivery destination 20 for the current delivery (S2202).

The carrier vehicle 100 and the delivery vehicle 200 deliver the delivery box 300 to the delivery destination 20, according to a preset delivering order indicated by the delivery information. In this case, however, if an unforeseen situation, such as a traffic jam and suspension of traffic occurs on the delivery route, the delivery of the delivery box 300 according to the preset delivering order may not unnecessarily be efficient.

Therefore, when determining that the delivery destination 20 should be changed for more efficient delivery as a result of checking the road information and the traffic information, the carrier vehicle 100 (controller 101) changes the delivery destination 20 to a different delivery destination indicated by the delivery information (S2202: YES).

On the other hand, when determining that the delivery destination 20 does not need to be changed (S2202: NO), the carrier vehicle 100 (controller 101) moves the step to S2208 in order to deliver the delivery box 300 to the preset delivery destination 20.

Then, when changing the delivery destination 20 (S2202: YES), the carrier vehicle 100 (controller 101) changes delivering order information of the delivery information, in accordance with the changed delivery destination 20. Then, the carrier vehicle 100 (controller 101) updates the delivery information to add the changed delivering order information (S2203) and records the change of the delivery destination 20 on the delivery information (S2204). Then, the carrier vehicle 100 (controller 101) sends the updated delivery information to each of the center 10 and the delivery vehicle 200.

Next, the carrier vehicle 100 (controller 101) searches the delivery route to the changed delivery destination 20 (S2205), and determines whether or not to change the relay point 21 for the changed delivery destination 20 (S2206).

When determining that the relay point 21 should be changed along with the change of the delivery destination 20 for more efficient delivery (S2206: YES), the carrier vehicle 100 (controller 101) changes the relay point 21 and sets the changed relay point 21 on the delivery route (S2207). Then, the carrier vehicle 100 (controller 101) sends information on the changed relay point 21 to each of the center 10 and the delivery vehicle 200.

On the other hand, when the preset relay point 21 does not need to be changed even though the delivery destination 20 has been changed, (S2206: NO), the carrier vehicle 100 (controller 101) moves the step to S2208 in order to deliver the delivery box 300 via the preset relay point 21.

The carrier vehicle 100 (controller 101) performs driving control for the delivery based on the set delivery route (S2208). Then, the carrier vehicle 100 (controller 101) moves the step to S1906 shown in FIG. 19.

Figure 23:
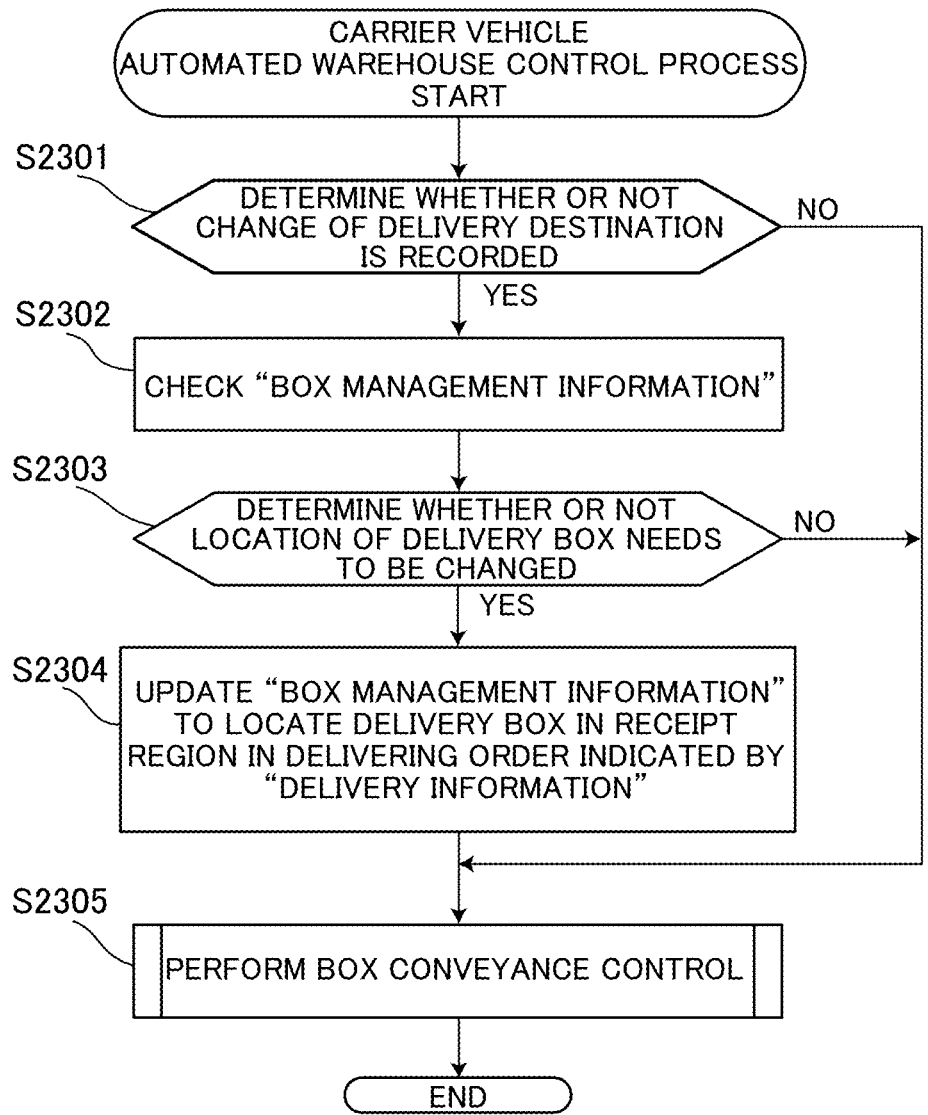
FIG. 23 is a flowchart showing details of an automated warehouse control process performed by the carrier vehicle according to Embodiment 1 of the present invention.

FIG. 23 is a flowchart showing details of the automated warehouse control process performed by the carrier vehicle 100 according to Embodiment 1 of the present invention.

The carrier vehicle (controller 101) checks the stored delivery information, and determines whether or not the change of the delivery destination 20 is recorded on the delivery information (S2301).

When determining that the change of the delivery destination 20 is recorded on the delivery information (S2301: YES), the carrier vehicle 100 (controller 101) checks "box management information" stored (S2302).

On the other hand, when determining that the change of the delivery destination 29 is not recorded on the delivery information (S2301: NO), the carrier vehicle 100 (controller 101) moves the step to S2305 in order to perform box conveyance control, based on, for example, the box management information preset in "information setting step A4" shown in FIG. 3.

The box management information is used to manage the locations of the delivery boxes 300 stored in the storage container 120 of the automated warehouse 110. The box management information includes location information of each of the carrying space 121 and the storage regions 123, box identification information of the delivery boxes 300 located in storage regions 123, and conveyance order information indicating the order of conveyance of the delivery boxes 300 to the receipt region 124. These pieces of information are recorded in associated with each other.

Next, the carrier vehicle 100 (controller 101) determines whether or not the location of the delivery box 300 in the storage container 120 needs to be changed along with the change of the delivery destination 20, based on the delivery information and the box management information (S2303).

When determining that the location of the delivery box 300 in the storage container 120 does not need to be changed (S2303: NO), the carrier vehicle 100 (controller 101) moves the step to S2305.

On the other hand, when determining that the location of the delivery box 300 in the storage container 120 needs to be changed (S2303: YES), the carrier vehicle 100 (controller 101) moves the step to S2304 in order to reflect the delivering order information of the delivery information on the conveyance order information of the box management information.

Next, the carrier vehicle 100 (controller 101) updates the box management information containing the conveyance order information, so as to convey the delivery box 300 to the receipt region 124, according to the changed delivering order (S2304).

Next, the carrier vehicle 100 performs the box conveyance control (S2305). To be more specific, the carrier vehicle 100 (controller 101) sends an instruction to perform the box conveyance control to the conveyance controller 135. This instruction contains the delivery information and the box management information. The conveyance controller 135 performs the box conveyance control, based on the instruction from the controller 101. After the box conveyance control is performed by the conveyance controller 135, the controller 101 moves the step to S1907 shown in FIG. 19.

The box conveyance control is performed to convey the delivery box 300 to be delivered to the delivery destination 20 to the receipt region 124 based on the delivery information and the box management information, and to carry the delivery box 200 on the delivery vehicle 200. By this means, the delivery box 300 to be delivered to the delivery destination 20 is carried on the delivery vehicle 200, so that preparation to get the delivery vehicle 200 carrying the delivery box 300 out of the carrier vehicle 100 is completed.

Here, details of the box conveyance control will be described later with reference to FIG. 24.

Figure 24:
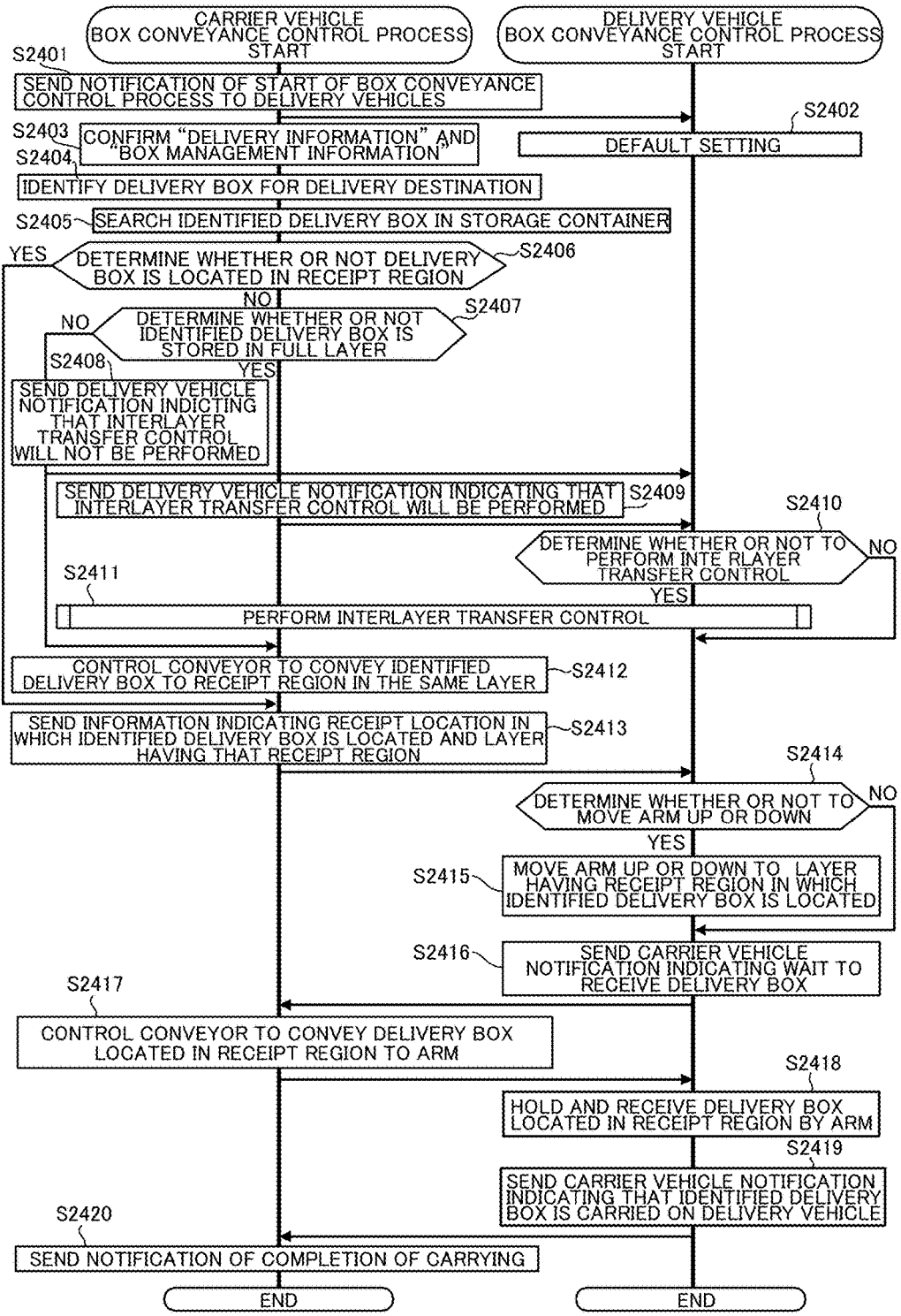
FIG. 24 is a flowchart showing details of a box conveyance control process performed by the carrier vehicle and the delivery vehicle, according to Embodiment 1 of the present invention.

FIG. 24 is a flowchart showing details of a box conveyance control process performed by the carrier vehicle 100 and the delivery vehicle 200 according to Embodiment 1 of the present invention.

The carrier vehicle 100 (conveyance controller 135) sends the delivery vehicle 200 a notification of the start of the box conveyance control process (S2401). Upon receiving the notification, the delivery vehicle 200 (carrying controller 230) activates the carrying mechanism 220 to perform necessary default setting (S2402).

Next, the delivery vehicle 100 (conveyance controller 135) checks the delivery information and the box management information (S2403). Then, the carrier vehicle 100 (conveyance controller 135) identifies the delivery destination 20 and the delivery box 300 to be delivered to the delivery destination 200 by using the delivery information (S2404).

In addition, the carrier vehicle 100 (conveyance controller 135) identifies location information of the storage region 123 in which the identified delivery box 300 is located in the storage container 120, by using the box management information. Then, the carrier vehicle 100 (conveyance controller 135) finds the identified delivery box 300 in the storage container 120 (S2405), and confirms that the identified delivery box 300 is actually located in the region indicated by the identified location information in the container 120.

Next, the carrier vehicle 100 (conveyance controller 135) determines whether or not the identified delivery box 300 is located in the receipt region 124 (S2406).

When determining that the identified delivery box 300 is located in the receipt region 124 (S2406: YES), the carrier vehicle 100 (conveyance controller 135) moves the step to S2413 in order to notifies that the identified delivery box 300 is located in the receipt region 124.

On the other hand, when determining that the identified delivery box 300 is not located in the receipt region 124 (S2406: NO), the carrier vehicle 100 (conveyance controller 135) determines whether or not the identified delivery box 300 is stored in the full layer (S2407).

In a case in which the delivery box 300 is stored in the full layer, when any delivery box 300 in the full layer is transferred to a different layer, it is possible to change the location of the delivery box 300 in this layer. In other words, when the delivery box 300 is stored in a layer which is not full but has an empty storage region 123 (herein after "acceptable layer"), the location of the delivery box 300 can be changed in this layer, and therefore it may not be necessary to perform the interlayer transfer control.

When determining that the identified delivery box 300 is not stored in the full layer (S2407: NO), the carrier vehicle 100 (conveyance controller 135) sends a notification indicating that the interlayer transfer control will not be performed to the delivery vehicle 200 (S2408) and moves the step to S2412.

On the other hand, when determining that the identified delivery box 300 is stored in the full layer (S2407: YES), the carrier vehicle 100 (conveyance controller 135) sends the delivery vehicle 200 a notification indicating that the interlayer transfer control will be performed (S2409) and performs the interlayer transfer control (S2411).

Upon receiving the notification indicating that the interlayer transfer control will be performed or not from the carrier vehicle 100, the delivery vehicle 200 (carrying controller 230) determines whether or not to perform the interlayer transfer control (S2410). To be more specific, upon receiving the notification indicating that the interlayer transfer control will be performed (S2410: YES), the delivery vehicle 200 (carrying controller 230) performs the interlayer transfer control (S2411). On the other hand, upon receiving the notification indicating that the interlayer transfer control will not be performed (S2410: NO), the delivery vehicle 200 (carrying controller 230) waits until receiving from the carrier vehicle 100 information indicating the location of the receipt region 124 in which the identified delivery box 300 is located, and the location of the layer having this receipt region 124, and moves the step to S2414.

This interlayer transfer control is performed to transfer the delivery box 300 from a layer to a different layer in the storage container 120. To be more specific, the delivery vehicle 200 (carrying controller 230) performs the interlayer transfer control to transfer the delivery box 300 located in the receipt region 124 in the full layer to the receipt region 124 (destination receipt region 124) in the acceptable layer having an empty storage region 123. Meanwhile, the carrier vehicle 100 (conveyance controller 135) changes the location of the delivery box 300 in the layer having the destination receipt region 124 to empty the destination receipt region 124. That is, even though the storage container 120 is not equipped with, for example, a stacker crane, the delivery vehicle 200 collaborates with the carrier vehicle 100 to deliver the delivery box 300, and therefore the delivery system 1 can transfer the delivery box 300 from a layer to a different layer in the storage container 120.

Here, details of the interlayer transfer control will be described later with reference to FIG. 25.

Next, the carrier vehicle 100 (conveyance controller 135) controls the conveyors 131 so as to convey the identified delivery box 300 to the receipt region 124 in the same layer (S2412). Then, the carrier vehicle 100 (conveyance controller 135) sends the delivery vehicle 200 information indicating the location of the receipt region 124 in which the identified delivery box 300 is located, and the location of the layer having this receipt region 124.

The delivery vehicle 200 (carrying controller 230) determines whether or not to move the arm 221 of the carrying mechanism 220 up or down, based on the notification indicating the location of the receipt region 124 in which the identified delivery box 300 is located and the layer having this receipt region 124.

When determining that the arm 221 does not need to move up or down (S2414: NO), the delivery vehicle 200 (carrying controller 230) prepares the arm 221 to receive the delivery box 300 from the carrier vehicle 100. Then, the delivery vehicle 200 (carrying controller 230) sends the carrier vehicle 100 a notification indicating that the delivery vehicle 200 waits to receive the delivery box 300.

On the other hand, when determining that the arm 221 needs to move up or down (S2414: YES), the delivery vehicle 200 (carrying controller 230) drives the up-and-down part 222 to move the arm 221 up or down to the layer having the receipt region 124 in which the identified delivery box 300 is located (S2415). Then, the delivery vehicle 200 (carrying controller 230) prepares the arm 221, and sends the carrier vehicle 100 a notification indicating that the delivery vehicle 200 waits to receive the delivery box 300 (S2416).

Upon receiving the notification indicating the waiting for the reception, the carrier vehicle 100 (conveyance controller 135) controls the conveyors 131 to convey the delivery box 300 located in the receipt region 214 in the step S2412 to the arm 221 (S2417).

The delivery vehicle 200 (carrying controller 230) drives the arm 221 to hold the delivery box 300 located in the receipt region 124. By this means, the delivery vehicle 200 can receive the delivery box 300 (S2418).

Then, the delivery vehicle 200 (carrying controller 230) drives the up-and-down part 222 and the translation part 223 to move the arm 221 holding the delivery box 300 to the carrying platform 224 to put the delivery box 300 on the carrying platform 224. Then, the delivery vehicle 200 (carrying controller 230) allows the arm 221 to hold the delivery box 300 on the carrying platform 224. By this means, the delivery box 300 is carried on the delivery vehicle 200.

Next, the delivery vehicle 200 (carrying controller 230) sends the carrier vehicle 100 a notification indicating that the identified delivery box 300, that is, the delivery box 300 to be delivered to the delivery destination 20 is carried on the delivery vehicle 200 (S2419), and ends the process.

Upon receiving the notification indicating that the delivery box 300 is carried on the delivery vehicle 200, the conveyance controller 135 sends the controller 101 of the carrier vehicle 100 a notification indicating that the delivery box 300 to be delivered to the delivery destination 20 has been carried on the delivery vehicle 200 (notification of the completion of carrying) (S2420). Then, the conveyance controller 135 updates the box management information to reflect the location of the delivery box 300 in the storage container 120 on the box management information, and ends the process. Upon receiving the notification of the completion of carrying, the controller 101 moves the step to S1907 shown in FIG. 19.

Figure 25:
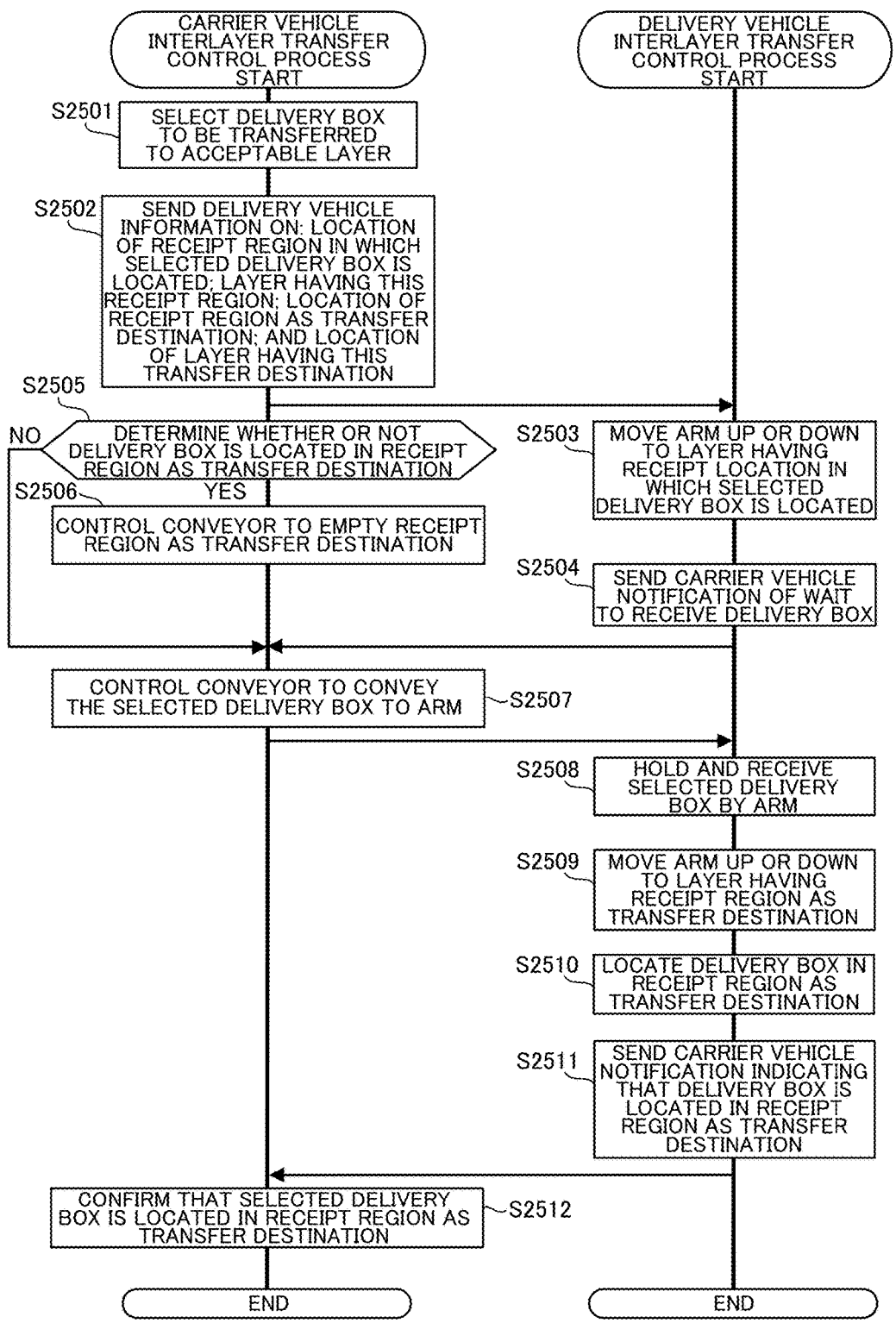
FIG. 25 is a flowchart showing details of an interlayer transfer control process performed by the carrier vehicle and the delivery vehicle, according to Embodiment 1 of the present invention.

FIG. 25 is a flowchart showing details of the interlayer transfer control process performed by the carrier vehicle 100 and the delivery vehicle 200 according to Embodiment 1 of the present invention.

The carrier vehicle 100 (conveyance controller 135) selects the delivery box 300 to be transferred to a different acceptable layer, from among the delivery boxes 300 located in the receipt regions 124 in the full layer (S2501). Then, the carrier vehicle 100 (conveyance controller 135) sends the delivery vehicle 200 information indicating: the location of the receipt region 124 in which the selected delivery box 300 is located; the location of the layer having this receipt region 124; the location of the receipt region 124 to which the selected delivery box 300 will be transferred; and the location of the layer having the receipt region 124 to which the selected delivery box 300 will be transferred (S2502).

Upon receiving the information, the delivery vehicle 200 (carrying controller 230) drives the up-and-down part 222 to move the arm 221 up or down to the layer having the receipt region 124 in which the selected delivery box 300 is located (S2503). Then, the delivery vehicle 200 (carrying controller 230) prepares the arm 221 to receive the delivery box 300 from the carrier vehicle 100, and sends the carrier vehicle 100 a notification indicating that the delivery vehicle 200 waits to receive the delivery box 300 (S2504).

While the delivery vehicle 200 drives the arm 221 (S2503 and S2504), when the carrier vehicle 100 determines that the delivery box 300 is located in the receipt region 124 as the transfer destination (S2505: YES), the carrier vehicle 100 (conveyance controller 135) controls the conveyors 131 to empty this receipt region 124 (S2506). On the other hand, when determining that the delivery box 300 is not located in the receipt region 124 as the transfer destination (S2505: NO), the carrier vehicle 100 (conveyance controller 135) waits until receiving from the carrier vehicle 100 a notification indicating that the carrier vehicle 200 waits to receive the delivery box 300, and moves the step to S2507.

Then, upon receiving the notification of the waiting for the reception, the carrier vehicle 100 (conveyance controller 135) controls the conveyors 131 to convey the selected delivery box 300 to the arm 221 (S2507).

The delivery vehicle 200 (carrying controller 230) drives the arm 221 to hold the selected delivery box 300. By this means, the delivery vehicle 200 can receive the delivery box 300 (S2508).

Then, the delivery vehicle 200 (carrying controller 230) drives the up-and-down part 222 to move the arm 221 holding the delivery box 300 up or down to the layer having the receipt region 124 as the transfer destination (S2509).

Then, the delivery vehicle 200 (carrying controller 230) drives the arm 221 holding the delivery box 300 to put the delivery box 300 in the receipt region 124 as the transfer destination (S2510). By this means, the selected delivery box 300 can be transferred to the receipt region 124 as the transfer destination.

The delivery vehicle 200 (carrying controller 230) sends the carrier vehicle 100 a notification indicating that the selected delivery box 300 is located in the receipt region 124 as the transfer destination (S2511), and ends the process.

Upon receiving the notification indicating that the selected delivery box 300 is located in the receipt region 124 as the transfer destination, the carrier vehicle 100 (conveyance controller 135) confirms that fact (S2512). Then, the carrier vehicle 100 (conveyance controller 135) updates the box management information to reflect the location of the delivery box 300 in the storage container 120 on the box management information. Then, the carrier vehicle 100 (conveyance controller 135) ends the process, and move the step to S2412 shown in FIG. 24.

<8. Change of the Location of the Delivery Box>

Figure 26:
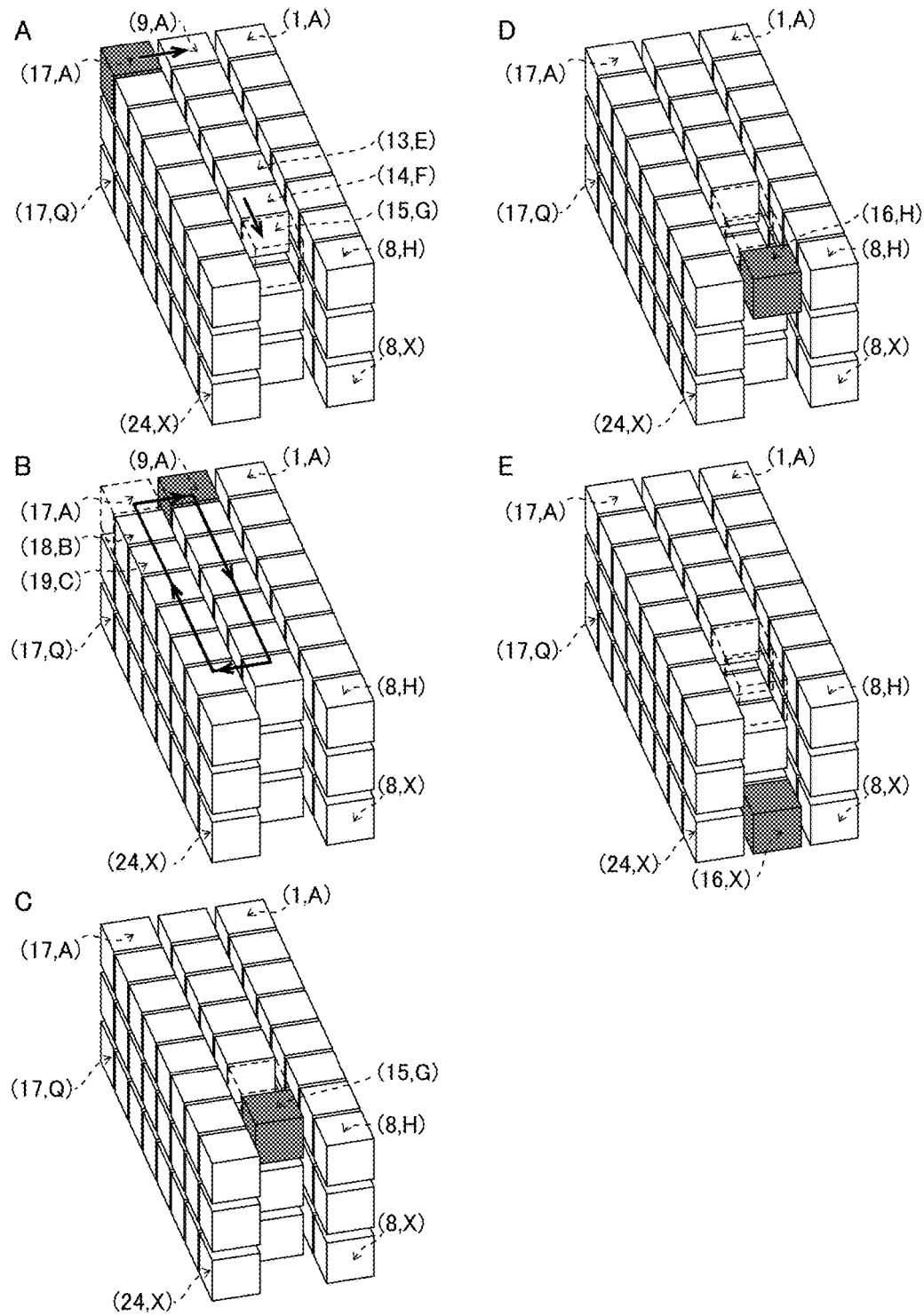
FIG. 26 is a drawing schematically showing a state in which the location of a delivery box is changed in the storage container according to Embodiment 1 of the present invention, where the interlayer transfer control process is not performed.

FIG. 26 is a drawing schematically showing a state in which the location of the delivery box 300 is changed in the storage container 120 according to Embodiment 1 of the present invention, where the interlayer transfer control process is not performed.

In FIG. 26, the locations of the plurality of regions (the storage regions 123 and the carrying space 121) in the storage container 120 are identified by the same reference signs as in FIGS. 6 and 7. In FIG. 26, the delivery box 300 to be delivered to the delivery destination 20 is shown in gray. The empty storage region 123 is indicated by dashed line in FIG. 26.

FIG. 26A shows the location of the delivery box 300 which has not been changed. In FIG. 26, the delivery box 300 to be delivered to the delivery destination 20 is located in the region (17, A) in the acceptable layer.

First, the carrier vehicle 100 conveys the delivery box 300 located in the region (14, F) to the next empty region (15, G). Accordingly, the region (14, F) becomes empty. Next, the carrier vehicle 100 conveys the delivery box 300 located in the region (13, E) to the next empty region (14, F). By repeating the above-described conveyance, the region (9, A) next to the region (17, A) in which the delivery box 300 to be delivered to the delivery destination 20 is located becomes empty. By this means, the delivery box 300 to be delivered to the delivery destination 20 can be conveyed to the empty region (9, A), as shown in FIG. 26B.

Next, as shown in FIG. 26B, the carrier vehicle 100 conveys the delivery box 300 located in the region (18, B) to the next empty region (17, A). Accordingly, the region (18, B) becomes empty. Next, the carrier vehicle 100 conveys the delivery box 300 located in the region (19, C) to the next empty region (18, B). By repeating the above-described conveyance, the delivery box 300 to be delivered to the delivery destination 20 can be conveyed to the region (15, G) which is the receipt region 124 in the same layer as the region (17, A) in which the delivery box 300 is originally located, as shown in FIG. 26B.

As described above, by repeatedly conveying the delivery box 300 to the next empty storage region 123, the carrier vehicle 100 can circulate the delivery box 300 in the same layer. Hereinafter, a control process to convey the delivery box 300 located in the storage region 123 in a specified layer to circulate the delivery box 300 in the same layer will be referred to as "circular conveyance control process."

As shown in FIG. 26D, the carrier vehicle 100 conveys the delivery box 300 located in the receipt region 124 at (15, G) to the arm 221 of the carrier vehicle 200 which is located in the region (16, H). The delivery box 300 to be delivered to the delivery destination 20 is received by the arm 221 of the delivery vehicle 200, and moved down to the region (16, X) in the layer in which the carrying platform 224 is located as shown in FIG. 26E.

In this way, the carrier vehicle 100 can convey the delivery box 300 to be delivered to the delivery destination 20 to the arm 221 of the delivery vehicle 200.

Figure 27:
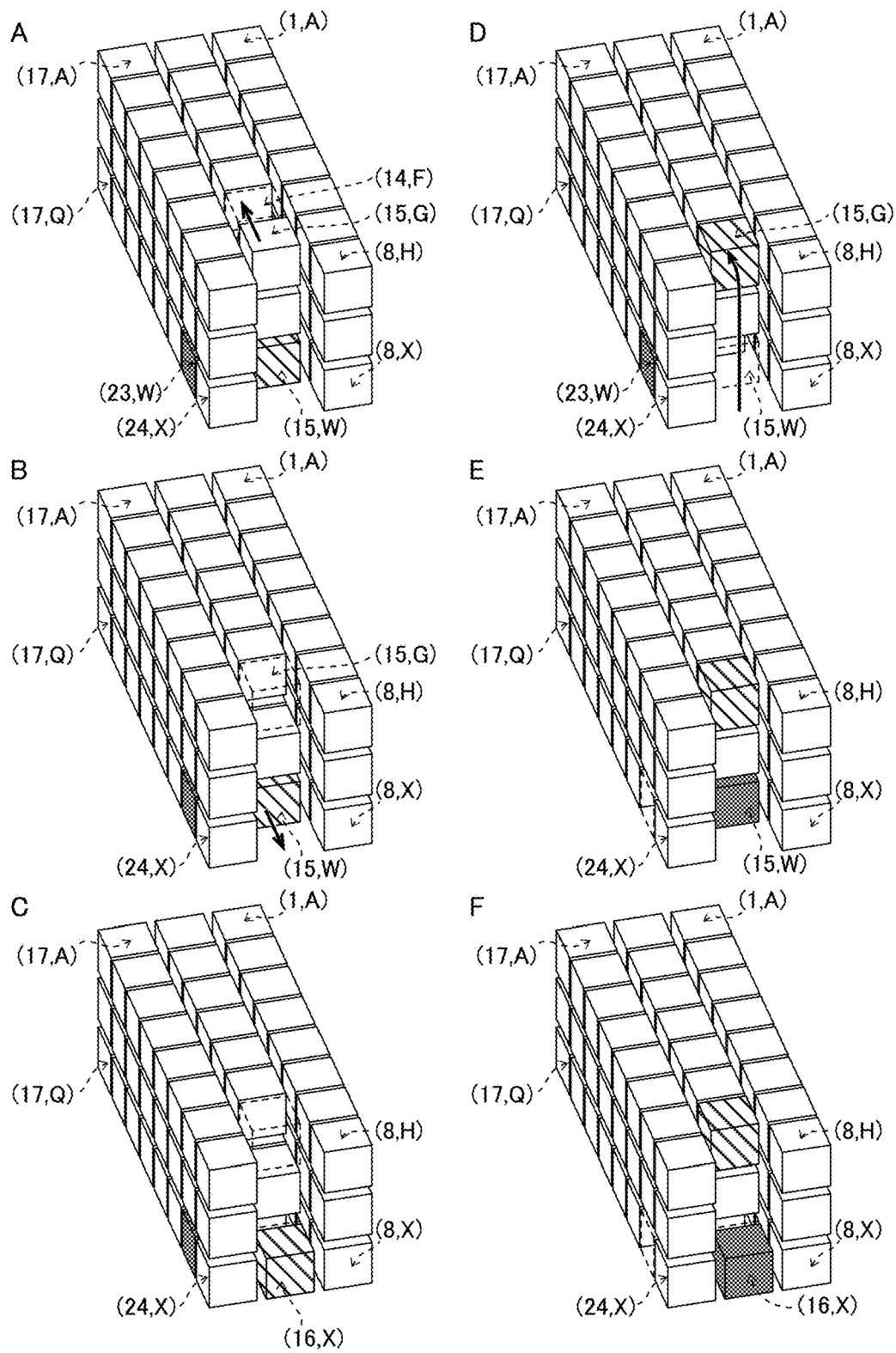
FIG. 27 is a drawing schematically showing a state in which the location of the delivery box is changed in the storage container according to Embodiment 1 of the present invention, where the interlayer transfer control process is performed.

FIG. 27 is a drawing schematically showing a state in which the location of the delivery box 300 is changed in the storage container 120 according to Embodiment 1 of the present invention, where the interlayer transfer control process is performed.

In FIG. 27, the plurality of regions in the storage container 120 are indicated by the same reference signs as in FIG. 26. In FIG. 27, the delivery box 300 to be delivered to the delivery destination 20 is shown in gray in the same way as FIG. 26. Like FIG. 26, the empty storage region 123 is indicated by dashed line in FIG. 27.

FIG. 27A shows the location of the delivery box 300 which has not been changed. The delivery box 300 to be delivered to the delivery destination 20 is located in the region (23, W) in the full layer.

First, since the delivery box 300 to be delivered to the delivery destination 20 is located in the region (23, W) in the full layer, the carrier vehicle 100 selects the delivery box 300 to be transferred to a different acceptable layer, from among the delivery boxes 300 located in the receipt regions 124 in the full layer. For example, FIG. 27A shows a configuration where the delivery box 300 located in the region (15, W) indicated by diagonal line is selected to be transferred to the different acceptable layer.

In addition, the carrier vehicle 100 identifies the layer to which the selected delivery box 300 is transferred as the destination layer. The destination layer has an empty storage region 123 such as the region (14, F). The carrier vehicle 100 performs the circular conveyance control process as described above, and empties the region (15, G) which is the receipt region 124 in the identified destination layer, as shown in FIG. 27B.

Next, the carrier vehicle 100 conveys the selected delivery box 300 located in the region (15, W) to the arm 221 of the delivery vehicle 200 located in the region (16, X). By this means, the selected delivery box 300 can be received by the arm 221 of the delivery vehicle 200, and located in the region (16, X) as shown in FIG. 27C.

As shown in FIG. 27D, the delivery vehicle 200 moves the arm 221 holding the selected delivery box 300 up to the destination layer, and transfers the selected delivery box 300 to the empty receipt region 124 at (15, G) in the destination layer.

Accordingly, as shown in FIG. 27D, the receipt region 124 at (15, W) becomes empty, so that the layer having the region (15, W) becomes an acceptable layer.

Next, as shown in FIG. 27E, the carrier vehicle 100 conveys the delivery box 300 to be delivered to the delivery destination 20 to the empty receipt region 124 at (15, W). Then, when the arm 221 of the delivery vehicle 200 moves down to the region (16, X), the carrier vehicle 100 conveys the delivery box 300 located in the receipt region 124 at (15, W) to the arm 221 located in the region (16, X) as shown in FIG. 27F.

As described above, when the delivery box 300 to be delivered to the delivery destination 20 is located in the full layer, the carrier vehicle 100 transfers the delivery box 300 located in the receipt region 124 in the full layer to a different acceptable layer, in collaboration with the delivery vehicle 200. By this means, the carrier vehicle 100 can convey the delivery box 300 to be delivered to the delivery destination 20 to the arm 221 of the delivery vehicle 200.

Figure 28:
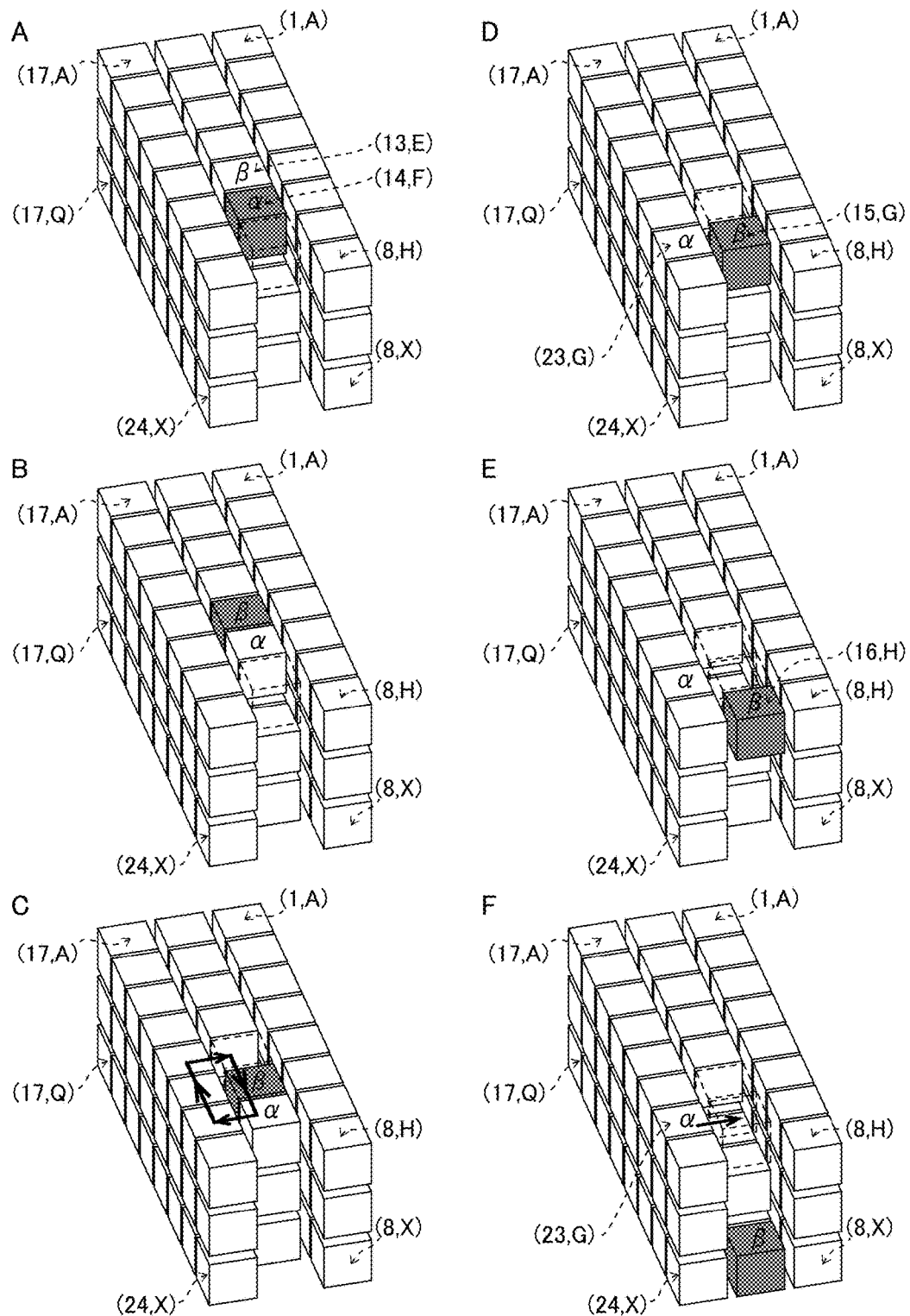
FIG. 28 is a drawing schematically showing a state in which the location of the delivery box is changed in the storage container according to Embodiment 1 of the present invention, where the delivering order of the delivery box is changed because the delivery destination is changed.

FIG. 28 is a drawing schematically showing a state in which the location of the delivery box 300 is changed in the storage container 120 according to Embodiment 1 of the present invention, in a case where the delivering order of the delivery box 300 is changed because the delivery destination 20 is changed.

In FIG. 28, the plurality of regions in the storage container 120 are indicated by the same reference signs as in FIG. 26. In FIG. 28, the delivery box 300 to be delivered to the delivery destination 20 is shown in gray in the same way as FIG. 26. Like FIG. 26, the empty storage region 123 is indicated by dashed line in FIG. 28.

FIG. 28A shows the location of the delivery box 300 which has not been changed. Here, the delivery box 300 to be delivered to the delivery destination 20 is referred to as "delivery box α" located in the region (14, F). The delivery box 300 to be delivered to the delivery destination 20 following the delivery box α is referred to as "delivery box β" located in the region (13, E).

As shown in FIG. 28B, the delivering order of the delivery box 300 is changed because the delivery destination 20 is changed, that is, first the delivery box β is delivered, and next the delivery box α is delivered. That is, the delivery box 300 to be delivered at this time is the delivery box β in gray.

In this case, as shown in FIG. 28C, the carrier vehicle 100 performs the circular conveyance control process as described above, and conveys the delivery box β to be currently delivered to the receipt region 124 at (15, G) as shown in FIG. 28D. Next, the delivery box α to be delivered following the delivery box α is conveyed to the region (23, G).

Then, as shown in FIG. 28E, the carrier vehicle 100 conveys the delivery box β located in the receipt region 124 at (15, G) to the arm 221 of the delivery vehicle 200 located in the region (16, H).

The delivery box β is received by the arm 221 of the delivery vehicle 200, and is moved down to the region (16, X) in the layer in which the carrier platform 224 is located as shown in FIG. 28F.

Next, the carrier vehicle 100 conveys the delivery box α located in the region (23, G) to the receipt region 124 at (15, G), as shown in FIG. 28F. Accordingly, the delivery box 300 can be located in the receipt region 124 at (15, G) in the changed delivering order in which first the delivery box β is delivered, and next the delivery box α is delivered.

As described above, even though the delivering order of the deliver box 300 is changed because the delivery destination 20 is changed, the carrier vehicle 100 can convey the delivery box 300 to the arm 221 of the delivery vehicle 200 according to the changed delivering order of the delivery box 300.

Here, the configuration is shown in FIG. 28 where the location of the delivery box 300 is changed to change the delivering order of the delivery box 300 without the interlayer transfer control process. However, it is by no means limiting. When the interlayer transfer control process is performed, the carrier vehicle 100 can convey the delivery box 300 to the arm 221 of the delivery vehicle 200 according to the changed delivering order of the delivery box 300, by combining the process shown in FIG. 27 as needed.

In addition, when the carrier vehicle 100 picks up the delivery box 300 from the pick-up destination 20 and enters the storage container 120 of the carrier vehicle 100, the carrier vehicle 100 can store the picked delivery box 300 in the storage container 120 by performing the same processes as shown in FIGS. 26 to 28.

For example, first, the carrier vehicle 100 finds the empty storage region 123 and the layer having the empty storage region 123, and determines the layer and the storage region 123 to store the picked delivery box 300. In this case, the carrier vehicle 100 may determine the layer and the storage region 123 to store the picked delivery box 300 as follows.

The carrier vehicle 100 may determine the storage region 123 far from the carrying platform 224 of the delivery vehicle 200 as possible in the layer having the empty storage region 123, as the storage region 123 to store the picked delivery box 300. The storage region 123 far from the carrying platform 224 of the delivery vehicle 200 as possible is located at (1, A) or (17, A) shown in FIG. 26. Therefore, it makes it easy to convey the delivery box 300 to be subsequently delivered to the delivery destination 20 to the receipt region 124, and consequently the delivery system 1 can realize more efficient delivery.

When determining the storage region 123 to store the picked delivery box 300, the carrier vehicle 100 performs the above-described circular conveyance control process to empty the receipt region 124 in the layer having the determined storage region 123. Then, the delivery vehicle 200 moves the arm 221 up or down to the layer having the determined storage region 123, and puts the picked delivery box 300 in the empty receipt region 124. Then, the carrier vehicle 100 performs the above-described circular conveyance control process to convey the picked delivery box 300 to the determined storage region 123.

In this way, the carrier vehicle 100 can store the picked delivery box 300 in the storage container 120 by performing the same processes as shown in FIGS. 26 to 28.

As described above, even though the storage container 120 is not equipped with a stacker crane, the delivery system 1 according to Embodiment 1 can change the location of the delivery box 300 in the storage container 120 by the collaboration between the delivery vehicle 200 for delivering the delivery box 300 and the carrier vehicle 100.

In a common automated warehouse system, a stacker crane conveys parcels in the warehouse while workers carry the parcels out of the warehouse by using carts and so forth. That is, in a common automated warehouse system, dedicated means for conveying parcels in the warehouse, such as a stacker crane, are required in the warehouse, and therefore the capacity for storing parcels is limited. Moreover, a common automated warehouse system moves parcels by using different means between the inside and the outside of the warehouse, and delivers the parcels to the delivery destinations 20 by workers, and therefore leaves to be improved in view of the cost reduction, and the increase in speed and efficiency of the delivery. Moreover, the number of times of redeliveries depends on the situation of the recipient, and therefore it is difficult to efficiently deliver parcels.

In contrast, the delivery system according to Embodiment 1 does not need dedicated means for conveying the delivery box 300 in the storage container 120, because the delivery vehicle 200 for delivering the delivery box 300 changes the location of the delivery box 300 in the storage container 120 in collaboration with the carrier vehicle 100. Therefore, the delivery system 1 according to Embodiment 1 can increase the capacity for storing parcels in the storage container 120, and consequently efficiently deliver the parcels and reduce the delivery cost.

Moreover, in the delivery system 1 according to Embodiment 1, the delivery vehicle 200 which is an automated driverless vehicle for delivery delivers the parcels to the delivery destinations 20, and therefore no worker is required to deliver the parcels. Therefore, the delivery system 1 according to Embodiment 1 can prevent a human error and variation in the work depending on the worker, and therefore reduce the delivery cost and improve the speed and the efficiency of the delivery.

Furthermore, in the delivery system 1 according to Embodiment 1, the delivery of the delivery box 300 is completed by fixing the delivery box 300 to the delivery box fixture 400, and therefore it is possible to complete the delivery without being influenced by the situation of the recipient. Therefore, the delivery system 1 according to Embodiment 1 can reduce the number of times of redeliveries, and therefore reduce the delivery cost and improve the speed and the efficiency of the delivery.

Furthermore, the delivery system 1 according to Embodiment 1 locates the delivery box 300 to be delivered to the delivery destination 20 in the receipt region 124 by the time the delivery vehicle 200 gets out of the carrier vehicle 100 at the relay point 21. Therefore, in the delivery system 1 according to Embodiment 1, when the carrier vehicle 100 arrives at the relay point 21, the delivery vehicle 200 can immediately get out of the carrier vehicle 100 to deliver the delivery box 300 to the delivery destination 20, and therefore can reduce the delivery cost and improve the speed and the efficiency of the delivery.

<9. Other Embodiments>

Figure 29:
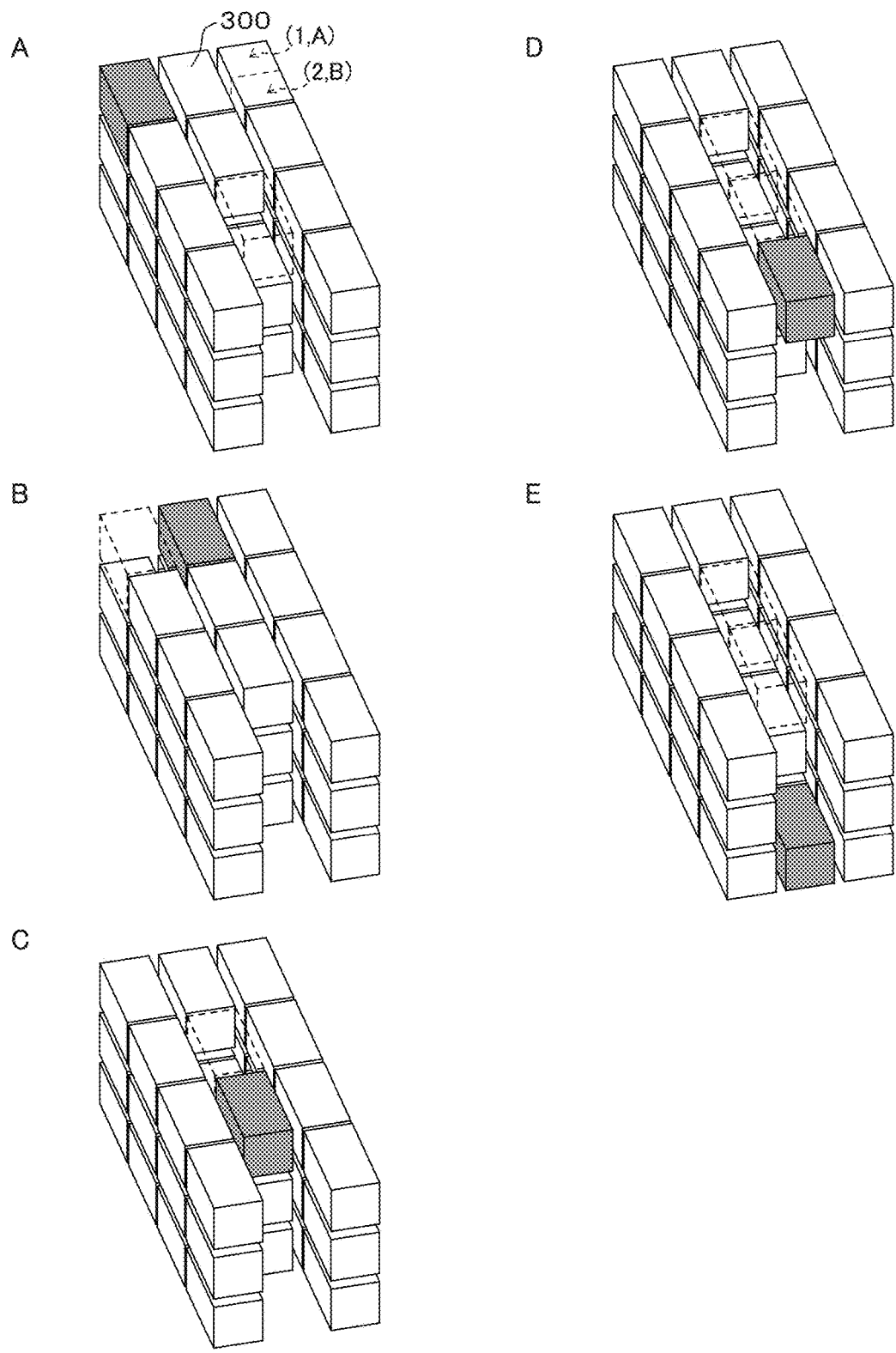
FIG. 29 is a drawing showing the delivery box and change in the location of the delivery box according to Embodiment 2 of the present invention.
Figure 30:
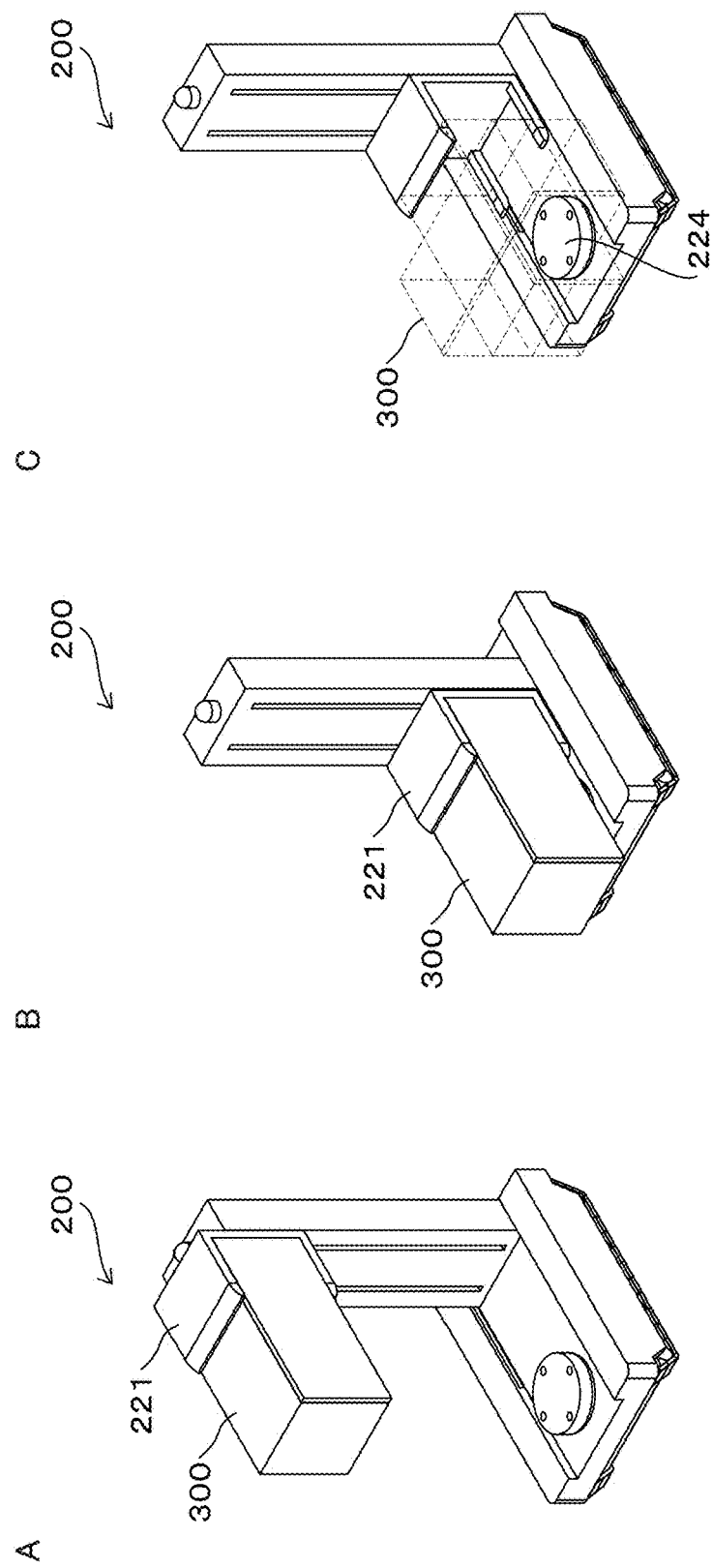
FIG. 30 is a drawing showing the delivery vehicle carrying the delivery box according to Embodiment 2 of the present invention.

FIG. 29 is a drawing showing the delivery box 300 and change in the location of the delivery box 300 according to Embodiment 2 of the present invention. FIG. 30 is a drawing showing the delivery vehicle 200 carrying the delivery box 300 according to Embodiment 2 of the present invention.

As described above, the delivery box 300 according to Embodiment 1 is sized to be stored in each of the storage regions 123 in the storage container 120. That is, the size of the delivery box 300 according to Embodiment 1 is adapted to the size of one storage region 123, and is at least equal to or smaller than the size of one storage region 123.

In contrast, the delivery box 300 according to Embodiment 2 may be larger than the storage region 123. To be more specific, the size of the delivery box 300 according to Embodiment 2 may be adapted to the size of two storage regions 123. To be more specific, the delivery box 300 may be larger than one storage region 123, and equal to or smaller than two storage regions 123.

For example, FIG. 29A shows the delivery box 300 according to Embodiment 2 formed in a rectangular parallelepiped. The delivery box 300 according to Embodiment 2 has the length of one side along the front-to-back direction of the carrier vehicle 100 which is twice as long as that of the delivery box 300 according to Embodiment 1.

Even in this case, the carrier vehicle 100 according to Embodiment 2 can change the location of the delivery box 300 in the storage container 120 as shown in FIGS. 29A to E, and convey the delivery box 300 to be delivered to the delivery destination 20 to the arm 221 of the delivery vehicle 200.

According to Embodiment 2, the delivery vehicle 200 can receive the delivery box 300 held by the arm 221 as shown in FIG. 30A, and carry the delivery box 300 thereon as shown in FIG. 30B.

In addition, according to Embodiment 2, the delivery vehicle 200 can turn the delivery box 300 on the carrying platform 224 to change the direction of the delivery box 300 as shown in FIG. 30C.

Figure 31:
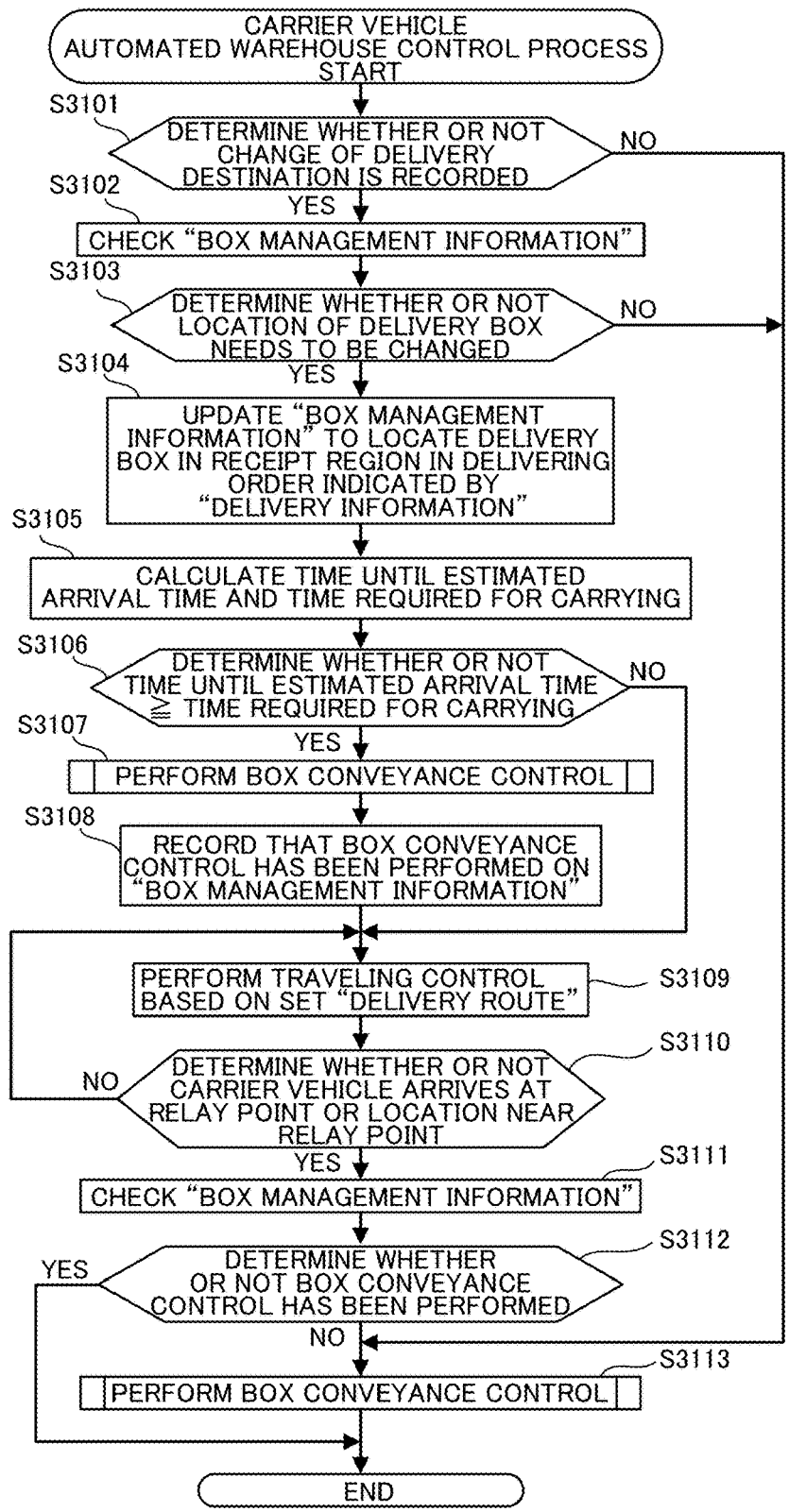
FIG. 31 is a flowchart showing details of an automated warehouse control process performed by the carrier vehicle according to Embodiment 3 of the present invention.

FIG. 31 is a flowchart showing details of an automated warehouse control process performed by the carrier vehicle 100 according to Embodiment 3.

The carrier vehicle 100 (controller 101) according to Embodiment 3 may perform the automated warehouse control process shown in FIG. 31, instead of the automated warehouse control process shown in FIG. 23. Here, the steps shown in FIG. 31 which are the same as in FIG. 23 will not be described again.

The carrier vehicle 100 (controller 101) according to Embodiment 3 updates the box management information (S3104), and then calculates an estimated arrival time and a period of time required for carrying (S3105).

The carrier vehicle 100 is scheduled to arrive at the relay point 21 at the estimated arrival time. The carrier vehicle 100 (controller 101) can calculate the distance from the present location to the relay point 21 by using the map information and the GPS device 105a, and calculate the estimated arrival time based on the traveling information such as the traveling speed, the road information, and the traffic information.

In addition, the period of time required for carrying is a time required until the delivery box 300 to be delivered to the delivery destination 20 is carried on the delivery vehicle 200. The period of time required for carrying includes, for example, a time required for changing the location of the delivery box 300 in the storage container 120, and a time required for receiving and carrying the delivery box 300 in the delivery vehicle 200. The carrier vehicle 100 can calculate the period of time required for carrying based on the delivery information and the box management information.

Next, the carrier vehicle 100 (controller 101) compares between the period of time until the estimated arrival time and the period of time required for carrying, and when the period of time until the estimated arrival time is equal to or longer than the period of time required for carrying (S3106: YES), the carrier vehicle 100 (conveyance controller 135) performs the box conveyance control shown in FIG. 24 (S3107). Then, after performing the box conveyance control, the carrier vehicle 100 (controller 101) records that the box conveyance control has been performed on the box management information (S3108), and performs the traveling control based on the set delivery route (S3109).

On the other hand, when the period of time until the estimated arrival time is shorter than the period of time required for carrying (S3106: NO), the carrier vehicle 100 (controller 101) performs the traveling control for the delivery based on the set delivery route (S3109), in order to perform the box conveyance control after the carrier vehicle 100 arrives at the relay point 21 until the delivery vehicle 200 gets out of the carrier vehicle 100.

After determining whether or not the carrier vehicle 100 arrives at the relay point 21 or a location near the relay point 21 (S3110: YES), the carrier vehicle 100 (controller 101) checks the box management information (S3111), and then determines whether or not the box conveyance control has been performed (S3112).

When determining that the box conveyance control has been performed in S3107 (S3112: YES), the carrier vehicle 100 (controller 101) ends the process.

On the other hand, when determining that the box conveyance control has not been performed (S3112: NO), the carrier vehicle 100 (conveyance controller 135) performs the box conveyance control shown in FIG. 24 (S3113), and the carrier vehicle 100 (controller 101) ends the process.

Here, when the box conveyance control is performed while the carrier vehicle 100 is traveling, a problem is likely to occur, for example, the delivery box 300 is delivered to a wrong destination, and the parcel in the delivery box 300 is broken. When the period of time until the estimated arrival time is equal to or longer than the period of time required for carrying, the carrier vehicle 100 according to Embodiment 3 performs the box conveyance control by the time arriving at the relay point 21. On the other hand, when the period of time until the estimated arrival time is shorter than the period of time required for carrying, the carrier vehicle 100 according to Embodiment 3 performs the box conveyance control after arriving at the relay point 21 until the delivery vehicle 200 gets out of the carrier vehicle 100. By this means, the carrier vehicle 100 according to Embodiment 3 can reduce the possibility of the occurrence of the above-described problems.

<10. Others>

It is clear for a person skilled in the art that the technical features described in the above-described embodiments including modifications can be applied to each other.

The above-described embodiments are intended to be examples, and should not be construed as limitation. Therefore, it is clear for a person skilled in the art that the embodiment may be appropriately modified or altered without deviating from the scope of the appended claims.

The terms used in this specification and the appended claims should be interpreted as "non-limiting." For example, the terms "include" and "be included" should be interpreted as "including the stated elements but not limited to the stated elements." The term "have" should be interpreted as "having the stated elements but not limited to the stated elements."

REFERENCE SIGNS LIST

10 center
20 delivery destination
21 relay point
100 carrier vehicle
101 controller
102 communication device
103 detection device
104 storage device
105 driving control device
105a GPS device
106 traveling mechanism
106a driving wheel
110 automated warehouse
120 storage container
121 carrying space
122 main space
123 storage region
124 receipt region
125 door
130 conveyance control mechanism
131 conveyor
132 first conveyor
133 second conveyor
135 conveyance controller
200 delivery vehicle
201 controller
202 communication device
203 detection device
204 storage device
205 driving control device 205a GPS device
205b balance adjustment device
206 traveling mechanism
206a driving wheel
210 carrying control mechanism
220 carrying mechanism
221 arm
222 up-and-down part
223 translation part
224 carrying platform
230 carrying controller
231 interlayer transfer controller
300 delivery box
301 lid
302 parcel storage part
303 damper
304 hinge
310 protrusion
310a first protrusion
310b second protrusion
310c third protrusion
310d fourth protrusion
400 delivery box fixture
410 slot
410a first slot
410b second slot
410c third slot
410d fourth slot

The invention claimed is:

1. A delivery system comprising:
a delivery vehicle configured to be able to carry a delivery box to be delivered to a delivery destination; and
a carrier vehicle configured to be able to carry the delivery vehicle thereon, the carrier vehicle including a storage container configured to be able to store one or more delivery boxes,
the carrier vehicle including a conveyance control mechanism configured to perform conveyance control to convey the delivery box located at a predetermined storage location in the storage container to a storage location different from the predetermined storage location, the conveyance control mechanism performing the conveyance control to convey the delivery box to a receipt location at which the delivery vehicle can receive the delivery box, and
the delivery vehicle including a carrying control mechanism configured to perform carrying control to receive the delivery box from the carrier vehicle at the receipt location and to carry the received delivery box thereon,
wherein the delivery vehicle delivers to the delivery destination the delivery box carried on the delivery vehicle by the carrying control of the carrying control mechanism.

2. The delivery system according to claim 1, wherein:
the storage container is constituted by a plurality of layers and configured to be able to store the delivery box in each of the layers, and
the carrying control mechanism includes:
a holding part configured to hold the delivery box carried on the delivery vehicle; and an interlayer transfer controller configured to perform transfer control, when a specified layer having the storage location at which the delivery box to be delivered to the delivery destination is stored is full, and when a delivery box different from the delivery box to be delivered to the delivery destination is located at the receipt location, the interlayer transfer controller performing the transfer control to hold the different delivery box located at the receipt location by the holding part to transfer the different delivery box to a layer different from the specified layer.

3. The delivery system according to claim 2, wherein:
the holding part is configured to be able to move up and down with respect to the plurality of layers; and
the interlayer transfer controller performs the transfer control to move the holding part holding the different delivery box up and down to transfer the different delivery box to a layer different from the layer in which the delivery box received from the carrier vehicle is stored.

4. The delivery system according to claim 2, wherein the conveyance control mechanism includes:
a first conveyor provided at least in the receipt location and configured to convey the delivery box in a front-to-back direction and a width direction of the carrier vehicle;
a second conveyor provided at least at a storage location different from the receipt location and configured to convey the delivery box in the front-to-back direction of the carrier vehicle; and
a conveyance controller configured to perform conveyance control to convey the delivery box by controlling at least one of the first conveyor and the second conveyor.

5. A delivery system comprising:
a delivery vehicle configured to carry a delivery box to be delivered to a delivery destination; and
a carrier vehicle configured to carry the delivery vehicle thereon, the carrier vehicle including:
an automated warehouse configured to store a plurality of delivery boxes and change locations of the plurality of delivery boxes; and
a controller configured to control the automated warehouse such that the delivery box to be delivered to the delivery destination is located at a receipt location at which the delivery vehicle can receive the delivery box by the time the delivery vehicle gets out of the carrier vehicle at a relay point on a delivery route from a shipping place to the delivery destination, and
the delivery vehicle carries the delivery box to be delivered to the delivery destination thereon upon receiving the delivery box located at the receipt location;
the delivery vehicle gets out of the carrier vehicle when the carrier vehicle arrives at the relay point for the delivery destination; and
the delivery vehicle travels on the delivery route from the relay point to the delivery destination to deliver the delivery box to the delivery destination.

6. The delivery system according to claim 5, wherein:
the automated warehouse can store the plurality of delivery boxes to be delivered to a plurality of delivery destinations, respectively; and
the controller controls the automated warehouse such that the plurality of delivery boxes to be delivered to the plurality of delivery destinations are located in the receipt region in a delivering order according to the delivery destination.

7. The delivery system according to claim 6, wherein the controller is configured to:
determine whether or not to change the delivery destination;
change the delivering order according to the changed delivery destination when determining to change the delivery destination; and control the automated warehouse to locate each of the delivery boxes in the receipt location in the changed delivering order.

8. The delivery system according to claim 7, wherein the controller determines whether or not to change the delivery destination, based on at least one of traffic information and road information on the delivery route.

* * * * *